United States Patent
O'Leary et al.

(10) Patent No.: US 11,534,974 B2
(45) Date of Patent: Dec. 27, 2022

(54) CUSTOMIZED FABRICATION OF ORTHODONTIC RETAINERS BASED ON PATIENT ANATOMY

(71) Applicant: Align Technology, Inc., San Jose, CA (US)

(72) Inventors: Siobhan O'Leary, Santa Clara, CA (US); Jun Sato, San Jose, CA (US); Rohit Tanugula, San Jose, CA (US); Ryan Kimura, San Jose, CA (US); Allen R. Boronkay, San Jose, CA (US); Huizhong Li, San Jose, CA (US); Fuming Wu, Pleasanton, CA (US); Jihua Cheng, San Jose, CA (US); Jeremy Riley, Mountain View, CA (US); Paula Alvarado, Santa Ana (CR)

(73) Assignee: Align Technology, Inc., San Jose, CA (US)

( * ) Notice: Subject to any disclaimer, the term of this patent is extended or adjusted under 35 U.S.C. 154(b) by 1046 days.

(21) Appl. No.: 16/195,701

(22) Filed: Nov. 19, 2018

(65) Prior Publication Data

US 2019/0152152 A1 May 23, 2019

Related U.S. Application Data

(60) Provisional application No. 62/588,303, filed on Nov. 17, 2017, provisional application No. 62/598,454, filed on Dec. 13, 2017.

(51) Int. Cl.
*B29C 64/386* (2017.01)
*B33Y 10/00* (2015.01)
(Continued)

(52) U.S. Cl.
CPC ............ *B29C 64/386* (2017.08); *A61C 7/002* (2013.01); *A61C 7/08* (2013.01); *A61C 9/004* (2013.01);
(Continued)

(58) Field of Classification Search
CPC ......... B33Y 10/00; B33Y 30/00; B33Y 50/00; A61C 7/08
(Continued)

(56) References Cited

U.S. PATENT DOCUMENTS

| 2,171,695 A | 9/1939 | Harper |
|---|---|---|
| 2,194,790 A | 3/1940 | Gluck |

(Continued)

FOREIGN PATENT DOCUMENTS

| AU | 517102 B | 11/1977 |
|---|---|---|
| AU | 3031677 A | 11/1977 |

(Continued)

OTHER PUBLICATIONS

US 8,553,966 B1, 10/2013, Alpern et al. (withdrawn)
(Continued)

*Primary Examiner* — Md Azad
(74) *Attorney, Agent, or Firm* — Shay Glenn LLP

(57) ABSTRACT

Dental retainer devices are provided. The dental retainer devices can be customized based on patient specific dental anatomy and dental treatment plans. Methods of making the dental retainer devices are also provided. The methods can included additive manufacturing. Methods are also provided for customization of a dental retainer device based on the patient specific anatomy. The methods for customization can include providing a dentist with different options for anterior teeth coverage, posterior teeth coverage, and palatal configurations for the dental retainer devices.

29 Claims, 51 Drawing Sheets

(51) Int. Cl.
  *B33Y 30/00* (2015.01)
  *B33Y 50/00* (2015.01)
  *A61C 7/00* (2006.01)
  *A61C 7/08* (2006.01)
  *A61C 9/00* (2006.01)
  *B29L 31/00* (2006.01)

(52) U.S. Cl.
  CPC .............. *B33Y 10/00* (2014.12); *B33Y 30/00* (2014.12); *B33Y 50/00* (2014.12); *B29L 2031/753* (2013.01)

(58) Field of Classification Search
  USPC ........................................................ 700/117
  See application file for complete search history.

(56) References Cited

U.S. PATENT DOCUMENTS

| | | |
|---|---|---|
| 2,467,432 A | 4/1949 | Kesling |
| 2,531,222 A | 11/1950 | Kesling |
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling |
| 3,738,005 A | 6/1973 | Cohen et al. |
| 3,797,115 A | 3/1974 | Silverman et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,314,335 A | 5/1994 | Fung |

(56) References Cited

U.S. PATENT DOCUMENTS

| | | | |
|---|---|---|---|
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coll et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |

(56) References Cited

U.S. PATENT DOCUMENTS

| | | | |
|---|---|---|---|
| 6,496,816 | B1 | 12/2002 | Thiesson et al. |
| 6,499,026 | B1 | 12/2002 | Rivette et al. |
| 6,499,995 | B1 | 12/2002 | Schwartz |
| 6,507,832 | B1 | 1/2003 | Evans et al. |
| 6,514,074 | B1 | 2/2003 | Chishti et al. |
| 6,515,593 | B1 | 2/2003 | Stark et al. |
| 6,516,288 | B2 | 2/2003 | Bagne |
| 6,516,805 | B1 | 2/2003 | Thornton |
| 6,520,772 | B2 | 2/2003 | Williams |
| 6,523,009 | B1 | 2/2003 | Wilkins |
| 6,523,019 | B1 | 2/2003 | Borthwick |
| 6,524,101 | B1 | 2/2003 | Phan et al. |
| 6,526,168 | B1 | 2/2003 | Ornes et al. |
| 6,526,982 | B1 | 3/2003 | Strong |
| 6,529,891 | B1 | 3/2003 | Heckerman |
| 6,529,902 | B1 | 3/2003 | Kanevsky et al. |
| 6,532,455 | B1 | 3/2003 | Martin et al. |
| 6,535,865 | B1 | 3/2003 | Skaaning et al. |
| 6,540,512 | B1 | 4/2003 | Sachdeva et al. |
| 6,540,707 | B1 | 4/2003 | Stark et al. |
| 6,542,593 | B1 | 4/2003 | Bowman Amuah |
| 6,542,881 | B1 | 4/2003 | Meidan et al. |
| 6,542,894 | B1 | 4/2003 | Lee et al. |
| 6,542,903 | B2 | 4/2003 | Hull et al. |
| 6,551,243 | B2 | 4/2003 | Bocionek et al. |
| 6,554,837 | B1 | 4/2003 | Hauri et al. |
| 6,556,659 | B1 | 4/2003 | Bowman Amuah |
| 6,556,977 | B1 | 4/2003 | Lapointe et al. |
| 6,560,592 | B1 | 5/2003 | Reid et al. |
| 6,564,209 | B1 | 5/2003 | Dempski et al. |
| 6,567,814 | B1 | 5/2003 | Bankier et al. |
| 6,571,227 | B1 | 5/2003 | Agrafiotis et al. |
| 6,572,372 | B1 | 6/2003 | Phan et al. |
| 6,573,998 | B2 | 6/2003 | Cohen Sabban |
| 6,574,561 | B2 | 6/2003 | Alexander et al. |
| 6,578,003 | B1 | 6/2003 | Camarda et al. |
| 6,580,948 | B2 | 6/2003 | Haupert et al. |
| 6,587,529 | B1 | 7/2003 | Staszewski et al. |
| 6,587,828 | B1 | 7/2003 | Sachdeva |
| 6,592,368 | B1 | 7/2003 | Weathers |
| 6,594,539 | B1 | 7/2003 | Geng |
| 6,595,342 | B1 | 7/2003 | Maritzen et al. |
| 6,597,934 | B1 | 7/2003 | de Jong et al. |
| 6,598,043 | B1 | 7/2003 | Baclawski |
| 6,599,250 | B2 | 7/2003 | Webb et al. |
| 6,602,070 | B2 | 8/2003 | Miller et al. |
| 6,604,527 | B1 | 8/2003 | Palmisano |
| 6,606,744 | B1 | 8/2003 | Mikurak |
| 6,607,382 | B1 | 8/2003 | Kuo et al. |
| 6,611,783 | B2 | 8/2003 | Kelly et al. |
| 6,611,867 | B1 | 8/2003 | Bowman Amuah |
| 6,613,001 | B1 | 9/2003 | Dworkin |
| 6,615,158 | B2 | 9/2003 | Wenzel et al. |
| 6,616,447 | B1 | 9/2003 | Rizoiu et al. |
| 6,616,579 | B1 | 9/2003 | Reinbold et al. |
| 6,621,491 | B1 | 9/2003 | Baumrind et al. |
| 6,623,698 | B2 | 9/2003 | Kuo |
| 6,624,752 | B2 | 9/2003 | Klitsgaard et al. |
| 6,626,180 | B1 | 9/2003 | Kittelsen et al. |
| 6,626,569 | B2 | 9/2003 | Reinstein et al. |
| 6,626,669 | B2 | 9/2003 | Zegarelli |
| 6,633,772 | B2 | 10/2003 | Ford et al. |
| 6,640,128 | B2 | 10/2003 | Vilsmeier et al. |
| 6,643,646 | B2 | 11/2003 | Su et al. |
| 6,647,383 | B1 | 11/2003 | August et al. |
| 6,650,944 | B2 | 11/2003 | Goedeke et al. |
| 6,671,818 | B1 | 12/2003 | Mikurak |
| 6,675,104 | B2 | 1/2004 | Paulse et al. |
| 6,678,669 | B2 | 1/2004 | Lapointe et al. |
| 6,682,346 | B2 | 1/2004 | Chishti et al. |
| 6,685,469 | B2 | 2/2004 | Chishti et al. |
| 6,689,055 | B1 | 2/2004 | Mullen et al. |
| 6,690,761 | B2 | 2/2004 | Lang et al. |
| 6,691,110 | B2 | 2/2004 | Wang et al. |
| 6,694,234 | B2 | 2/2004 | Lockwood et al. |
| 6,697,164 | B1 | 2/2004 | Babayoff et al. |
| 6,697,793 | B2 | 2/2004 | McGreevy |
| 6,702,765 | B2 | 3/2004 | Robbins et al. |
| 6,702,804 | B1 | 3/2004 | Ritter et al. |
| 6,705,863 | B2 | 3/2004 | Phan et al. |
| 6,729,876 | B2 | 5/2004 | Chishti et al. |
| 6,733,289 | B2 | 5/2004 | Manemann et al. |
| 6,736,638 | B1 | 5/2004 | Sachdeva et al. |
| 6,739,869 | B1 | 5/2004 | Taub et al. |
| 6,744,932 | B1 | 6/2004 | Rubbert et al. |
| 6,749,414 | B1 | 6/2004 | Hanson et al. |
| 6,769,913 | B2 | 8/2004 | Hurson |
| 6,772,026 | B2 | 8/2004 | Bradbury et al. |
| 6,790,036 | B2 | 9/2004 | Graham |
| 6,802,713 | B1 | 10/2004 | Chishti et al. |
| 6,814,574 | B2 | 11/2004 | Abolfathi et al. |
| 6,830,450 | B2 | 12/2004 | Knopp et al. |
| 6,832,912 | B2 | 12/2004 | Mao |
| 6,832,914 | B1 | 12/2004 | Bonnet et al. |
| 6,843,370 | B2 | 1/2005 | Tuneberg |
| 6,845,175 | B2 | 1/2005 | Kopelman et al. |
| 6,885,464 | B1 | 4/2005 | Pfeiffer et al. |
| 6,890,285 | B2 | 5/2005 | Rahman et al. |
| 6,951,254 | B2 | 10/2005 | Morrison |
| 6,976,841 | B1 | 12/2005 | Osterwalder |
| 6,978,268 | B2 | 12/2005 | Thomas et al. |
| 6,983,752 | B2 | 1/2006 | Garabadian |
| 6,984,128 | B2 | 1/2006 | Breining et al. |
| 6,988,893 | B2 | 1/2006 | Haywood |
| 7,016,952 | B2 | 3/2006 | Mullen et al. |
| 7,020,963 | B2 | 4/2006 | Cleary et al. |
| 7,036,514 | B2 | 5/2006 | Heck |
| 7,040,896 | B2 | 5/2006 | Pavlovskaia et al. |
| 7,106,233 | B2 | 9/2006 | Schroeder et al. |
| 7,112,065 | B2 | 9/2006 | Kopelman et al. |
| 7,121,825 | B2 | 10/2006 | Chishti et al. |
| 7,134,874 | B2 | 11/2006 | Chishti et al. |
| 7,137,812 | B2 | 11/2006 | Cleary et al. |
| 7,138,640 | B1 | 11/2006 | Delgado et al. |
| 7,140,877 | B2 | 11/2006 | Kaza |
| 7,142,312 | B2 | 11/2006 | Quadling et al. |
| 7,155,373 | B2 | 12/2006 | Jordan et al. |
| 7,156,655 | B2 | 1/2007 | Sachdeva et al. |
| 7,156,661 | B2 | 1/2007 | Choi et al. |
| 7,166,063 | B2 | 1/2007 | Rahman et al. |
| 7,184,150 | B2 | 2/2007 | Quadling et al. |
| 7,191,451 | B2 | 3/2007 | Nakagawa |
| 7,192,273 | B2 | 3/2007 | McSurdy |
| 7,217,131 | B2 | 5/2007 | Vuillemot |
| 7,220,122 | B2 | 5/2007 | Chishti |
| 7,220,124 | B2 | 5/2007 | Taub et al. |
| 7,229,282 | B2 | 6/2007 | Andreiko et al. |
| 7,234,937 | B2 | 6/2007 | Sachdeva et al. |
| 7,241,142 | B2 | 7/2007 | Abolfathi et al. |
| 7,244,230 | B2 | 7/2007 | Duggirala et al. |
| 7,245,753 | B2 | 7/2007 | Squilla et al. |
| 7,257,136 | B2 | 8/2007 | Mori et al. |
| 7,286,954 | B2 | 10/2007 | Kopelman et al. |
| 7,292,759 | B2 | 11/2007 | Boutoussov et al. |
| 7,294,141 | B2 | 11/2007 | Bergersen |
| 7,302,842 | B2 | 12/2007 | Biester et al. |
| 7,320,592 | B2 | 1/2008 | Chishti et al. |
| 7,328,706 | B2 | 2/2008 | Barach et al. |
| 7,329,122 | B1 | 2/2008 | Scott |
| 7,338,327 | B2 | 3/2008 | Sticker et al. |
| D565,509 | S | 4/2008 | Fechner et al. |
| 7,351,116 | B2 | 4/2008 | Dold |
| 7,354,270 | B2 | 4/2008 | Abolfathi et al. |
| 7,357,637 | B2 | 4/2008 | Liechtung |
| 7,435,083 | B2 | 10/2008 | Chishti et al. |
| 7,450,231 | B2 | 11/2008 | Johs et al. |
| 7,458,810 | B2 | 12/2008 | Bergersen |
| 7,460,230 | B2 | 12/2008 | Johs et al. |
| 7,462,076 | B2 | 12/2008 | Walter et al. |
| 7,463,929 | B2 | 12/2008 | Simmons |
| 7,476,100 | B2 | 1/2009 | Kuo |
| 7,500,851 | B2 | 3/2009 | Williams |
| D594,413 | S | 6/2009 | Palka et al. |
| 7,543,511 | B2 | 6/2009 | Kimura et al. |

(56) References Cited

U.S. PATENT DOCUMENTS

| | | |
|---|---|---|
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bauerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,828,601 B2 | 11/2010 | Pyczak |
| 7,841,464 B2 | 11/2010 | Cinader et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,215,312 B2 | 7/2012 | Garabadian et al. |
| 8,240,018 B2 | 8/2012 | Walter et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,306,608 B2 | 11/2012 | Mandelis et al. |
| 8,314,764 B2 | 11/2012 | Kim et al. |
| 8,332,015 B2 | 12/2012 | Ertl |
| 8,342,840 B2 * | 1/2013 | Griffiths .................. A61C 7/00 433/18 |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,639,477 B2 | 1/2014 | Chelnokov et al. |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,899,976 B2 | 12/2014 | Chen et al. |
| 8,936,463 B2 | 1/2015 | Mason et al. |
| 8,944,812 B2 | 2/2015 | Kuo |
| 8,948,482 B2 | 2/2015 | Levin |
| 8,956,058 B2 | 2/2015 | Rösch |
| 8,992,216 B2 | 3/2015 | Karazivan |
| 9,004,915 B2 | 4/2015 | Moss et al. |
| 9,022,792 B2 | 5/2015 | Sticker et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |

(56) References Cited

U.S. PATENT DOCUMENTS

| | | |
|---|---|---|
| 9,242,118 B2 | 1/2016 | Brawn |
| 9,261,358 B2 | 2/2016 | Atiya et al. |
| 9,277,972 B2 | 3/2016 | Brandt et al. |
| 9,336,336 B2 | 5/2016 | Deichmann et al. |
| 9,351,810 B2 | 5/2016 | Moon |
| 9,375,300 B2 | 6/2016 | Matov et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,566,132 B2 | 2/2017 | Stone-Collonge et al. |
| 9,584,771 B2 | 2/2017 | Mandelis et al. |
| 9,589,329 B2 | 3/2017 | Levin |
| 9,675,427 B2 | 6/2017 | Kopelman |
| 9,675,430 B2 | 6/2017 | Verker et al. |
| 9,693,839 B2 | 7/2017 | Atiya et al. |
| 9,730,769 B2 | 8/2017 | Chen et al. |
| 9,744,006 B2 | 8/2017 | Ross |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,706 B2 | 11/2018 | Elbaz et al. |
| 10,123,853 B2 | 11/2018 | Moss et al. |
| 10,154,889 B2 | 12/2018 | Chen et al. |
| 10,159,541 B2 | 12/2018 | Bindayel |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,258,432 B2 | 4/2019 | Webber |
| 10,275,862 B2 | 4/2019 | Levin |
| 10,548,690 B2 * | 2/2020 | Wen .............. A61C 7/08 |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0124478 A1 * | 7/2003 | Amundsen ............ A61C 7/006 433/18 |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |

(56) References Cited

U.S. PATENT DOCUMENTS

| | | |
|---|---|---|
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Belski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0246726 A1 | 10/2009 | Chelnokov et al. |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo Gonzalez et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | DuHamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0233655 A1* | 9/2010 | Karim .................. A61C 13/001 433/172 |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2010/0303316 A1 | 12/2010 | Bullis et al. |
| 2010/0312484 A1 | 12/2010 | DuHamel et al. |
| 2010/0327461 A1 | 12/2010 | Co et al. |
| 2011/0004331 A1* | 1/2011 | Cinader, Jr. ........... B33Y 80/00 700/98 |
| 2011/0007920 A1 | 1/2011 | Abolfathi et al. |
| 2011/0012901 A1 | 1/2011 | Kaplanyan |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0269092 A1 | 11/2011 | Kuo et al. |
| 2011/0316994 A1 | 12/2011 | Lemchen |
| 2012/0028210 A1 | 2/2012 | Hegyi et al. |

(56) References Cited

U.S. PATENT DOCUMENTS

| | | |
|---|---|---|
| 2012/0029883 A1 | 2/2012 | Heinz et al. |
| 2012/0040311 A1 | 2/2012 | Nilsson |
| 2012/0064477 A1 | 3/2012 | Schmitt |
| 2012/0081786 A1 | 4/2012 | Mizuyama et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0166213 A1 | 6/2012 | Arnone et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0106289 A1 | 4/2014 | Kozlowski |
| 2014/0122027 A1 | 5/2014 | Andreiko et al. |
| 2014/0136222 A1 | 5/2014 | Arnone et al. |
| 2014/0142902 A1 | 5/2014 | Chelnokov et al. |
| 2014/0178829 A1 | 6/2014 | Kim |
| 2014/0265034 A1 | 9/2014 | Dudley |
| 2014/0272774 A1 | 9/2014 | Dillon et al. |
| 2014/0280376 A1 | 9/2014 | Kuo |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0132708 A1 | 5/2015 | Kuo |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua Aldecoa |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0250568 A1* | 9/2015 | Fisker .................. A61C 9/0046 433/29 |
| 2015/0306486 A1 | 10/2015 | Logan et al. |
| 2015/0320320 A1 | 11/2015 | Kopelman et al. |
| 2015/0320532 A1 | 11/2015 | Matty et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0067013 A1 | 3/2016 | Morton et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0100924 A1 | 4/2016 | Wilson et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220105 A1 | 8/2016 | Durent |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0302885 A1 | 10/2016 | Matov et al. |
| 2016/0328843 A1 | 11/2016 | Graham et al. |
| 2016/0338799 A1 | 11/2016 | Wu et al. |
| 2016/0346063 A1 | 12/2016 | Schulhof et al. |
| 2016/0367188 A1 | 12/2016 | Malik et al. |
| 2016/0367339 A1 | 12/2016 | Khardekar et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0049311 A1 | 2/2017 | Borovinskih et al. |
| 2017/0049326 A1 | 2/2017 | Alfano et al. |
| 2017/0056131 A1 | 3/2017 | Alauddin et al. |
| 2017/0071705 A1 | 3/2017 | Kuo |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0215739 A1 | 8/2017 | Miyasato |
| 2017/0251954 A1 | 9/2017 | Lotan et al. |
| 2017/0258555 A1 | 9/2017 | Kopelman |
| 2017/0265970 A1 | 9/2017 | Verker |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2017/0340415 A1 | 11/2017 | Choi et al. |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071054 A1 | 3/2018 | Ha |
| 2018/0071055 A1 | 3/2018 | Kuo |
| 2018/0085059 A1 | 3/2018 | Lee |
| 2018/0125610 A1 | 5/2018 | Carrier et al. |
| 2018/0153648 A1 | 6/2018 | Shanjani et al. |
| 2018/0153649 A1 | 6/2018 | Wu et al. |
| 2018/0153733 A1 | 6/2018 | Kuo |
| 2018/0168788 A1 | 6/2018 | Fernie |

(56) References Cited

U.S. PATENT DOCUMENTS

| | | |
|---|---|---|
| 2018/0192877 A1 | 7/2018 | Atiya et al. |
| 2018/0228359 A1 | 8/2018 | Meyer et al. |
| 2018/0280118 A1 | 10/2018 | Cramer |
| 2018/0284727 A1 | 10/2018 | Cramer et al. |
| 2018/0318043 A1 | 11/2018 | Li et al. |
| 2018/0353264 A1 | 12/2018 | Riley et al. |
| 2018/0360567 A1 | 12/2018 | Xue et al. |
| 2018/0368944 A1 | 12/2018 | Sato et al. |
| 2018/0368961 A1 | 12/2018 | Shanjani et al. |
| 2019/0026599 A1 | 1/2019 | Salah et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076216 A1 | 3/2019 | Moss et al. |
| 2019/0090983 A1 | 3/2019 | Webber et al. |

FOREIGN PATENT DOCUMENTS

| | | |
|---|---|---|
| AU | 5598894 A | 6/1994 |
| CA | 1121955 A1 | 4/1982 |
| CN | 1655732 A | 8/2005 |
| CN | 1655733 A | 8/2005 |
| CN | 102017658 A | 4/2011 |
| CN | 103889364 A | 6/2014 |
| CN | 204092220 U | 1/2015 |
| CN | 105496575 A | 4/2016 |
| CN | 105997274 A | 10/2016 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| EP | 2848229 A1 | 3/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 4028359 A | 1/1992 |
| JP | 08-508174 A | 9/1996 |
| JP | 09-19443 A | 1/1997 |
| JP | 2003245289 A | 9/2003 |
| JP | 2000339468 A | 9/2004 |
| JP | 2005527320 A | 9/2005 |
| JP | 2005527321 A | 9/2005 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009078133 A | 4/2009 |
| JP | 2009101386 A | 5/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 10-20020062793 A | 7/2002 |
| KR | 10-20070108019 A | 11/2007 |
| KR | 10-20090065778 A | 6/2009 |
| KR | 10-1266966 B1 | 5/2013 |
| KR | 10-2016-041632 A | 4/2016 |
| KR | 10-2016-0071127 A | 6/2016 |
| KR | 10-1675089 B1 | 11/2016 |
| TW | 480166 B | 3/2002 |
| WO | WO91/004713 A1 | 4/1991 |
| WO | WO92/03102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO01/08592 A1 | 2/2001 |
| WO | WO01/85047 A2 | 11/2001 |
| WO | WO02/017776 A2 | 3/2002 |
| WO | WO02/062252 A1 | 8/2002 |
| WO | WO02/095475 A1 | 11/2002 |
| WO | WO03/003932 A2 | 1/2003 |
| WO | WO2006/096558 A2 | 9/2006 |
| WO | WO2006/100700 A1 | 9/2006 |
| WO | WO2006/133548 A1 | 12/2006 |
| WO | WO2007/019709 A2 | 2/2007 |
| WO | WO2007/071341 A1 | 6/2007 |
| WO | WO2007/103377 A2 | 9/2007 |
| WO | WO2008/115654 A1 | 9/2008 |
| WO | WO2009/016645 A2 | 2/2009 |
| WO | WO2009/085752 A2 | 7/2009 |
| WO | WO2009/089129 A1 | 7/2009 |
| WO | WO2009/146788 A1 | 12/2009 |
| WO | WO2009/146789 A1 | 12/2009 |
| WO | WO2010/059988 A1 | 5/2010 |
| WO | WO2010/123892 A2 | 10/2010 |
| WO | WO2012/007003 A1 | 1/2012 |
| WO | WO2012/064684 A2 | 5/2012 |
| WO | WO2012/074304 A2 | 6/2012 |
| WO | WO2012/078980 A2 | 6/2012 |
| WO | WO2012/083968 A1 | 6/2012 |
| WO | WO2012/140021 A2 | 10/2012 |
| WO | WO2013/058879 A2 | 4/2013 |
| WO | WO2014/068107 A1 | 5/2014 |
| WO | WO2014/091865 A1 | 6/2014 |
| WO | WO2014/143911 A1 | 9/2014 |
| WO | WO2015/015289 A2 | 2/2015 |
| WO | WO2015/063032 A1 | 5/2015 |
| WO | WO2015/112638 A1 | 7/2015 |
| WO | WO2015/176004 A1 | 11/2015 |
| WO | WO2016/004415 A1 | 1/2016 |
| WO | WO2016/042393 A1 | 3/2016 |
| WO | WO2016/061279 A1 | 4/2016 |
| WO | WO2016/084066 A1 | 6/2016 |
| WO | WO2016/099471 A1 | 6/2016 |
| WO | WO2016/113745 A1 | 7/2016 |
| WO | WO2016/116874 A1 | 7/2016 |
| WO | WO2016/200177 A1 | 12/2016 |
| WO | WO2017/006176 A1 | 1/2017 |
| WO | WO2017/182654 A1 | 10/2017 |
| WO | WO2018/057547 A1 | 3/2018 |
| WO | WO2018/085718 A2 | 5/2018 |
| WO | WO2018/232113 A1 | 12/2018 |
| WO | WO2019/018784 A1 | 1/2019 |

OTHER PUBLICATIONS

Bernabe et al.; Are the lower incisors the best predictors for the unerupted canine and premolars sums? An analysis of peruvian sample; The Angle Orthodontist; 75(2); pp. 202-207; Mar. 2005.
Collins English Dictionary; Teeth (definition); 9 pages; retrieved from the internet (https:www.collinsdictionary.com/us/dictionary/english/teeth) on May 13, 2019.

(56) References Cited

OTHER PUBLICATIONS

Dental Monitoring; Basics: How to put the cheek retractor?; 1 page (Screenshot); retrieved from the interenet (https://www.youtube.com/watch?v=6K1HXw4Kq3c); May 27, 2016.
Dental Monitoring; Dental monitoring tutorial; 1 page (Screenshot); retrieved from the internet (https:www.youtube.com/watch?v=Dbe3udOf9_c); Mar. 18, 2015.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Ecligner Selfie; Change your smile; 1 page (screenshot); retrieved from the internet (https:play.google.com/store/apps/details?id=parklict.ecligner); on Feb. 13, 2018.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.
Sobral De Agular et al.; The gingival crevicular fluid as a source of biomarkers to enhance efficiency of orthodontic and functional treatment of growing patients; Bio. Med. Research International; vol. 2017; pp. 1-7; Article ID 3257235; (year of pub. sufficiently earlier than effective US filing date and any foreign priority date) 2017.
Levin; U.S. Appl. No. 16/282,431 entitled "Estimating a surface texture of a tooth," filed Feb. 2, 2019.
Chen et al.; U.S. Appl. No. 16/223,019 entitled "Release agent receptacle," filed Dec. 17, 2018.
Arakawa et al.; Mouthguard biosensor with telemetry system for monitoring of saliva glucose: A novel cavitas sensor; Biosensors and Bioelectronics; 84; pp. 106-111; Oct. 2016.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new features; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Farooq et al.; Relationship between tooth dimensions and malocclusion; JPMA: The Journal of the Pakistan Medical Association; 64(6); pp. 670-674; Jun. 2014.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); relieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.
ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_imaging.php) on Jun. 6, 2008.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
Vevin et al.; Pose estimation of teeth through crown-shape matching; In Medical Imaging: Image Processing of International Society of Optics and Photonics; vol. 4684; pp. 955-965; May 9, 2002.
DICOM to surgical guides; (Screenshot); 1 page; retrieved from the internet at YouTube (https://youtu.be/47KtOmCEFQk); Published Apr. 4, 2016.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wiedmann; According to the laws of harmony to find the right tooth shape with assistance of the computer; Digital Dental News; 2nd Vol.; pp. 0005-0008; (English Version Included); Apr. 2008.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.

(56) References Cited

OTHER PUBLICATIONS

Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners," filed Dec. 24, 2018.
Kopleman et al., U.S. Appl. No. 16/220,381 entitled "Closed loop adaptive orthodontic treatment methods and apparatuses," filed Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.
Li et al.; U.S. Appl. No. 16/171,159 entitled "Alternative bite adjustment structures," filed Oct. 25, 2018.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.
Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
AADR. American Association for Dental Research; Summary of Activities; Los Angeles, CA; p. 195; Mar. 20-23,(year of pub. sufficiently earlier than effective US filing date and any foreign priority date) 1980.
Alcaniz et aL; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances—Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Alves et al.; New trends in food allergens detection: toward biosensing strategies; Critical Reviews in Food Science and Nutrition; 56(14); pp. 2304-2319; doi: 10.1080/10408398.2013.831026; Oct. 2016.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Bandodkar et al.; All-printed magnetically self-healing electrochemical devices; Science Advances; 2(11); 11 pages; e1601465; Nov. 2016.
Bandodkar et al.; Self-healing inks for autonomous repair of printable electrochemical devices; Advanced Electronic Materials; 1(12); 5 pages; 1500289; Dec. 2015.
Bandodkar et al.; Wearable biofuel cells: a review; Electroanalysis; 28(6); pp. 1188-1200; Jun. 2016.
Bandodkar et al.; Wearable chemical sensors: present challenges and future prospects; Acs Sensors; 1(5); pp. 464-482; May 11, 2016.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al., "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
Begole et al.; A Computer System for the Analysis of Dental Casts; The Angle Orthodontist; 51(3); pp. 252-258; Jul. 1981.
Bernard et al; Computerized Diagnosis in Orthodontics for Epidemiological Studies: A ProgressReport; (Abstract Only), J. Dental

(56) References Cited

OTHER PUBLICATIONS

Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bourke, Coordinate System Transformation; 1 page; retrived from the internet (http://astronomy.swin.edu.au/ pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on The Uses of the Computer in Orthodontic Practice (Part 1); Journal of Clinical Orthodontics; 13(7); pp. 442-453; (interview); Jul. 1979.
Burstone; Dr. Charles J. Burstone on The Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
Cottingham; Gnathologic Clear Plastic Positioner; American Journal of Orthodontics; 55(1); pp. 23-31; Jan. 1969.
Crawford; CAD/CAM in the Dental Office; Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret A Man With A Vision, Part 3: The Computer Gives New Vision—Literally, Part 4: Bytes 'N Bites The Computer Moves From The Front Desk To The Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
Cureton; Correcting Malaligned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.
DCS Dental AG; The CAD/CAM 'DCS Titan System' for Production of Crowns/Bridges; DSC Production; pp. 1-7; Jan. 1992.
Defranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
Dent-x; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doruk et al.; The role of the headgear timer in extraoral co-operation; European Journal of Orthodontics; 26; pp. 289-291; Jun. 1, 2004.
Doyle; Digital Dentistry; Computer Graphics World; pp. 50-52 andp. 54; Oct. 2000.
Dummer et al.; Computed Radiography Imaging Based on High-Density 670 nm VCSEL Arrays; International Society for Optics and Photonics; vol. 7557; p. 75570H; 7 pages; (Author Manuscript); Feb. 24, 2010.
Duret et al.; CAD/CAM Imaging in Dentistry; Current Opinion in Dentistry; 1(2); pp. 150-154; Apr. 1991.
Duret et al.; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; (year of pub. sufficiently earlier than effective US filing date and any foreign priority date) 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.

(56) References Cited

OTHER PUBLICATIONS

Friedrich et al; Measuring system for in vivo recording of force systems in orthodontic treatment—concept and analysis of accuracy; J. Biomech.; 32(1); pp. 81-85; (Abstract Only) Jan. 1999.
Futterling et al.; Automated Finite Element Modeling of a Human Mandible with Dental Implants; JS WSCG '98-Conference Program; 8 pages; retrieved from the Internet (https://dspace5.zcu.cz/bitstream/11025/15851/1/Strasser_98.pdf); on Aug. 21, 2018.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+), 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Grest, Daniel; Marker-Free Human Motion Capture in Dynamic Cluttered Environments from a Single View-Point, PhD Thesis; 171 pages; Dec. 2007.
Guess et al.; Computer Treatment Estimates In Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research; Simulating stress put on jaw. (ANSYS Inc.'s finite element analysis software); 2 pages; retrieved from the Internet (http://static.highbeam.eom/t/toolingampproduction/november011996/simulatingstressputonfa..); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
Imani et al.; A wearable chemical-electrophysiological hybrid biosensing system for real-time health and fitness monitoring; Nature Communications; 7; 11650. doi 1038/ncomms11650; 7 pages; May 23, 2016.
Invisalign; You were made to move. There's never been a better time to straighten your teeth with the most advanced clear aligner in the world; Product webpage; 2 pages; retrieved from the internet (www.invisalign.com/) on Dec. 28, 2017.
Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); pp. 18184-18189; Oct. 14, 2014.

JCO Interviews; Craig Andreiko, DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jeerapan et al.; Stretchable biofuel cells as wearable textile-based self-powered sensors; Journal of Materials Chemistry A; 4(47); pp. 18342-18353; Dec. 21, 2016.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kim et al.; Advanced materials for printed wearable electrochemical devices: A review; Advanced Electronic Materials; 3(1); 15 pages; 1600260; Jan. 2017.
Kim et al.; Noninvasive alcohol monitoring using a wearable tatto-based iontophoretic-biosensing system; Acs Sensors; 1(8); pp. 1011-1019; Jul. 22, 2016.
Kim et al.; Non-invasive mouthguard biosensor for continuous salivary monitoring of metabolites; Analyst; 139(7); pp. 1632-1636; Apr. 7, 2014.
Kim et al.; A wearable fingernail chemical sensing platform: pH sensing at your fingertips; Taianta; 150; pp. 622-628; Apr. 2016.
Kim et al.; Wearable salivary uric acid mouthguard biosensor with integrated wireless electronics; Biosensors and Bioelectronics; 74; pp. 1061-1068; 19 pages; (Author Manuscript); Dec. 2015.
Kleeman et al.; The Speed Positioner; J. Clin. Orthod.; 30(12); pp. 673-680; Dec. 1996.
Kochanek; Interpolating Splines with Local Tension, Continuity and Bias Control; Computer Graphics; 18(3); pp. 33-41; Jan. 1, 1984.
Kumar et al.; All-printed, stretchable Zn—Ag2o rechargeable battery via, hyperelastic binder for self-powering wearable electronics; Advanced Energy Materials; 7(8); 8 pages; 1602096; Apr. 2017.
Kumar et al.; Biomarkers in orthodontic tooth movement; Journal of Pharmacy Bioallied Sciences; 7(Suppl 2); pp. S325-S330; 12 pages; (Author Manuscript); Aug. 2015.
Kumar et al.; Rapid maxillary expansion: A unique treatment modality in dentistry; J. Clin. Diagn. Res.; 5(4); pp. 906-911; Aug. 2011.
Kunii et al.; Articulation Simulation for an Intelligent Dental Care System; Displays; 15(3); pp. 181-188; Jul. 1994.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.

(56) References Cited

OTHER PUBLICATIONS

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.

McCann; Inside the ADA; J. Amer. Dent. Assoc, 118:286-294; Mar. 1989.

McNamara et al.; Invisible Retainers; J. Clin Orthod.; pp. 570-578; 11 pages; (Author Manuscript); Aug. 1985.

McNamara et al.; Orthodontic and Orthopedic Treatment in the Mixed Dentition; Needham Press; pp. 347-353; Jan. 1993.

Moermann et al., Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments—As Easy As One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.

Nahoum; The Vacuum Formed Dental Contour Appliance; N. Y. State Dent. J.; 30(9); pp. 385-390; Nov. 1964.

Nash; CEREC CAD/CAM Inlays: Aesthetics and Durability in a Single Appointment; Dentistry Today; 9(8); pp. 20, 22-23 and 54; Oct. 1990.

Nedelcu et al.; "Scanning Accuracy And Precision In 4 Intraoral Scanners: An In Vitro Comparison Based On 3-Dimensional Analysis"; J. Prosthet. Dent.; 112(6); pp. 1461-1471; Dec. 2014.

Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.

Ogawa et al.; Mapping, profiling and clustering of pressure pain threshold (PPT) in edentulous oral muscosa; Journal of Dentistry; 32(3); pp. 219-228; Mar. 2004.

Ogimoto et al.; Pressure-pain threshold determination in the oral mucosa; Journal of Oral Rehabilitation; 29(7); pp. 620-626; Jul. 2002.

Parrilla et al.; A textile-based stretchable multi-ion potentiometric sensor; Advanced Healthcare Materials; 5(9); pp. 996-1001; May 2016.

Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.

Pinkham; Foolish Concept Propels Technology; Dentist, 3 pages , Jan./Feb. 1989.

Pinkham; Inventor's CAD/CAM May Transform Dentistry; Dentist; pp. 1 and 35, Sep. 1990.

Ponitz; Invisible retainers; Am. J. Orthod.; 59(3); pp. 266-272; Mar. 1971.

Procera Research Projects; Procera Research Projects 1993 Abstract Collection; 23 pages; (year of pub. sufficiently earlier than effective US filing date and any foreign priority date) 1993.

Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.

Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.

Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.

Redmond et al.; Clinical Implications of Digital Orthodontics; American Journal of Orthodontics and Dentofacial Orthopedics; 117(2); pp. 240-242; Feb. 2000.

Rekow et al.; CAD/CAM for Dental Restorations—Some of the Curious Challenges; IEEE Transactions on Biomedical Engineering; 38(4); pp. 314-318; Apr. 1991.

Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.

Rekow; A Review of the Developments in Dental CAD/CAM Systems; Current Opinion in Dentistry; 2; pp. 25-33; Jun. 1992.

Rekow; CAD/CAM in Dentistry: A Historical Perspective and View of the Future; Journal Canadian Dental Association; 58(4); pp. 283, 287-288; Apr. 1992.

Rekow; Computer-Aided Design and Manufacturing in Dentistry: A Review of the State of the Art; Journal of Prosthetic Dentistry; 58(4); pp. 512-516; Dec. 1987.

Rekow; Dental CAD-CAM Systems: What is the State of the Art?; The Journal of the American Dental Association; 122(12); pp. 43-48; Dec. 1991.

Rekow; Feasibility of an Automated System for Production of Dental Restorations, Ph.D. Thesis; Univ. of Minnesota, 250 pages, Nov. 1988.

Richmond et al.; The Development of the PAR Index (Peer Assessment Rating): Reliability and Validity.; The European Journal of Orthodontics; 14(2); pp. 125-139; Apr. 1992.

Richmond et al.; The Development of a 3D Cast Analysis System; British Journal of Orthodontics; 13(1); pp. 53-54; Jan. 1986.

Richmond; Recording The Dental Cast In Three Dimensions; American Journal of Orthodontics and Dentofacial Orthopedics; 92(3); pp. 199-206; Sep. 1987.

Rudge; Dental Arch Analysis: Arch Form, A Review of the Literature; The European Journal of Orthodontics; 3(4); pp. 279-284; Jan. 1981.

Sahm et al.; "Micro-Electronic Monitoring Of Functional Appliance Wear"; Eur J Orthod.; 12(3); pp. 297-301; Aug. 1990.

Sahm; Presentation of a wear timer for the clarification of scientific questions in orthodontic orthopedics; Fortschritte der Kieferorthopadie; 51 (4); pp. 243-247; (Translation Included) Jul. 1990.

Sakuda et al.; Integrated Information-Processing System In Clinical Orthodontics: An Approach with Use of a Computer Network System; American Journal of Orthodontics and Dentofacial Orthopedics; 101(3); pp. 210-220; 20 pages; (Author Manuscript) Mar. 1992.

Schafer et al.; "Quantifying patient adherence during active orthodontic treatment with removable appliances using microelectronic wear-time documentation"; Eur J Orthod.; 37(1)pp. 1-8; doi:10.1093/ejo/cju012; Jul. 3, 2014.

Schellhas et al.; Three-Dimensional Computed Tomography in Maxillofacial Surgical Planning; Archives of Otolaryngology—Head and Neck Surgery; 114(4); pp. 438-442; Apr. 1988.

Schroeder et al; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.

Shilliday; Minimizing finishing problems with the mini-positioner; American Journal of Orthodontics; 59(6); pp. 596-599; Jun. 1971.

Shimada et al.; Application of optical coherence tomography (OCT) for diagnosis of caries, cracks, and defects of restorations; Current Oral Health Reports; 2(2); pp. 73-80; Jun. 2015.

Siemens; CEREC—Computer-Reconstruction, High Tech in der Zahnmedizin; 15 pagesl; (Includes Machine Translation); (year of pub. sufficiently earlier than effective US filing date and any foreign priority date); 2004.

(56) References Cited

OTHER PUBLICATIONS

Sinclair; The Readers' Corner; Journal of Clinical Orthodontics; 26(6); pp. 369-372; 5 pages; retrived from the internet (http://www.jco-online.com/archive/print article.asp?Year=1992&Month=06&ArticleNum=); Jun. 1992.

Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.

Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.

Sturman; Interactive Keyframe Animation of 3-D Articulated Models; Proceedings Graphics Interface '84; vol. 86; pp. 35-40; May-Jun. 1984.

The American Heritage, Stedman's Medical Dictionary; Gingiva; 3 pages; retrieved from the interent (http://reference.com/search/search?q=gingiva) on Nov. 5, 2004.

The Dental Company Sirona: Cerc omnicam and cerec bluecam brochure: The first choice in every case; 8 pages; (year of pub. sufficiently earlier than effective US filing date and any foreign priority date) 2014.

Thera Mon; "Microsensor"; 2 pages; retrieved from the internet (www.english.thera-mon.com/the-product/transponder/index.html); on Sep. 19, 2016.

Thorlabs; Pellin broca prisms; 1 page; retrieved from the internet (www.thorlabs.com); Nov. 30, 2012.

Tiziani et al.; Confocal principle for macro and microscopic surface and defect analysis; Optical Engineering; 39(1); pp. 32-39; Jan. 1, 2000.

Truax; Truax Clasp-Less(TM) Appliance System; The Functional Orthodontist; 9(5); pp. 22-24, 26-28; Sep.-Oct. 1992.

Tru-Tatn Orthodontic & Dental Supplies, Product Brochure, Rochester, Minnesota 55902, 16 pages; (year of pub. sufficiently earlier than effective US filing date and any foreign priority date) 1996.

U.S. Department of Commerce, National Technical Information Service, Holodontography: An Introduction to Dental Laser Holography; School of Aerospace Medicine Brooks AFB Tex; Mar. 1973, 40 pages; Mar. 1973.

U.S. Department of Commerce, National Technical Information Service; Automated Crown Replication Using Solid Photography SM; Solid Photography Inc., Melville NY,; 20 pages; Oct. 1977.

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

Van Der Linden et al.; Three-Dimensional Analysis of Dental Casts by Means of the Optocom; Journal of Dental Research; 51(4); p. 1100; Jul.-Aug. 1972.

Van Der Linden; A New Method to Determine Tooth Positions and Dental Arch Dimensions; Journal of Dental Research; 51(4); p. 1104; Jul.-Aug. 1972.

Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.

Van Hilsen et al.; Comparing potential early caries assessment methods for teledentistry; BMC Oral Health; 13(16); doi: 10.1186/1472-6831-13-16; 9 pages; Mar. 2013.

Varady et al.; Reverse Engineering Of Geometric Models An Introduction; Computer-Aided Design; 29(4); pp. 255-268; 20 pages; (Author Manuscript); Apr. 1997.

Verstreken et al.; An Image-Guided Planning System for Endosseous Oral Implants; IEEE Transactions on Medical Imaging; 17(5); pp. 842-852; Oct. 1998.

Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.

Warunek et.al.; Clinical Use of Silicone Elastomer Applicances; JCO; 23 (10); pp. 694-700; Oct. 1989.

Watson et al.; Pressures recorded at te denture base-mucosal surface interface in complete denture wearers; Journal of Oral Rehabilitation 14(6); pp. 575-589; Nov. 1987.

Wells; Application of the Positioner Appliance in Orthodontic Treatment; American Journal of Orthodontics; 58(4); pp. 351-366; Oct. 1970.

Wikipedia; Palatal expansion; 3 pages; retrieved from the internet (https://en.wikipedia.org/wiki/Palatal_expansion) on Mar. 5, 2018.

Williams; Dentistry and CAD/CAM: Another French Revolution; J. Dent. Practice Admin.; 4(1); pp. 2-5 Jan./Mar. 1987.

Williams; The Switzerland and Minnesota Developments in CAD/CAM; Journal of Dental Practice Administration; 4(2); pp. 50-55; Apr./Jun. 1987.

Windmiller et al.; Wearable electrochemical sensors and biosensors: a review; Electroanalysis; 25(1); pp. 29-46; Jan. 2013.

Wireless Sensor Networks Magazine; Embedded Teeth for Oral Activity Recognition; 2 pages; retrieved on Sep. 19, 2016 from the internet (www.wsnmagazine.com/embedded-teeth/); Jul. 29, 2013.

Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.

Witt et al.; The wear-timing measuring device in orthodontics-cui bono? Reflections on the state-of-the-art in wear-timing measurement and compliance research in orthodontics; Fortschr Kieferorthop.; 52(3); pp. 117-125; (Translation Included) Jun. 1991.

Wolf; Three-dimensional structure determination of semi-transparent objects from holographic data; Optics Communications; 1(4); pp. 153-156; Sep. 1969.

WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.

Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.

Yamada et al.; Simulation of fan-beam type optical computed-tomography imaging of strongly scattering and weakly absorbing media; Applied Optics; 32(25); pp. 4808-4814; Sep. 1, 1993.

Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.

Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.

Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.

Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.

Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.

Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.

Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.

(56) References Cited

OTHER PUBLICATIONS

Zhou et al.; Bio-logic analysis of injury biomarker patterns in human serum samples; Talanta; 83(3); pp. 955-959; Jan. 15, 2011.
Zhou et al.; Biofuel cells for self-powered electrochemical biosensing and logic biosensing: A review; Electroanalysis; 24(2); pp. 197-209; Feb. 2012.
Grove et al.; U.S. Appl. No. 15/726,243 entitled "Interproximal reduction templates," filed Oct. 5, 2017.
Sato et al.; U.S. Appl. No. 16/041,606 entitled "Palatal contour anchorage," filed Jul. 20, 2018.
Sato et al.; U.S. Appl. No. 16/048,054 entitled "Optical coherence tomography for orthodontic aligners," filed Jul. 27, 2018.
Miller et al.; U.S. Appl. No. 16/038,088 entitled "Method and apparatuses for interactive ordering of dental aligners," filed Jul. 17, 2018.
Moalem et al.; U.S. Appl. No. 16/046,897 entitled Tooth shading, transparency and glazing, filed Jul. 26, 2018.
Nyukhtikov et al.; U.S. Appl. No. 15/998,883 entitled "Buccal corridor assessment and computation," filed Aug. 15, 2018.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
Elbaz et al.; U.S. Appl. No. 16/188,262 entitled "Intraoral scanner with dental diagnostics capabilities," filed Nov. 12, 2018.

\* cited by examiner

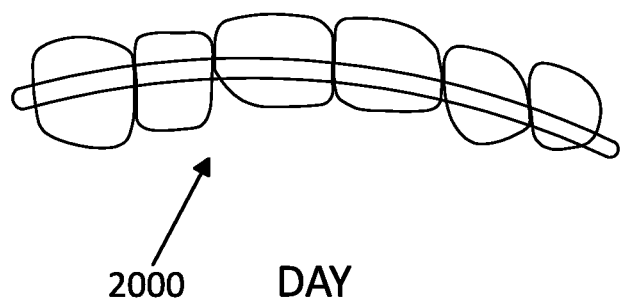
2000    DAY
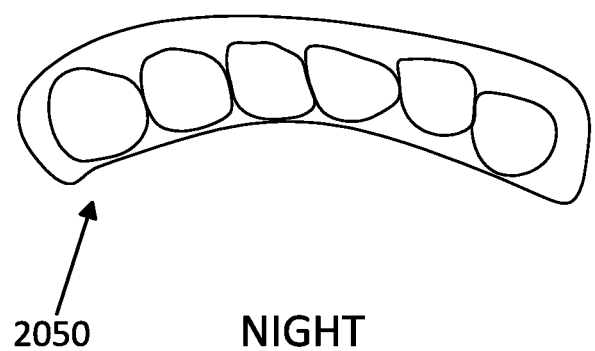
2050    NIGHT
FIG. 20

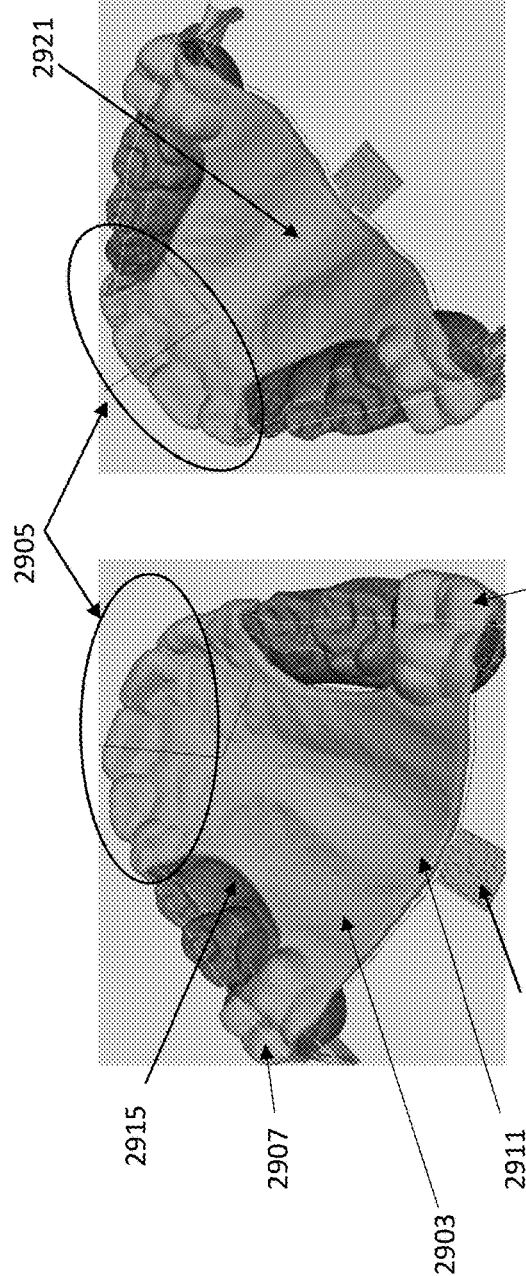
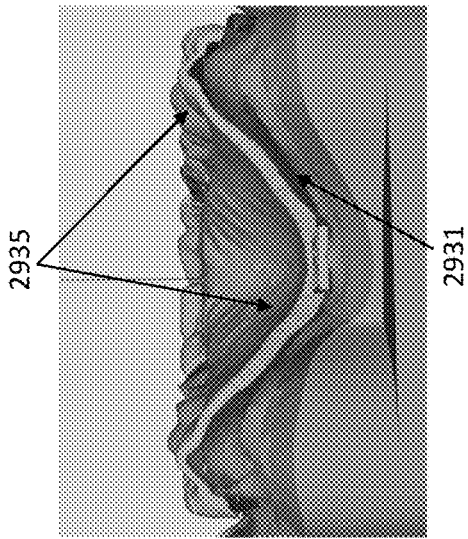
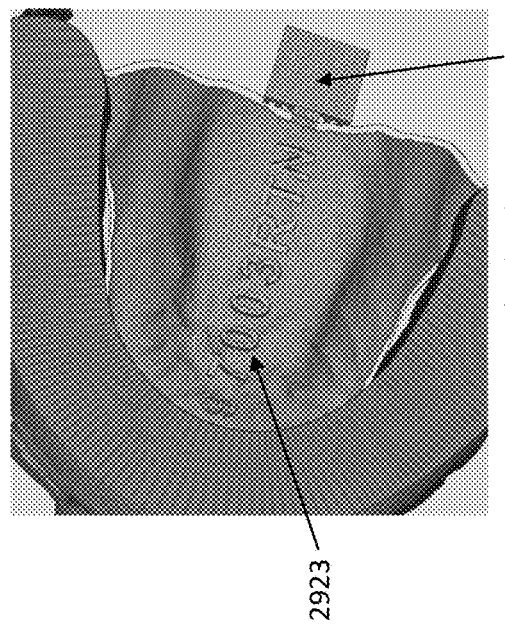
FIG. 29A
FIG. 29B
FIG. 29C
FIG. 29D

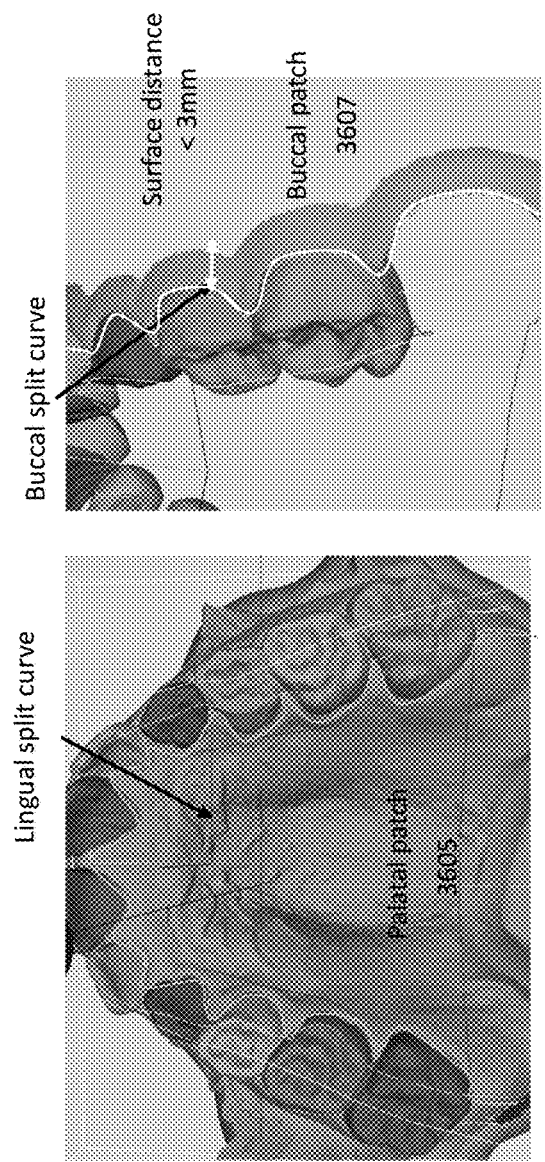
FIG. 36A
FIG. 36B
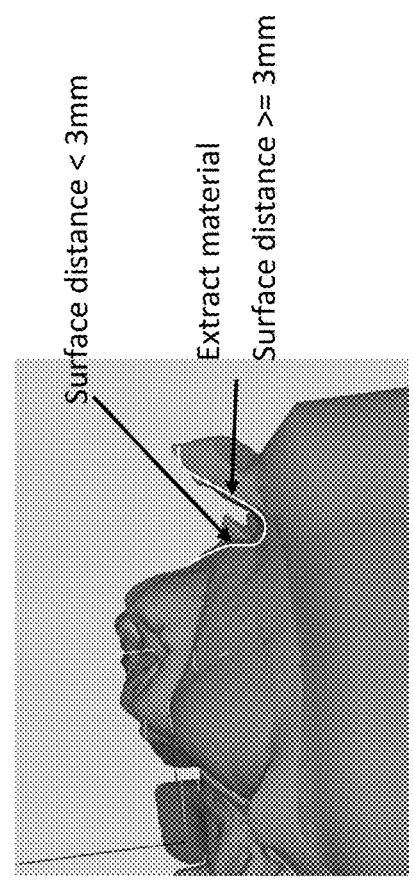
FIG. 36C

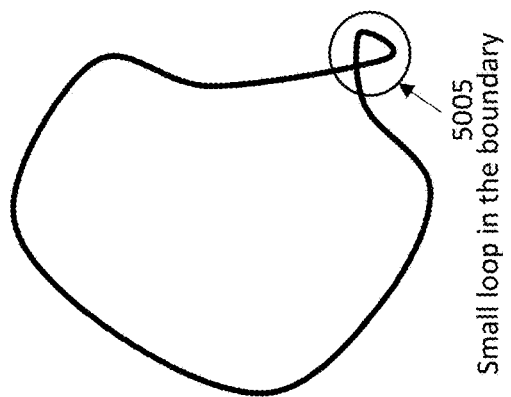
FIG. 50A Small loop in the boundary 5005
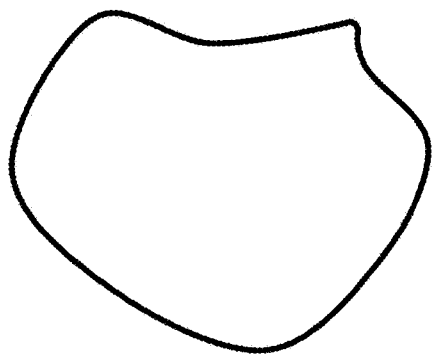
FIG. 50B Loop is removed
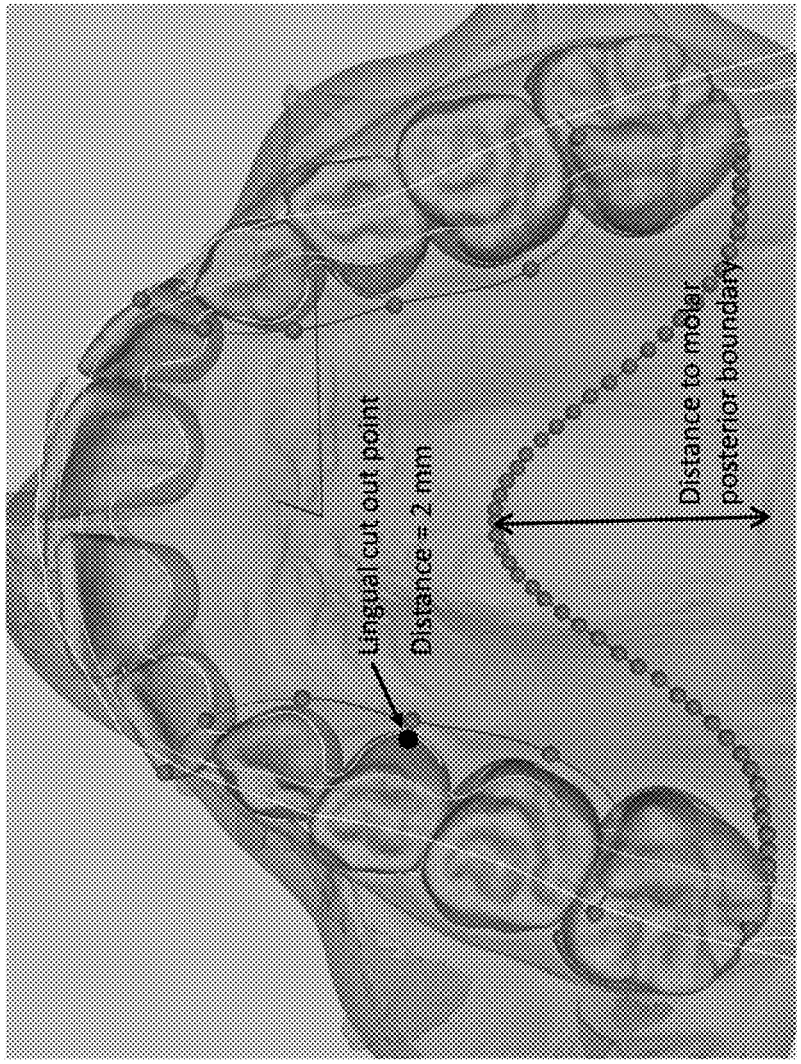
FIG. 49

Point A is moved B by T, then adjusted to C, so the min distance to bottom surface is T.

CUSTOMIZED FABRICATION OF ORTHODONTIC RETAINERS BASED ON PATIENT ANATOMY

CROSS REFERENCE TO RELATED APPLICATIONS

This patent application claims priority to U.S. Provisional Patent Application No. 62/588,303, filed on Nov. 17, 2017 ("ORTHODONTIC RETAINERS") and U.S. Provisional Patent Application No. 62/598,454, filed on Dec. 13, 2017 ("ORTHODONTIC RETAINERS"), each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The present application relates to dental retainer devices and methods for preparing dental retainer devices.

BACKGROUND

Currently patient-specific retainers are often made via thermoforming to a mold made from the patient's dental anatomy. Typically the mold is made of the patient dental anatomy while the patient is at the doctor's office. The thermoforming process limits the geometries that can be manufactured for the patient-specific retainer in many cases. Improved methods for making the patient-specific retainers with more complex geometry are desired. The additional geometries that can be employed for the patient-specific retainer allow the manufacture of improved patient-specific retainers. The additional customization can also provide an improved workflow for the doctor treating the specific needs of the patient. Thus, there is a need for improved patient-specific retainers and methods of making and using the same. Described herein are devices and methods that may address these needs.

SUMMARY OF THE DISCLOSURE

Described herein are dental retainer devices, methods for making dental retainer devices, methods for using dental retainer devices, and methods for preparing patient-specific dental retainer devices.

Typically, these dental retainer devices are configured to be worn in a patient's mouth and may generally include: a unitary body formed of a retainer material, the unitary body including different thicknesses, the unitary body defining regions including: an anterior teeth region configured to hold a patient's anterior teeth within a pocket having lingual, occlusal, and buccal sides; a first posterior teeth region and a second posterior teeth region each configured to hold the patient's molars in a pocket having lingual, occlusal, and buccal sides; and a palatal region configured to extend between the posterior teeth regions, adjacent to the patient's palate. The buccal side includes the labial side (e.g., for anterior teeth), as used herein.

The unitary body may be fabricated as a single or uniform material (e.g., as a monolithic apparatus). Thus, the unitary body may be formed without any joins (e.g. joints) or connections, although it may include regions of different thicknesses; the minimum thicknesses through the uniform body (e.g., from a top surface to a bottom surface) may vary across the device, e.g., by 5% or more (e.g., 7% or more, 10% or more, 15% or more, 20% or more, 25% or more, 30% or more, 35% or more, 40% or more, 50% or more, etc.).

The unitary body is typically formed of a retainer material. The retainer material may be any material appropriate to act as a biocompatible retainer for use in a patient's mouth. For example, the retainer material may be a polymeric material (including plastics), metals, ceramics, etc. Polymeric materials, and in particular those that may be shaped using an additive printing (e.g., 3D printing) and may be formed of a material that resists bending and/or deformation. For example, the unitary body may have a hardness measured by ShoreA durometer of 70 or greater (e.g., 72 or greater, 75 or greater, 77 or greater, 80 or greater, 82 or greater, etc.), or a Shore D durometer of greater than 45, or a Rockwell R durometer of greater than 50. This may be contrasted with dental appliances (including dental retainers), which may typically be softer, and more elastic. For example, the retainer material may comprise nylon.

The unitary body may be configured to mate with the patient's upper or lower dental arch. Generally, the unitary body, while a unitary structure, may be observed to have different functional regions, which may have different structural characteristics. These different regions may include an anterior teeth region that is configured to hold a patient's anterior teeth within a pocket that may have lingual, occlusal, and/or buccal sides. The anterior teeth region may be customized specifically to mate with a particular patient's front teeth (e.g., incisors and/or canines). The pocket may refer to a channel, shell, receptacle, compartment, hollow, or cavity. The pocket may define interior walls that conform to one or more of the outer tooth surfaces (e.g., buccal, lingual and/or occlusal surfaces). In some variations, the pocket may be a plurality of connected individual tooth pockets that form a continuous channel, with the different individual pocket regions within the channel configured to fit against a particular tooth.

The unitary body may also include a first posterior teeth region and/or a second posterior teeth region that are configured to hold the patient's molars (and in some variations, premolars) in a channel or pocket having one or more of lingual, occlusal, and buccal sides. As with the anterior teeth region, the pocket of the first and second posterior teeth region may refer to a channel, shell, receptacle, compartment, hollow, or cavity, and may define interior walls that conform to one or more of the outer tooth surfaces (e.g., buccal, lingual and/or occlusal surfaces). In some variations, the pocket may be a plurality of connected individual tooth pockets that form a continuous channel, with the different individual pocket regions within the channel configured to fit against a particular tooth. The pockets of the individual regions (sub-regions) may be continuous; for example, in variations having both the first and second posterior teeth region and an anterior teeth region, the pocket of the first posterior teeth region and the pocket of the second posterior teeth region maybe continuous with the pocket of the anterior teeth region.

The unitary body may also include a palatal region configured to extend between the teeth-receiving cavities (e.g., the posterior teeth region) and adjacent to the patient's palate. The palatal region may extend and connect to any of the first and second posterior teeth region and an anterior teeth region (e.g., to a buccal side). The palatal region may be configured to be positioned against the palate, or offset from all or a portion of the patient's palate by some amount (e.g., 0.1 mm or more, between 0.1 mm and 10 mm, 0.2 mm and 5 mm, etc.). Thus, the palatal region may be configured to be adjacent to but not contact a palate of the patient when the patient is wearing the device.

The outer surface of the unitary body may be shaped to resemble the patient's teeth, or it may be shaped differently from the patient's teeth. In general, the outer surface of the unitary body may be colored and/or patterned (including patterns of one or more of: colors, shapes, text, images, icons, emojis, cartoon characters, pictures, etc.), or it may be transparent or translucent.

The dental retainer devices described herein may be configured so that one or more of the regions is missing or partial. For example, the dental retainer device may be formed of a unitary body that includes a first posterior teeth region and a second posterior teeth region and a palatal region (but no anterior teeth region, or a partial anterior tooth region comprising just a lingual side). A dental retainer device may be formed of an anterior teeth region, and a palatal region (but no first posterior teeth region and a second posterior teeth region, or a partial first posterior teeth region and partial second posterior teeth region having, e.g., just a lingual side). A dental retainer device may include an anterior teeth region, a palatal region and a partial first posterior teeth region and a partial second posterior teeth region, in which the first and second posterior teeth regions include just lingual and buccal (but not occlusal) sides. Other examples are described herein.

For example, a dental retainer device configured to be worn in a patient's mouth may include: a unitary body formed of a retainer material, the unitary body including different thicknesses, the unitary body defining regions including: an anterior teeth region configured to hold anterior teeth within a pocket having lingual, occlusal, and buccal sides; a first posterior teeth region and a second posterior teeth region, each having a lingual surface wherein the first posterior teeth region and the second posterior teeth region are open on an occlusal side, further wherein the lingual surface of the first and second posterior teeth regions are configured to conform to the patient's molars. The unitary body may further comprise a palatal region extending between the first and second posterior regions and the anterior teeth region, wherein the palatal region is configured to be worn adjacent to the subject's palate.

The palatal region may be solid, or it may comprise a plurality of strips extending between the first and second posterior regions. The first and second posterior teeth regions may comprise a buccal surface configured to conform the patient's molars. The retainer may be solid or it may include one or more pores, openings, gaps, etc. Any of the retainers described herein may be monolithic (e.g., formed of a single material) or may include additional materials.

A dental retainer device configured to be worn in a patient's mouth may include: a unitary body formed of a retainer material, the unitary body including different thicknesses, the unitary body defining regions including: an anterior teeth region configured to conform to the patient's anterior teeth at a lingual side but not on a buccal side; and a first posterior teeth region and a second posterior teeth region, wherein the first and second posterior teeth regions are each configured to hold molars in a pocket having lingual and buccal sides with an opening on an occlusal side. The unitary body may further include a palatal region extending between the first posterior teeth region and the second posterior teeth region, and wherein the palatal region is configured to be adjacent to the patient's palate when the patient is wearing the device.

A dental retainer device may be configured to be worn in a patient's mouth and may include: a unitary body formed of a retainer material, the unitary body including different thicknesses, the unitary body defining regions including: an anterior teeth region configured to conform to the patient's anterior teeth at a lingual side but not on a buccal side; and a first posterior teeth region and a second posterior teeth region, wherein the first and second posterior teeth regions are each configured to hold molars in a pocket having lingual, buccal and occlusal sides. The unitary body may further comprise a palatal region extending between the first posterior teeth region and the second posterior teeth region, and wherein the palatal region is configured to be adjacent to the patient's palate when the patient is wearing the device.

A dental retainer device configured to be worn in a patient's mouth may include: a unitary body formed of a retainer material, the unitary body including different thicknesses, the unitary body defining regions including: an anterior teeth region configured to hold anterior teeth within a pocket having lingual, occlusal, and buccal sides; a first posterior teeth region and a second posterior teeth region each configured to engage with molars on a lingual side; and a palatal region between the first posterior teeth region, the second posterior teeth region and the anterior teeth region, wherein the palatal region is configured to extend adjacent to the patient's palate when a patient is wearing the device.

A dental retainer device configured to be worn in a patient's mouth may include: a unitary body formed of a retainer material, the unitary body including different thicknesses, the unitary body defining regions including: an anterior teeth region configured to engage anterior teeth on a lingual side and a buccal side but open on an occlusal side; a first posterior teeth region and a second posterior teeth region each configured to hold molars in a between a lingual side and a buccal side, wherein the lingual and buccal sides are configured to conform to the patient's teeth when the patient is wearing the device.

Each of the first and second posterior teeth regions may further comprise an occlusal surface extending between the lingual side and the buccal side; further wherein the occlusal surface only partially covers the occlusal surface of the patient's molars when the patient is wearing the device. Any of these apparatuses may have one or more bridge regions (bridges) between the buccal and lingual portions of the apparatus that are configured to fit into the interproximal areas in order to connect the two sides (e.g. for stiffening) but that have a low profile such that they do not extend beyond the patient's occlusal surfaces, and are configured not to contact the opposing jaw before the opposing teeth make contact, thus avoiding the tendency for posterior open bite.

The unitary body may further comprise a palatal region extending between the first posterior teeth region and the second posterior teeth region, and wherein the palatal region is configured to be adjacent to the patient's palate when the patient is wearing the device.

A dental retainer device configured to be worn in a patient's mouth may include: a unitary body formed of a retainer material, the unitary body including different thicknesses, the unitary body defining regions including: an anterior teeth region configured to hold anterior teeth within a pocket having lingual and buccal sides, the anterior teeth region including an opening on an occlusal side; a first posterior teeth region and a second posterior teeth region each configured to hold molars in a pocket having lingual, occlusal, and buccal sides, wherein the first posterior teeth region and second posterior teeth region include openings on an occlusal side; and a palatal region configured to extend adjacent to a palate between the first posterior teeth region and the second posterior teeth region and the anterior teeth region.

A dental retainer device configured to be worn in a patient's mouth may include: a unitary body formed of a retainer material, the unitary body including different thicknesses, the unitary body defining regions including: an anterior teeth region configured to hold anterior teeth within a pocket having lingual, occlusal, and buccal sides; a first posterior teeth region and a second posterior teeth region each configured to hold molars in a pocket having lingual, occlusal, and buccal sides; and a palatal region extending between the first posterior teeth region and the second posterior teeth region and configured to be adjacent to the patient's palate when the device is worn by the patient, wherein the palatal region includes one or more openings between the anterior teeth region and the palatal region.

In general, the unitary body may include a protrusion, tab, hook, or other attachment structure configured to attach a rubber band. For example, the unitary body may include a slot configured to attach a rubber band.

The unitary body may include a mandibular advancement feature. For example, a mandibular advancement feature may be a block, ramp, or other surface shape extending from of the unitary body which may engage with another surface feature (e.g., block, ramp, etc.) on an opposite jaw (e.g., on a second unitary body worn on the opposite jaw).

In any of the apparatuses described herein, the unitary body may include a gingival support region. For example, the unitary body may include a region extending down to and at least partially over the gingiva. In some variations the gingival support region extends apart from the gingiva by some amount (e.g., between 0.1 mm and 10 mm, between 0.1 mm and 5 mm, between 0.1 mm and 3 mm, etc.).

In any of the apparatuses described herein, the unitary body may include a thickened base region. For example, the region near the gingiva may be thicker (e.g., >5%, >10%, >15%, >20%, >25%, >30%, >35%, >40%, >45%, >50%, etc. thicker) than the region(s) above this base region.

Any of the unitary bodies described herein may include a plurality of ridges. Alternatively or additionally, any of these apparatuses may include a bias (e.g., a bias element, spring, spring element, etc.) attached to or integral with the unitary body. A biasing element may be a spring (e.g., leaf spring, etc.) or other structure configured to apply a force.

The palatal region may be configured to engage with a palate of the patient when the patient is wearing the device. Any of these apparatuses may include an interproximal support feature, which may include one or more open spaces, and/or a second material that is less rigid than the retainer material (e.g. has a durometer that is less than the durometer of the retainer material). For example, the apparatus may include an interproximal support feature having a rigidity that is less rigid than the unitary body formed of the retainer material.

Also described herein are methods of making patient-specific dental retainer apparatus (e.g., device, system, etc.). For example a method of making a patient-specific dental retainer device may include: receiving a scan of a patient's dental arch, including a plurality of teeth; and manufacturing the patient-specific retainer based on the scan by additive manufacturing, wherein the patient-specific retainer is any of the retainers described herein.

Also described herein are methods of retaining the position of a patient's teeth following an orthodontic treatment. For example a method of retaining the position of a patient's teeth following an orthodontic treatment may include: wearing a series of aligners configured to progressively move the patient's teeth; and wearing a retainers such as any of the retainers described herein (which are configured specifically to fit the patient's teeth, and particularly the final position of the patient's teeth following treatment with the series of aligners).

Also described herein are methods of planning a patient-specific retainer device and apparatuses (including software, firmware, hardware, etc.) for implementing these methods. For example a method of planning a patient-specific retainer device may include: receiving a three-dimensional representation of a patient dental anatomy; displaying at least a portion of the three-dimensional representation of the patient dental anatomy; providing one or more options associated with retainer configurations, the one or more options including a palatal configuration, an anterior teeth coverage configuration, and a posterior teeth coverage configuration; providing one or more add-on options for the retainer; receiving responses or instructions to the one or more options and one or more add-on options; and preparing a model of a custom retainer based on the patient dental anatomy and the responses or instructions to the one or more options and one or more add-on options.

The method may be interactive. For example, the designer (e.g., dental professional) may be presented with an interactive display (e.g., 3D model) of the patient's oral cavity including the dental arch (one or more of: teeth, gingiva, palate, etc. for upper arch and/or one or more of teeth, gingiva, etc. for the lower arch) and/or a modified/projected display of the final position of the patient's teeth and/or palate. The designer may then select among various features for the retainer, including which regions (anterior teeth region, first and second posterior teeth regions, palatal regions, etc.) and more specifically, various shapes and configurations for these regions, to include. The regions may be customized to the 3D model of the patient's oral cavity.

Any of these methods may include: displaying an image of the custom retainer overlying the three-dimensional representation of the patient dental anatomy.

The anterior teeth coverage configuration and the posterior teeth coverage configuration may include options for buccal coverage, lingual coverage, and occlusal coverage for the anterior teeth and the posterior teeth.

These methods (and an apparatus implementing them) may include add-on options for the retainer include one or more of: a protrusion, tab, hook, or other attachment structure configured to attach a rubber band, a slot configured to attach a rubber band, a mandibular advancement feature, an interproximal support feature, a ramp, a gingival support region, a thickened base region, and a plurality of ridges.

In particular, described herein are method of forming a retainer, the method comprising: gathering a three-dimensional (3D) model of a patient's dentition; translating a target arrangement of the patient's teeth from the 3D model of the patient's dentition into a two-dimensional (2D) height map of the patient's dentition; defining a boundary of a retainer configured to fit onto the patient's dentition; building a 2D mesh of an upper surface of the patient's dentition from the 2D height map; converting the 2D mesh of the upper surface of the patient's dentition into a 3D mesh of the upper surface of the patient's dentition; forming a bottom surface of a digital model of the retainer using the 3D mesh of the upper surface; forming a top surface of the digital model of the retainer having different thicknesses between the top surface and bottom surfaces of the digital model of the retainer; and exporting the digital model of the retainer for 3D printing.

For example, a method of forming a retainer may include: gathering a three-dimensional (3D) model of a patient's dentition and a target arrangement of the patient's teeth; translating the target arrangement of the patient's teeth in from the 3D model of the patient's dentition into a two-dimensional (2D) height map of the patient's dentition; defining a boundary of a retainer configured to fit onto the patient's dentition when the patient's teeth are in the target arrangement; building a 2D mesh of an upper surface of the patient's dentition from the 2D height map using the boundary; converting the 2D mesh of the upper surface of the patient's dentition into a 3D mesh of the upper surface of the patient's dentition; forming a bottom surface of a digital model of the retainer using the 3D mesh of the upper surface; forming a top surface of the digital model of the retainer at different thicknesses between the top surface and bottom surface of the digital model of the retainer; adjusting one or more of the smoothness of the top surface of the distal model of the retainer and the thickness between the top surface and the bottom surface of the digital model of the retainer; and exporting the digital model of the retainer for 3D printing.

Also described herein are systems configured to perform any of the methods described herein. In general, these method may include one or more processors and a memory coupled to the one or more processors that is configured to store instructions that, when executed by the one or more processors perform the method. For example, described herein are systems comprising: one or more processors; a memory coupled to the one or more processors, the memory configured to store instructions, that, when executed by the one or more processors, perform a computer-implemented method comprising: gathering a three-dimensional (3D) model of a patient's dentition; translating a target arrangement of the patient's teeth from the 3D model of the patient's dentition into a two-dimensional (2D) height map of the patient's dentition; defining a boundary of a retainer configured to fit onto the patient's dentition; building a 2D mesh of an upper surface of the patient's dentition from the 2D height map; converting the 2D mesh of the upper surface of the patient's dentition into a 3D mesh of the upper surface of the patient's dentition; forming a bottom surface of a digital model of the retainer using the 3D mesh of the upper surface; forming a top surface of the digital model of the retainer having different thicknesses between the top surface and bottom surfaces of the digital model of the retainer; and exporting the digital model of the retainer for 3D printing.

For example a system (e.g., for forming or designing a retainer) may include: one or more processors; a memory coupled to the one or more processors, the memory configured to store instructions, that, when executed by the one or more processors, perform a computer-implemented method comprising: gathering a three-dimensional (3D) model of a patient's dentition and a target arrangement of the patient's teeth; translating the target arrangement of the patient's teeth in from the 3D model of the patient's dentition into a two-dimensional (2D) height map of the patient's dentition; defining a boundary of a retainer configured to fit onto the patient's dentition when the patient's teeth are in the target arrangement; building a 2D mesh of an upper surface of the patient's dentition from the 2D height map using the boundary; converting the 2D mesh of the upper surface of the patient's dentition into a 3D mesh of the upper surface of the patient's dentition; forming a bottom surface of a digital model of the retainer using the 3D mesh of the upper surface; forming a top surface of the digital model of the retainer at different thicknesses between the top surface and bottom surface of the digital model of the retainer; adjusting one or more of the smoothness of the top surface of the distal model of the retainer and the thickness between the top surface and the bottom surface of the digital model of the retainer; and exporting the digital model of the retainer for 3D printing.

Any of these methods and systems may include smooth the edges between the bottom surface and the top surface of the digital model of the retainer. Any of these methods and systems may be configured to add an identifying code on one or more surfaces of the digital model of the retainer (e.g., an alphanumeric code, QR code, etc.). Any of these methods and systems may be configured to build a matrix mesh of the digital model of the retainer, wherein exporting the digital model of the retainer comprises converting the matrix mesh into a stereolithographic (STL) file format.

In any of these methods and systems, building the 2D mesh of the upper surface of the patient's dentition may comprise building the 2D mesh from the 2D height map using the boundary. Building the 2D mesh of the upper surface of the patient's dentition from the 2D height map may include triangulating the 2D height map. Forming the bottom surface of the digital model of the retainer using the 3D mesh of the upper surface may comprise smoothing the bottom surface to remove any sharp corners. For example, forming the bottom surface of the digital model of the retainer using the 3D mesh of the upper surface may comprise smoothing the bottom surface by setting starting points forming the bottom surface that are initially on the 3D mesh of the upper surface and dilating and eroding the starting points at a minimum distance from the 3D mesh of the upper surface.

In any of these methods and systems, gathering the three-dimensional (3D) model of a patient's dentition may include gathering a digital scan of the patient's jaw and a treatment file including the target arrangement of teeth in the patient's jaw. In some variations, gathering the three-dimensional (3D) model of a patient's dentition comprises gathering a digital scan of the patient's jaw with the teeth in the target arrangement.

Translating the target arrangement of the patient's teeth from the 3D model of the patient's dentition into the two-dimensional (2D) height map of the patient's dentition may comprise rasterizing the 3D model of the patient's dentition as 2D height map points.

Any of these methods and systems may also include adding a filler shape so that the filler shape is present on the 3D mesh of the upper surface and reduces spaces between the teeth.

Further, any of these methods and apparatuses may include manufacturing the patient-specific retainer (e.g., by 3D printing the retainer from the digital model of the retainer).

Any of the dental retainer devices described herein may include any of: a unitary body formed of a retainer material, the unitary body having different thicknesses along its length, the unitary body defining multiple regions including: an anterior teeth region configured to hold a patient's anterior teeth within a pocket having lingual and occlusal sides; a first posterior teeth region and a second posterior teeth region each configured to hold the patient's molars in a pocket having lingual and occlusal sides; and a palatal region configured to extend between the first and second posterior teeth regions and adjacent to the patient's palate, wherein the palatal region is thicker than the occlusal side of the first and second posterior teeth regions; wherein a top surface of the palatal region is smoother than a bottom surface of the palatal region, further wherein the bottom surface is configured to be worn adjacent to the patient's palate.

For example, a dental retainer device may include: a unitary body formed of a retainer material, the unitary body having different thicknesses along its length, the unitary body defining multiple regions including: an anterior teeth region configured to hold a patient's anterior teeth within a pocket having lingual and occlusal sides; a first posterior teeth region and a second posterior teeth region each configured to hold the patient's molars in a pocket having lingual and occlusal sides; a palatal region configured to extend between the first and second posterior teeth regions and adjacent to the patient's palate, wherein the palatal region is thicker than the occlusal side of the first and second posterior teeth regions, and the thickness of the palatal region increase between the first and second posterior teeth regions; wherein a top surface of the palatal region is smoother than a bottom surface of the palatal region, further wherein the bottom surface is configured to be worn adjacent to the patient's palate; and an identifying code on one or more of: the bottom surface of the palatal region or a posterior edge of the palatal region.

Any of these devices may include an identifying code on one or more of: the bottom surface of the palatal region or a posterior edge of the palatal region.

The thickness of the palatal region may increase between the first and second posterior teeth regions. The palatal region may comprise a plurality of strips extending between the first and second posterior regions. The first and second posterior teeth regions may each comprise a buccal surface configured to conform the patient's molars. The first and second posterior teeth regions may each comprises a buccal surface configured to extend at least 2 mm over the patient's gingiva when worn. The unitary body may include an attachment structure configured to attach an elastic, a slot configured to attach an elastic, a mandibular advancement feature (e.g., a ramp surface extending from of the unitary body), a gingival support region, a plurality of ridges, a bias element attached to or integral with the unitary body, and/or an interproximal support feature. The interproximal support feature may comprise one or more open spaces and/or a second material, wherein the second material is less rigid than the retainer material. The interproximal support feature may have a rigidity that is less rigid than the unitary body.

In any of these variations, as mentioned, the retainer material may have a Young's modulus of between about 0.01 and 5 GPa. In some variations, the retainer material comprises nylon.

As mentioned, also described herein are methods of designing a patient-specific retainer device, the method comprising: receiving a three-dimensional (3D) representation of a patient dental anatomy and a treatment plan including an initial arrangement of the patient's teeth and a final arrangement for the patient's teeth; displaying at least a portion of the three-dimensional representation of the patient dental anatomy in one or more stages of the treatment plan including the initial arrangement and the final arrangement; providing one or more options associated with retainer configurations, the one or more options including a palatal configuration, an anterior teeth coverage configuration, and a posterior teeth coverage configuration; providing one or more add-on options for the retainer; receiving selections from a user for the one or more options and one or more add-on options; preparing a model of the patient-specific retainer based on the patient dental anatomy and the received selections to the one or more options and one or more add-on options; and interactively displaying the model of the patient-specific retainer so that the model and display of the model are updated as the user modifies the selections of the one or more options and one or more add-on options.

For example, a method of designing a patient-specific retainer device may include: receiving a three-dimensional (3D) representation of a patient dental anatomy including a final arrangement for the patient's teeth; displaying at least a portion of the three-dimensional representation of the patient dental anatomy in the final arrangement for the patient's teeth; providing two or more selectable options associated with retainer configurations, the selectable options including: a palatal configuration, an anterior teeth coverage configuration, and a posterior teeth coverage configuration; providing one or more selectable add-on options for the retainer, the selectable add-on options including: a protrusion, a tab, a hook, an attachment structure configured to attach a rubber band, a slot configured to attach a rubber band, a mandibular advancement feature, an interproximal support feature, a ramp, a gingival support region, a thickened base region, and a plurality of ridges; receiving selections from a user for the one or more options and one or more add-on options (though in some variation no add-on options may be chosen); preparing a model of the patient-specific retainer based on the patient dental anatomy and the received selections to the one or more options and one or more add-on options; and interactively displaying the model of the patient-specific retainer so that the model and display of the model are updated as the user modifies the selections of the one or more options and one or more add-on options.

These methods may include displaying an image of the patient-specific retainer overlying the three-dimensional representation of the patient dental anatomy. The anterior teeth coverage configuration and the posterior teeth coverage configuration may include options for buccal coverage, lingual coverage, and occlusal coverage for the anterior teeth and the posterior teeth. The add-on options for the retainer may include one or more of: a protrusion, tab, hook, or other attachment structure configured to attach a rubber band, a slot configured to attach a rubber band, a mandibular advancement feature, an interproximal support feature, a ramp, a gingival support region, a thickened base region, and a plurality of ridges.

Any of these methods may include interactively modifying a display of the patient-specific retainer as the user selects the one or more options and the one or more add-on options.

These methods may include receiving, from the user, a command to change the stage of the treatment plan being displayed as the at least a portion of the three-dimensional representation of the patient dental anatomy.

Any of these methods may include receiving, from the user, a command to rotate the at least the portion of the three-dimensional representation of the patient dental anatomy and/or to zoom in or out. Any of these method may include exporting the model of the patient-specific retainer as a digital file for fabrication.

Any of these methods and systems may include fabricating the patient-specific retainer from the model of the patient-specific retainer.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 20 illustrates day and night retainers for a patient.

In FIG. 24A, the retainer includes a cut-out (partial) palatal region as well as a full anterior region and a pair of partial posterior regions. FIG. 24B is similar to FIG. 24A, but includes a full palatal region. FIG. 24C is similar to FIG. 24B but includes additional lateral palatal regions, partially up to the lingual sides of the teeth.

FIGS. 29A-29D illustrate another example of a retainer as described herein in different views.

FIGS. 36A-36C illustrate additional mapping directions of a patient's dentition that may be used in forming a retainer.

FIG. 49 is an example of determining boundaries in a model of a patient's dentition to form the retainer, having a large U-shaped posterior boundary.

FIGS. 50A-50B illustrate one example of a method of removing problem regions in a boundary (e.g., a small loop) when determining a boundary as part of a process or apparatus for forming a retainer.

DETAILED DESCRIPTION

Figure 1:
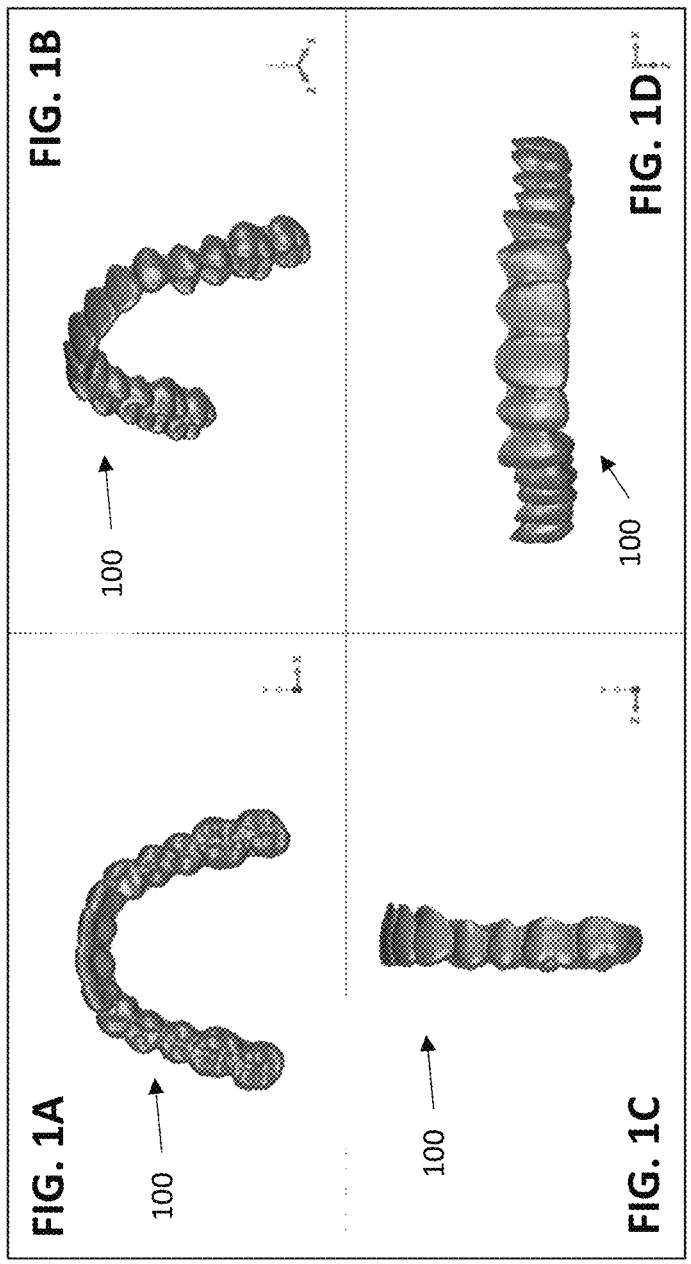
FIGS. 1A-1D illustrate top, top perspective, side and front views, respectively, of a retainer device configured to be worn in a patient's mouth.
Figure 2:
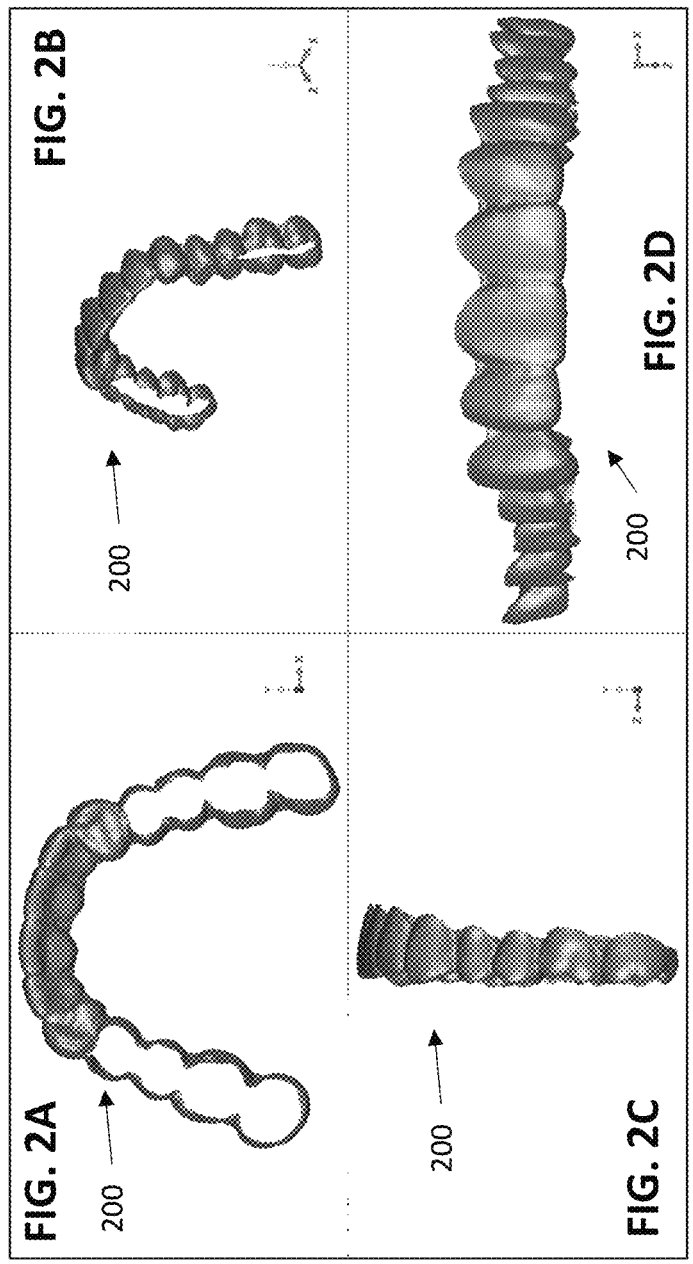
FIGS. 2A-2D illustrate top, top perspective, side and front views, respectively, of a retainer device configured to be worn in a patient's mouth, including an anterior teeth region, a first posterior teeth region and a second posterior teeth region, wherein the first and second posterior teeth regions do not have occlusal surfaces.
Figure 3:
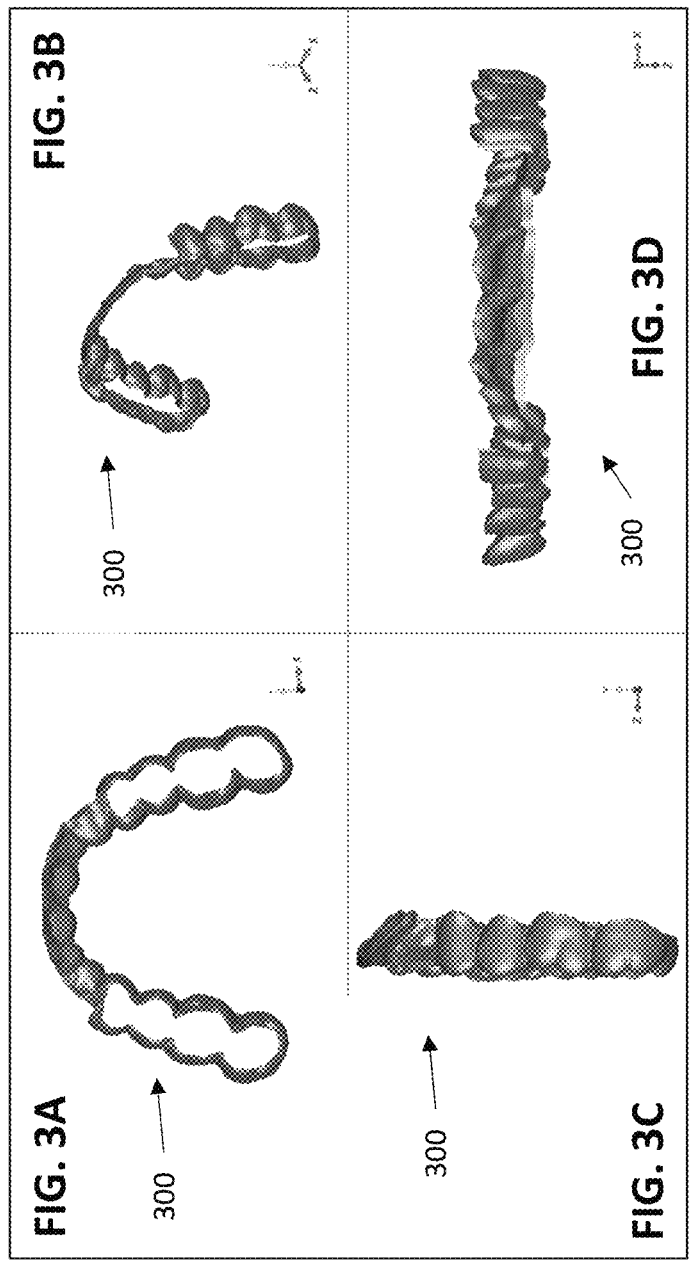
FIGS. 3A-3D illustrate top, top perspective, side and front views, respectively, of a retainer device configured to be worn in a patient's mouth, including an anterior teeth region having just a lingual portion, a first posterior teeth region and a second posterior teeth region, wherein the first and second posterior teeth regions do not have occlusal surfaces.
Figure 4:
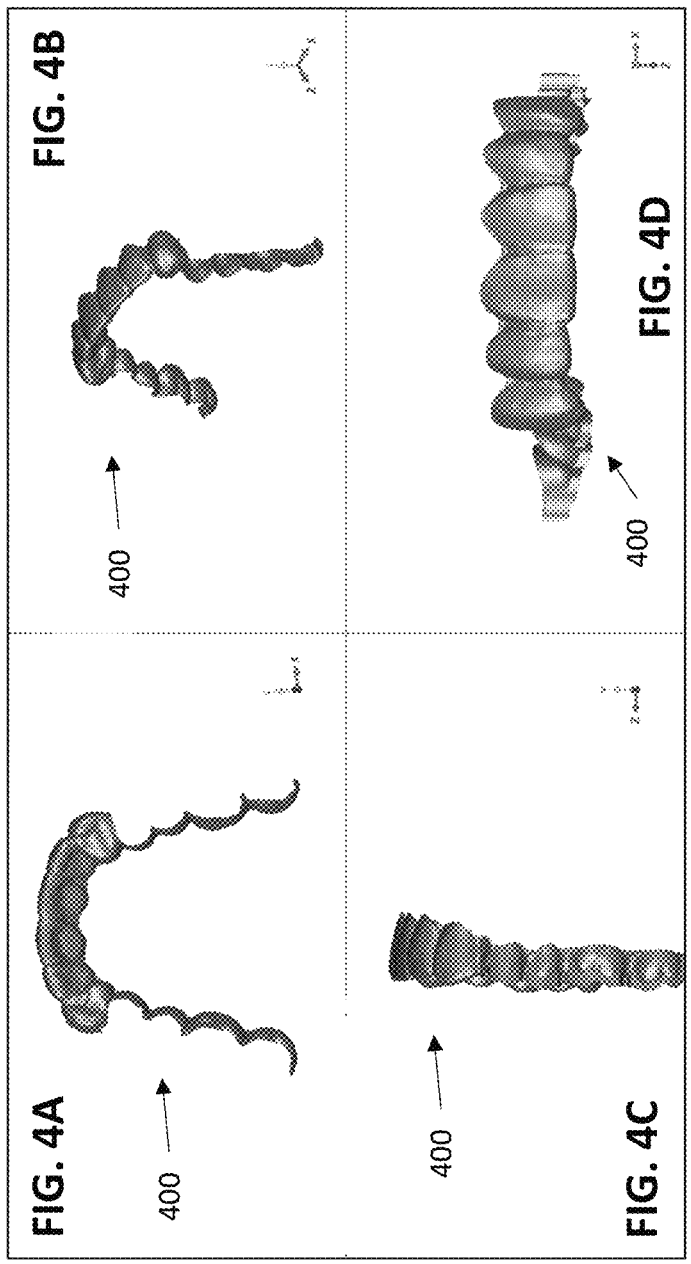
FIGS. 4A-4D illustrate top, top perspective, side and front views, respectively, of a retainer device configured to be worn in a patient's mouth, including an anterior teeth region, a first posterior teeth region and a second posterior teeth region, wherein the first and second posterior teeth regions have just lingual sides.
Figure 5:
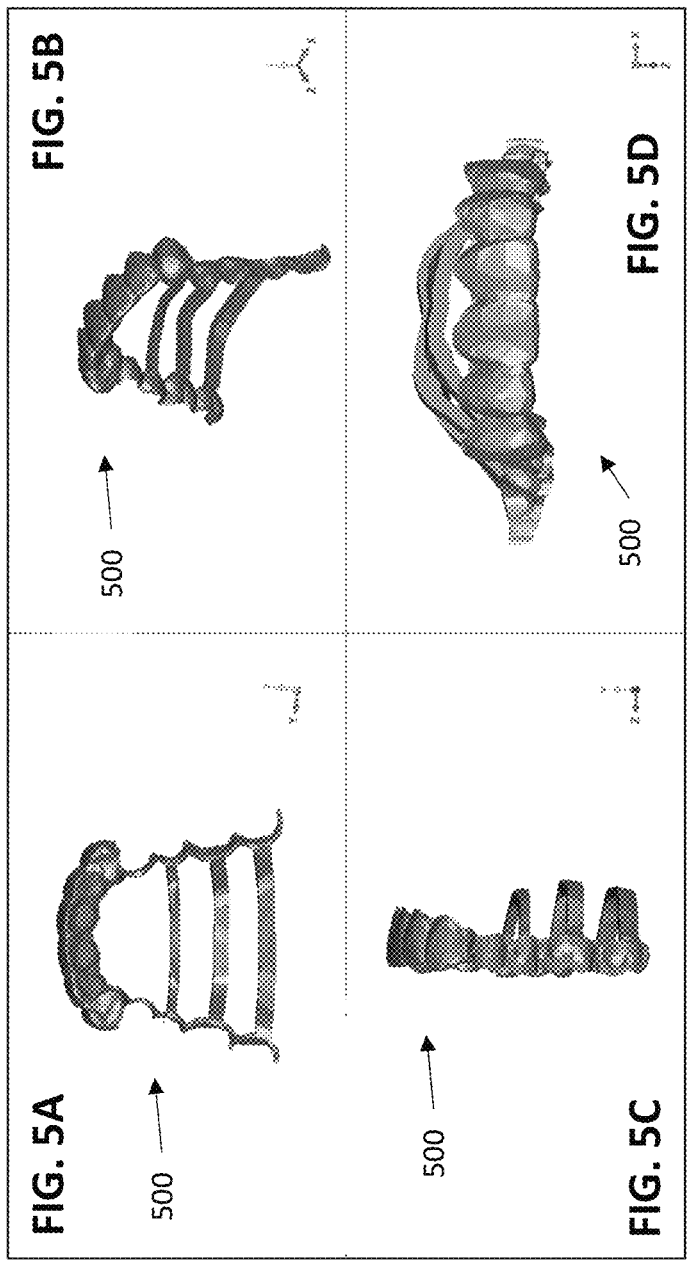
FIGS. 5A-5D illustrate top, top perspective, side and front views, respectively, of a retainer device configured to be worn in a patient's mouth including an anterior teeth region, a first posterior teeth region and a second posterior teeth region, wherein the first and second posterior teeth regions have just lingual sides, and a palatal region formed of support strips extending between the first and second posterior teeth regions.
Figure 6:
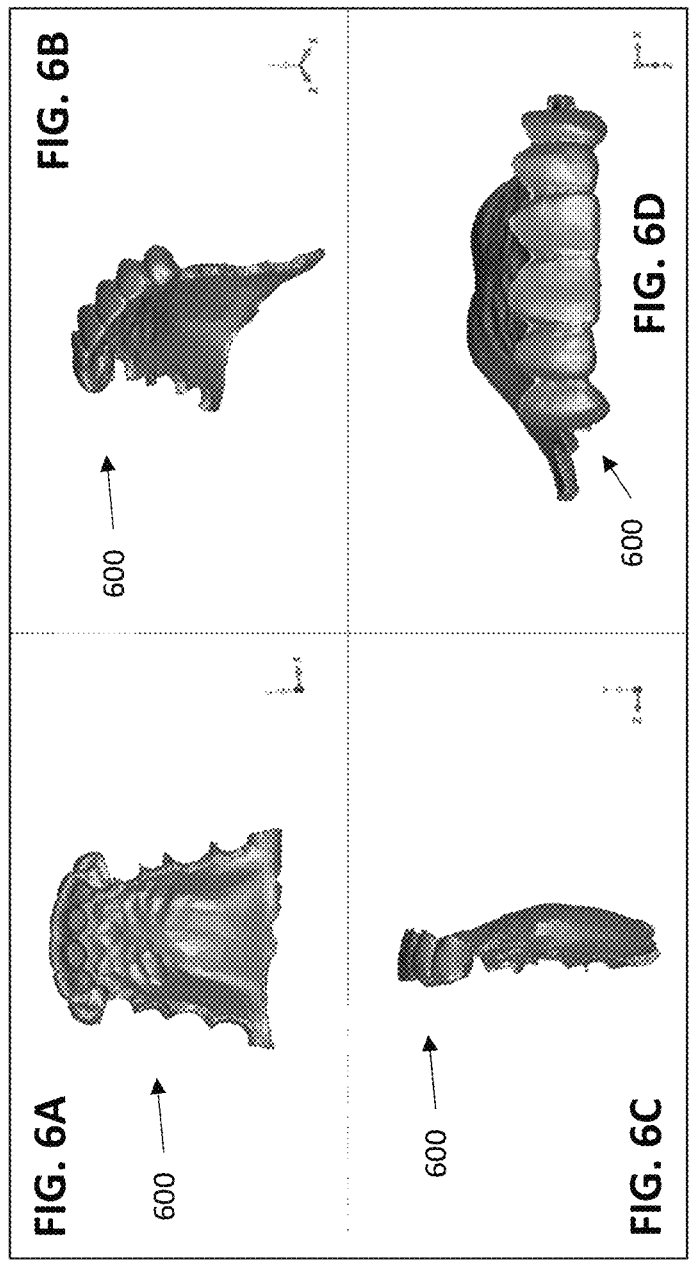
FIGS. 6A-6D illustrate top, top perspective, side and front views, respectively, of a retainer device configured to be worn in a patient's mouth including an anterior teeth region, and a palatal region.
Figure 7:
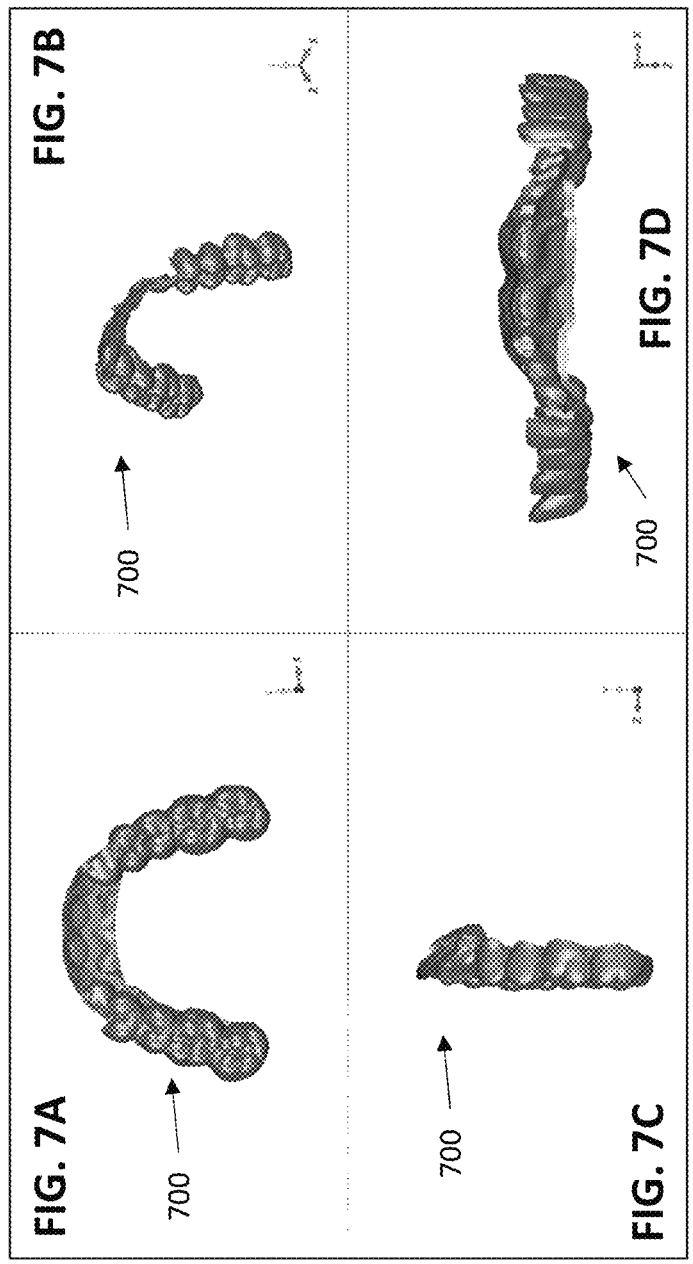
FIGS. 7A-7D illustrate top, top perspective, side and front views, respectively, of a retainer device configured to be worn in a patient's mouth including an anterior teeth region having just a lingual side that extends and over the gingiva, a first posterior teeth region and a second posterior teeth region.
Figure 8:
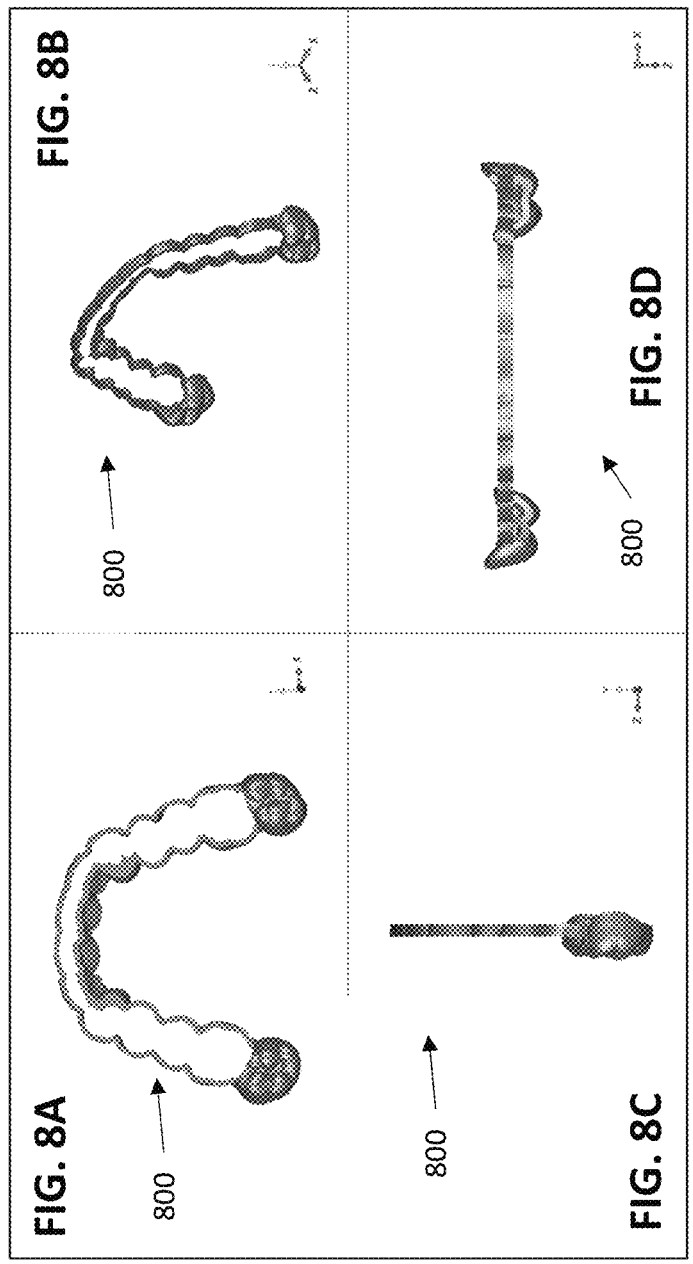
FIGS. 8A-8D illustrate top, top perspective, side and front views, respectively, of a retainer device configured to be worn in a patient's mouth including an anterior teeth region having just partial buccal and lingual sides, a first posterior teeth region and a second posterior teeth region, wherein the occlusal surface of the first and second posterior teeth regions is partially removed.
Figure 9:
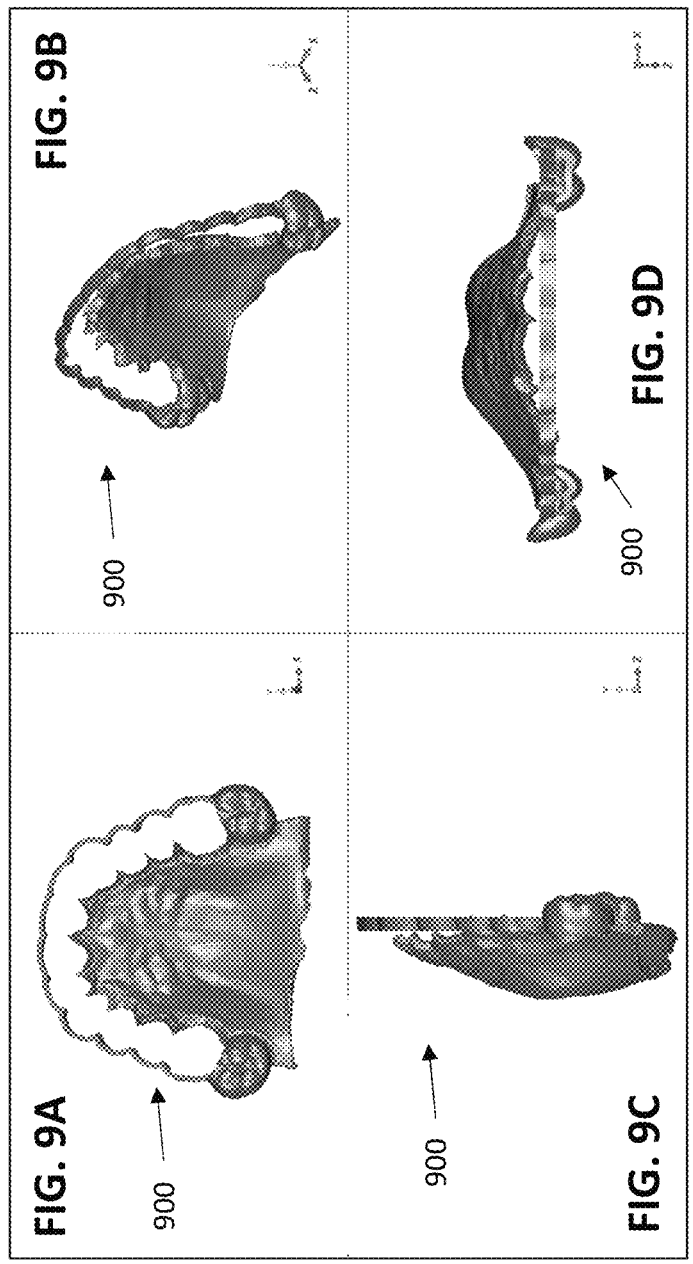
FIGS. 9A-9D illustrate top, top perspective, side and front views, respectively, of a retainer device configured to be worn in a patient's mouth, similar to the device shown in FIG. 8A-8D, but also including a palatal region.
Figure 10:
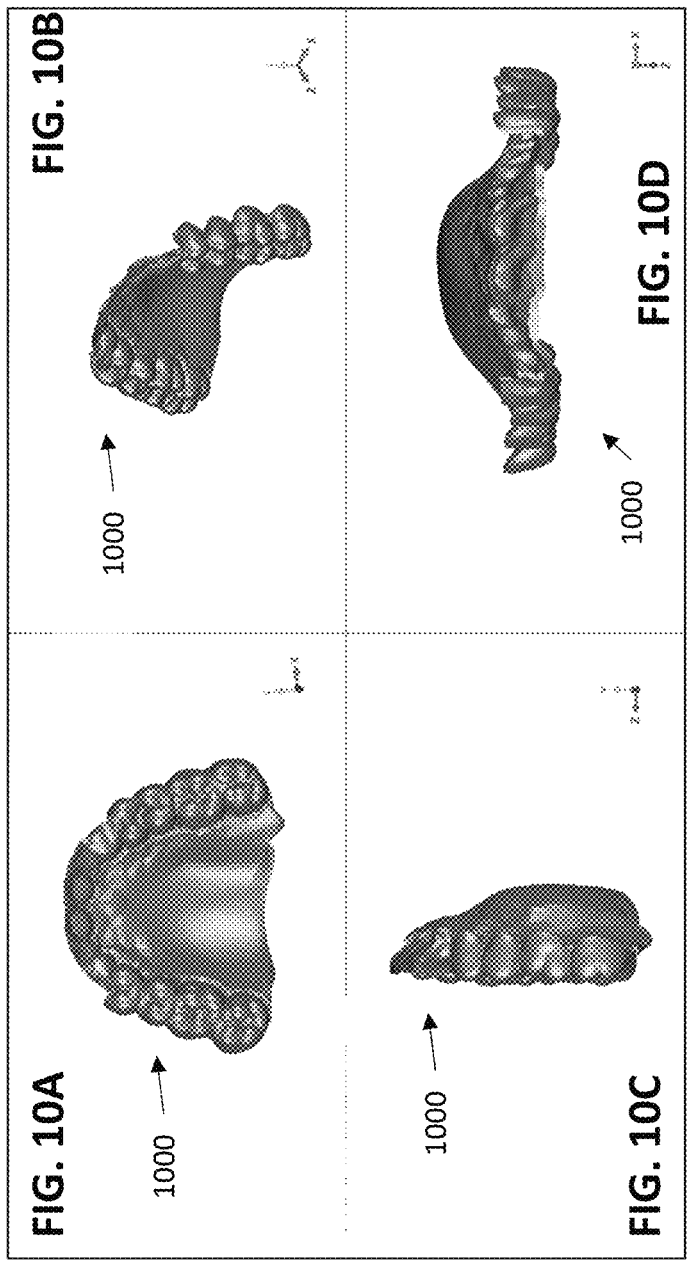
FIGS. 10A-10D illustrate top, top perspective, side and front views, respectively, of a retainer device configured to be worn in a patient's mouth including a first posterior teeth region and a second posterior teeth region and a palatal region.
Figure 11:
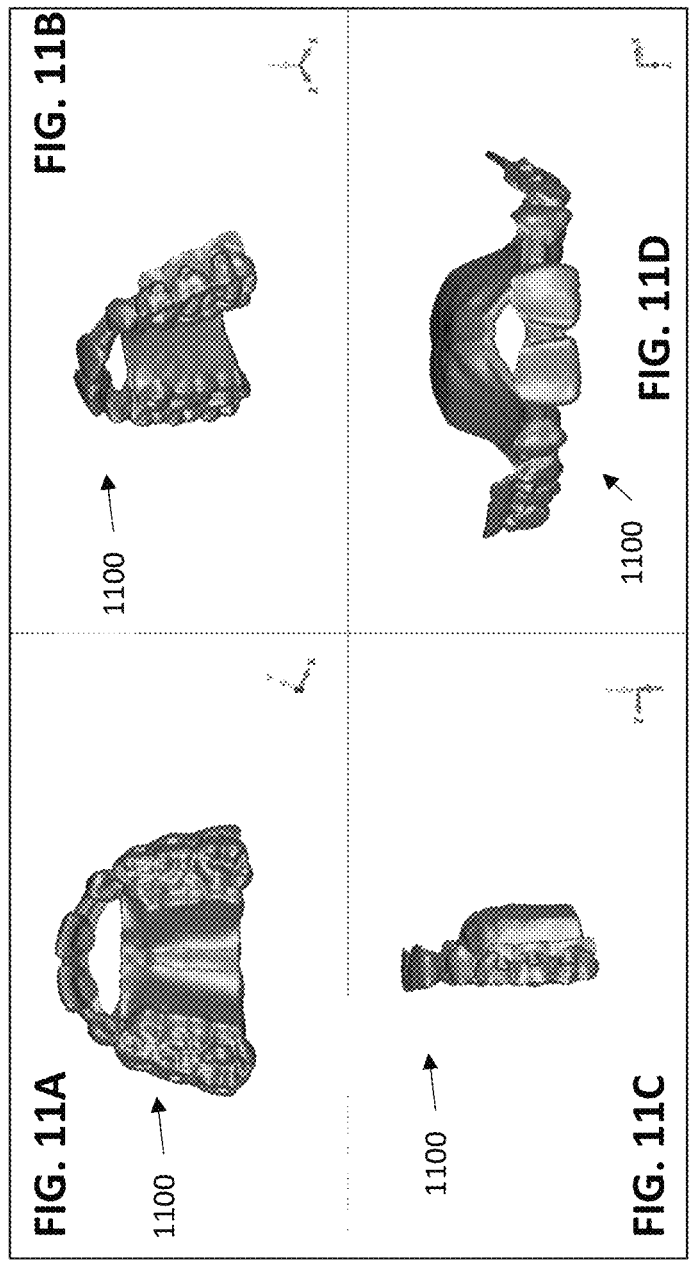
FIGS. 11A-11D illustrate top, top perspective, side and front views, respectively, of a retainer device configured to be worn in a patient's mouth including an anterior teeth region, a first posterior teeth region and a second posterior teeth region, and a palatal region including an anterior window before the anterior teeth region.
Figure 12:
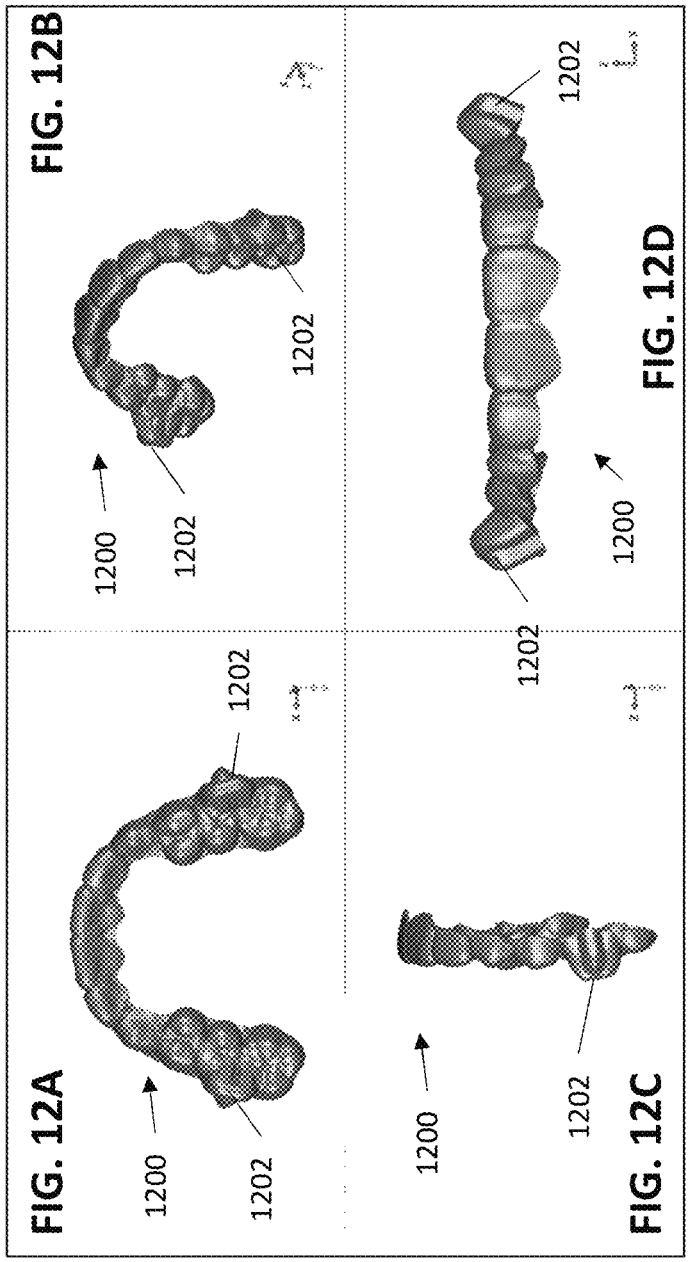
FIGS. 12A-12D illustrate top, top perspective, side and front views, respectively, of a retainer device configured to be worn in a patient's mouth including an anterior teeth region, and a first posterior teeth region and a second posterior teeth region, as well as a mandibular advancement feature.
Figure 13:
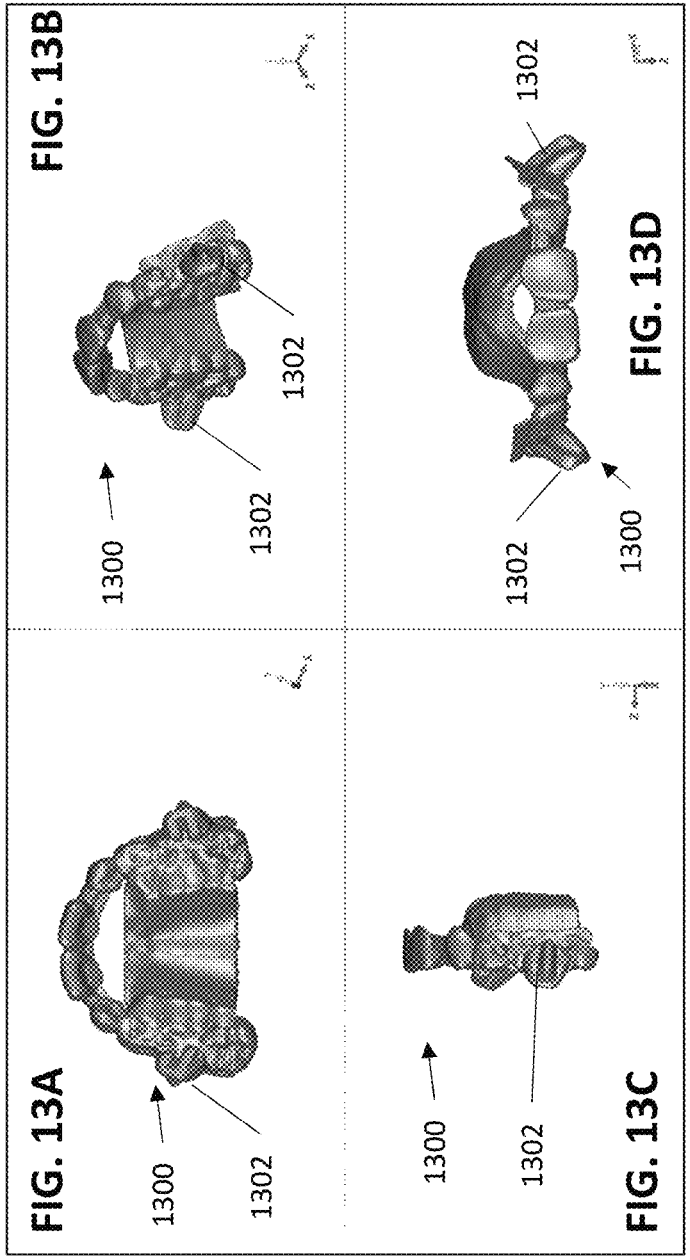
FIGS. 13A-13D illustrate top, top perspective, side and front views, respectively, of a retainer device configured to be worn in a patient's mouth, including a mandibular advancement feature.
Figure 14:
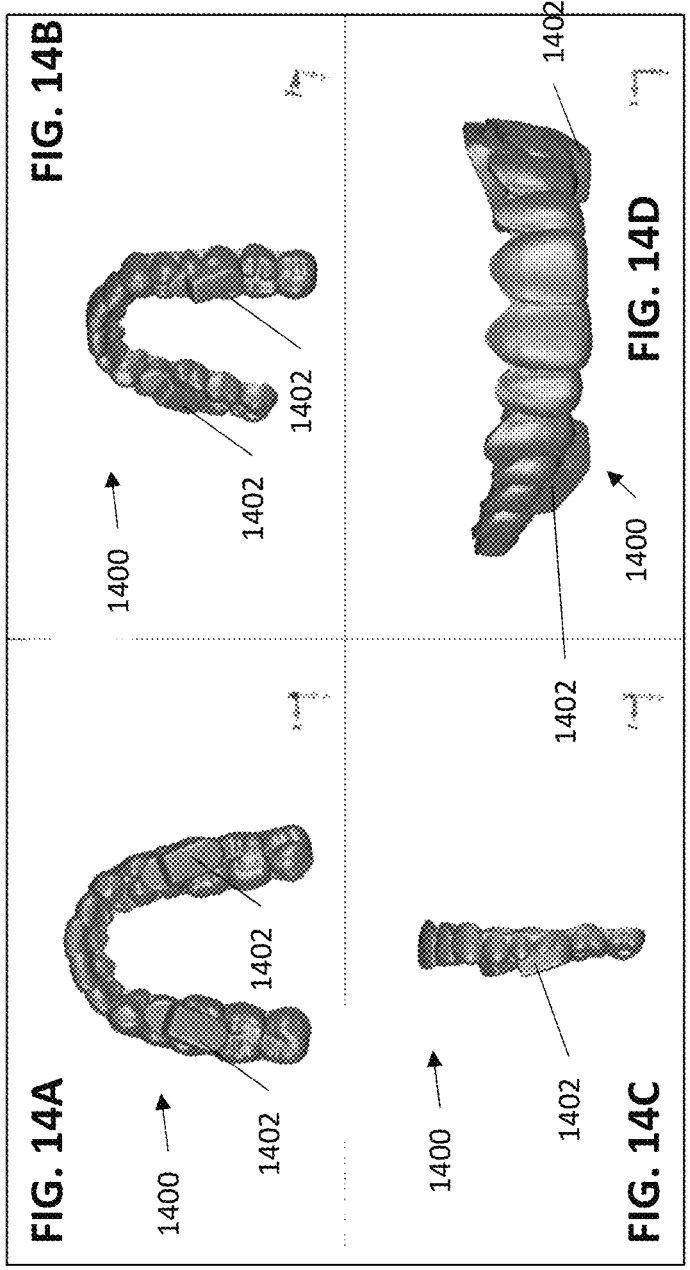
FIGS. 14A-14D illustrate top, top perspective, side and front views, respectively, of a retainer device configured to be worn in a patient's mouth, also including a solid occlusal mandibular advancement feature.
Figure 15:
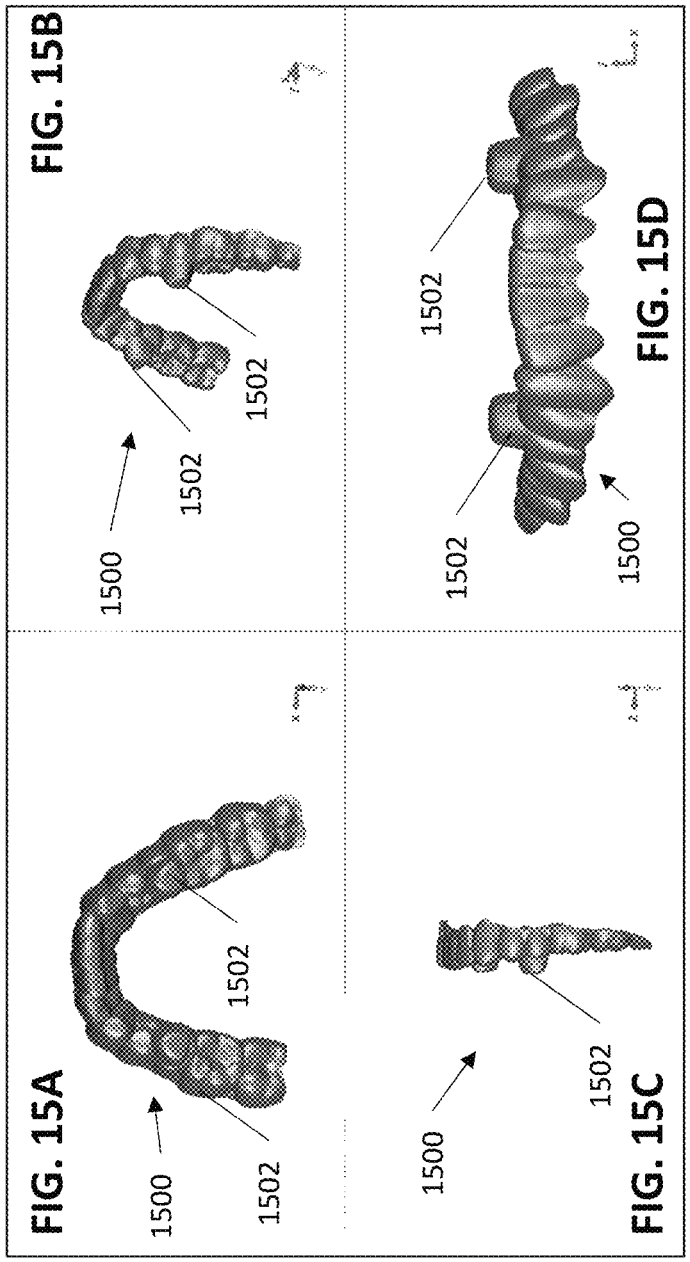
FIGS. 15A-15D illustrate top, top perspective, side and front views, respectively, of a retainer device configured to be worn in a patient's mouth.

Dental retainer devices, methods for making dental retainer devices, methods for using dental retainer devices, and methods for preparing patient-specific dental retainer devices are provided herein. The dental retainer devices can be custom made based on the patient's specific dental anatomy and/or the treatment plan developed by the patient's doctor. The dental retainer devices can be manufactured using additive manufacturing techniques, such as three dimensional printing. The use of three-dimensional printing allows for many customization options and configurations that cannot be made using in-office dental molding techniques. The improved customization allows for additional flexibility for treating each patient's unique dental anatomy.

The dental retainer devices can include custom coverage for each of the posterior, anterior, and palatal regions of the patient dental anatomy. The use of additive manufacturing allows for additional customization with material selection versus thermoforming and other conventional techniques. For example, the material for the retainer can be specifically selected based on the desired physical characteristics and properties based on the patient specific treatment plan.

In some embodiments the dental retainer devices include a unitary body formed of a retainer material with different thicknesses. The unitary body can include a variety of different geometries and configurations as described herein. The unitary body can also define different regions as described herein.

In some embodiments the unitary body can define regions including: an anterior teeth region configured to hold a patient's anterior teeth within a pocket having lingual, occlusal, and buccal sides; a first posterior teeth region and a second posterior teeth region each configured to hold the patient's molars in a pocket having lingual, occlusal, and buccal sides; and a palatal region configured to extend between the adjacent to the patient's palate.

In some embodiments the unitary body can define regions including: an anterior teeth region configured to hold anterior teeth within a pocket having lingual, occlusal, and buccal sides along with a first posterior teeth region and a second posterior teeth region, each having a lingual surface with the first posterior teeth region and the second posterior teeth region are open on an occlusal side. The lingual surface of the first and second posterior teeth regions can be configured to conform to the patient's molars. In some aspects the unitary body can also include a palatal region extending between the first and second posterior regions and the anterior teeth region. The palatal region can be configured to be worn adjacent to the subject's palate. In some examples the palatal region can include a plurality of strips extending between the first and second posterior regions. The first and second posterior teeth regions can each include a buccal surface configured to conform the patient's molars.

In some embodiments the unitary body can define several different regions including an anterior teeth region configured to conform to the patient's anterior teeth at a lingual side but not on a buccal side and a first posterior teeth region and a second posterior teeth region. The first and second posterior teeth regions can each be configured to hold molars in a pocket having lingual and buccal sides with an opening on an occlusal side. In some aspects the unitary body can include a palatal region extending between the first posterior teeth region and the second posterior teeth region. The palatal region can be configured to be adjacent to the patient's palate when the patient is wearing the device.

In some embodiments the unitary body can define several different regions including an anterior teeth region configured to conform to the patient's anterior teeth at a lingual side but not on a buccal side and a first posterior teeth region and a second posterior teeth region. The first and second posterior teeth regions can each configured to hold molars in a pocket having lingual, buccal and occlusal sides. In some aspects the unitary body includes a palatal region extending between the first posterior teeth region and the second posterior teeth region. The palatal region can be configured to be adjacent to the patient's palate when the patient is wearing the device.

In some embodiments the unitary body can define several different regions including an anterior teeth region configured to hold anterior teeth within a pocket having lingual, occlusal, and buccal sides; a first posterior teeth region and a second posterior teeth region each configured to engage with molars on a lingual side; and a palatal region. The palatal region can extend between the first posterior teeth region, the second posterior teeth region and the anterior teeth region. The palatal region can also be configured to extend adjacent to the patient's palate when a patient is wearing the device.

In some embodiments the unitary body can define several different regions including an anterior teeth region configured to engage anterior teeth on a lingual side and a buccal side but open on an occlusal side and a first posterior teeth region and a second posterior teeth region each configured to hold molars in a between a lingual side and a buccal side. The lingual and buccal sides can be configured to conform to the patient's teeth when the patient is wearing the device. In some aspects each of the first and second posterior teeth regions also include an occlusal surface extending between the lingual side and the buccal side. In some cases the occlusal surface only partially covers the occlusal surface of the patient's molars when the patient is wearing the device. In some aspects the unitary body also includes a palatal region extending between the first posterior teeth region and the second posterior teeth region. In some aspects the palatal region is configured to be adjacent to the patient's palate when the patient is wearing the device.

In some embodiments the unitary body can define several different regions including an anterior teeth region configured to hold anterior teeth within a pocket having lingual and buccal sides with the anterior teeth region including an opening on an occlusal side; a first posterior teeth region and a second posterior teeth region each configured to hold molars in a pocket having lingual, occlusal, and buccal sides with the first posterior teeth region and second posterior teeth region include openings on an occlusal side; and a palatal region configured to extend adjacent to a palate between the first posterior teeth region and the second posterior teeth region and the anterior teeth region.

In some embodiments the unitary body can define several different regions including an anterior teeth region configured to hold anterior teeth within a pocket having lingual, occlusal, and buccal sides; a first posterior teeth region and a second posterior teeth region each configured to hold molars in a pocket having lingual, occlusal, and buccal sides; and a palatal region extending between the first posterior teeth region and the second posterior teeth region and configured to be adjacent to the patient's palate when the device is worn by the patient. The palatal region can include one or more openings between the anterior teeth region and the palatal region.

In any of the embodiments described herein the unitary body can include a protrusion, tab, hook, or other attachment structure configured to attach an elastic bias (e.g., a rubber band, etc.).

In any of the embodiments described herein the unitary body can include a slot configured to attach a rubber band.

In any of the embodiments described herein the unitary body can include a mandibular advancement feature. The mandibular advancement feature can include a ramp surface extending from the unitary body.

Any of the apparatuses described herein may be configured to have a non-uniform thickness. Specifically, the thickness of the retainer apparatus may be thinner in the occlusal regions compared to the slides (lingual and/or buccal). In some variations the thickness may be correlated with the teeth, e.g., it may be thinner in more posterior regions (molars, pre-molars) and thicker more anteriorly (canines, bicuspids, etc.); alternatively the apparatus may be thicker in more posterior regions (molars, pre-molars) and thinner more anteriorly (canines, bicuspids, etc.). In some variations, the lateral extend of the retainer may extend over the buccal side of the teeth and over the patient's gingiva; alternatively or additionally, the lingual side may extend over the lingual side of the teeth and over the gingiva. The region over the gingiva may be configured not to touch the normal (e.g., non-inflamed) gingiva, but may be angled away from the patient's gingiva.

In any of the embodiments described herein the unitary body can include a gingival support region.

In any of the embodiments described herein the unitary body can include a thickened base region.

In any of the embodiments described herein the unitary body can include a plurality of ridges.

In any of the embodiments described herein the unitary body can include a non-transparent color and/or a pattern of colors.

In any of the embodiments described herein the dental retainer can further include a bias element attached to or integral with the unitary body.

In any of the embodiments described herein the palatal region can be configured to be adjacent to but not contact a palate of the patient when the patient is wearing the device.

In any of the embodiments described herein the palatal region can be configured to engage with a palate of the patient when the patient is wearing the device.

In any of the embodiments described herein the retainer can include an interproximal support feature. The interproximal support feature can provide additional support to the teeth to prevent relapse. In one aspect the interproximal support feature includes one or more open spaces. In some examples the interproximal support feature includes a second material where the second material is less rigid than the retainer material. In some cases the interproximal support feature has a rigidity that is less rigid than the unitary body formed of the retainer material.

In any of the embodiments described herein, the retainer material can have a Young's modulus that is relatively "stiff" (e.g., between about 0.01 and 5 GPa). Further, the hardness of the retainer material may be, e.g., between 60A to 85 D; the apparatus may have an ultimate tensile strength greater than 5000 psi, and/or an elongation at break greater than 200%. In one example the retainer material can be nylon.

Methods are also provided herein for making a patient-specific dental retainer device. The methods can include receiving a scan of a patient's dental arch that includes a plurality of teeth and manufacturing the patient-specific retainer based on the scan by additive manufacturing. The patient-specific retainer can be any of the retainers described herein. In one some cases additive manufacturing includes 3D printing.

In some embodiments methods of retaining a position of a patient's teeth following an orthodontic treatment are provided. The methods can include wearing a series of aligners configured to progressively move the patient's teeth and wearing any of the retainers described herein.

In some embodiments methods of planning a patient-specific retainer device are provided. The methods can include receiving a three-dimensional representation of a patient dental anatomy, displaying at least a portion of the three-dimensional representation of the patient dental anatomy, providing one or more options associated with retainer configurations, the one or more options including a palatal configuration, an anterior teeth coverage configuration, and a posterior teeth coverage configuration, providing one or more add-on options for the retainer, receiving responses or instructions to the one or more options and one or more add-on options, and preparing a model of a custom retainer based on the patient dental anatomy and the responses or instructions to the one or more options and one or more add-on options. The methods can further include displaying an image of the custom retainer overlying the three-dimensional representation of the patient dental anatomy. In some cases the anterior teeth coverage configuration and the posterior teeth coverage configuration include options for buccal coverage, lingual coverage, and occlusal coverage for the anterior teeth and the posterior teeth. In some aspects the add-on options for the retainer include one or more of: a protrusion, tab, hook, or other attachment structure configured to attach a rubber band, a slot configured to attach a rubber band, a mandibular advancement feature, a ramp, an interproximal support feature, a gingival support region, a thickened base region, and a plurality of ridges. In some embodiments the custom retainer can be any of the retainers described herein.

A number of modifications can be made to the retainers described herein. In some embodiments any of the retainers described herein can have a reduced thickness on the occlusal surface to help occlusal settling and/or prevent the development of an open bite.

In some embodiments any of the retainers described herein can include a hollow portion or a window on the buccal surface to reduce coverage and increase retainer aesthetics.

In some embodiments any of the retainers described herein can include added precision hooks and button cutouts. The added precision hooks and button cutouts can be designed based on the patient specific dental anatomy and made using additive manufacturing.

In some embodiments any of the retainers described herein can add one or more sensors or chips that are configured to track one or more of the following: patient compliance (e.g., the length of time the apparatus is worn), GPS, health, one or more biomarkers, etc.

In some embodiments any of the retainers described herein can be manufactured from an eco-friendly and dissolvable material.

In some embodiments any of the retainers described herein can be configured for use as a 24-hour mouth guard and/or for use during sports activities.

In some embodiments any of the retainers described herein can be made from a dishwasher safe material to facilitate cleaning.

In some embodiments any of the retainers described herein can have a tongue retaining features to aid with habit training.

In some embodiments any of the retainers described herein can be configured to be contacted during tooth brushing and related dental hygiene procedures.

In some embodiments any of the retainers described herein can include a grinding detector that can provide an indication of the patients grinding behavior. For example color patches can be embedded in the retainer and become visible as the retainer wears down during grinding. The patches can be shaped so the size of the visible portion of the patch indicates the level of wear.

FIGS. 1A-1D illustrates various views of a retainer 100 in accordance with some embodiments. FIGS. 1A-1D illustrate a bottom view, isometric view, side view, and front view respectively of a retainer 100 made using additive printing, such as 3D printing. The retainer 100 is designed to cover buccal surfaces, lingual surfaces, occlusal surfaces, and incisal surfaces of the teeth. The illustrated retainer 100 is designed with a complementary shape to the patient dental anatomy such that substantially all of the top or bottom teeth are covered by the retainer 100 when worn by the patient. The retainer can be directly made using 3D printing. Various materials can be used with the 3D printing process to make the retainer 100. Examples of suitable materials include nylon 12 and other transparent materials.

The retainer 100 offers a number of advantages over prior art retainers, in particular retainers made by thermoforming. For example, although the retainers described herein may generally be made by any appropriate fabrication technique, in some variations they may be made by 3D printing, allowing additional customization. For example, the use of an additive manufacturing method to make the apparatuses described herein may allow for patient-specific retainers. In contrast to thermoforming, the use of additive manufacturing does not use a mold of the teeth. With a retainer made with additive manufacturing no molding needs to be done at the dentist's office. Instead the retainer can be made via additive manufacturing based on a scan of the patient's teeth and anatomy. Additive manufacturing is also a more efficient process versus molding and trimming the retainer. Retainers made via additive manufacturing typically do not require trimming (e.g., laser trimming). Additive manufacturing creates less waste than thermoforming processes. The additional customization allows for more complicated and specific designs to incorporate in the retainer. For example, the doctor or patient could modify the thickness regionally based on the preferences or needs. The coverage of the teeth for the retainer could also provide substantially full coverage all over the teeth to retain teeth alignment post treatment. Patients that grind their teeth may benefit from a retainer with occlusal coverage to provide protection against teeth grinding.

FIGS. 2A-2D illustrates various views of a retainer 200 in accordance with some embodiments. FIGS. 2A-2D illustrate a bottom view, isometric view, side view, and front view respectively of a retainer 200 made using additive printing, such as 3D printing. The retainer 200 is designed to cover buccal surfaces and lingual surfaces of all the teeth, and the incisal surfaces of the anterior teeth. The retainer 200 has openings such that it does not cover the occlusal portions of the posterior teeth. The retainer 200 allows for increased occlusal settling post treatment. The retainer 200 covers the substantially all of the anterior teeth such that the alignment can be maintained post treatment.

FIGS. 3A-3D illustrates various views of a retainer 300 in accordance with some embodiments. FIGS. 3A-3D illustrate a bottom view, isometric view, side view, and front view respectively of a retainer 300 made using additive printing, such as 3D printing. The retainer 300 is designed to cover lingual surfaces, a portion of the buccal surfaces, and incisal surfaces of the teeth. Material is removed from the occlusal surfaces and the buccal side of the anterior teeth. The full lingual coverage is similar to a fixed style anterior retainer configuration. The retainer 300 offers multiple advantages. The retainer 300 configuration allows for increase occlusal settling post treatment. The retainer 300 configuration removes the coverage from the teeth that are most visible and thus, improves the aesthetics of the retainer. The retainer 300 configuration provides full coverage on the lingual side of the anterior teeth to provide support to retain the anterior alignment of the teeth post treatment.

FIGS. 4A-4D illustrates various views of a retainer 400 in accordance with some embodiments. FIGS. 4A-4D illustrate a bottom view, isometric view, side view, and front view respectively of a retainer 400 made using additive printing, such as 3D printing. The retainer 400 configuration allows for the full coverage on anterior teeth to retain alignment post treatment of the anterior teeth and only lingual surface coverage of the posterior teeth. The retainer 400 configuration allows for increased wall thickness on the lingual surface of the posterior teeth to retain the arch shape. The retainer 400 configuration allows the reduced coverage of buccal surface on the posteriors to increase patient comfort and promote better occlusal settling post treatment. The additive manufacturing process allows for a regional increase in the wall thickness on the lingual face of the posterior teeth to impart additional force and enough force to retain the arch position post treatment.

FIGS. 5A-5D illustrates various views of a retainer 500 in accordance with some embodiments. FIGS. 5A-5D illustrate a bottom view, isometric view, side view, and front view respectively of a retainer 500 made using additive printing, such as 3D printing, in accordance with some embodiments. The retainer 500 has a configuration similar to the retainer 400 but also includes struts that span across the palate between the opposing lingual surfaces of the retainer 500. The retainer 500 configuration with the struts increases the stiffness (e.g., lateral stiffness) on the posterior teeth if they start to move out of alignment. The retainer 500 offers similar advantages to the retainer 400 but with the ability to provide increased lateral forces on the posterior teeth.

FIGS. 6A-6D illustrates various views of a retainer 600 in accordance with some embodiments. FIGS. 6A-6D illustrate a bottom view, isometric view, side view, and front view respectively of a retainer 600 made using additive printing, such as 3D printing. The retainer 600 has a configuration similar to the retainer 500 but instead of struts includes full palatal coverage between the opposing lingual surfaces of the retainer. The retainer 600 configuration with the palatal coverage further increases the lateral forces on the posterior teeth. The retainer 600 offers similar advantages to the retainers 400, 500 but with the ability to provide increased lateral forces on the posterior teeth.

FIGS. 7A-7D illustrates various views of a retainer 700 in accordance with some embodiments. FIGS. 7A-7D illustrate a bottom view, isometric view, side view, and front view respectively of a retainer 700 made using additive printing, such as 3D printing. The retainer 700 is designed to cover the lingual surfaces, a portion of the incisal surfaces, occlusal surfaces, and posterior buccal surfaces of the teeth. The retainer 700 provides similar advantages to the retainer 100 discussed above. In contrast to the retainer 100 the retainer 700 removes some of the coverage of the buccal surfaces of the anterior teeth. The removal of the coverage of the buccal surfaces of the anterior teeth increase the overall aesthetic appeal of the retainer 700.

FIGS. 8A-8D illustrates various views of a retainer 800 in accordance with some embodiments. FIGS. 8A-8D illustrate a bottom view, isometric view, side view, and front view respectively of a retainer 800 made using additive printing, such as 3D printing. The retainer 800 covers the lingual surface, a portion of the buccal surface, and the lingual and buccal surfaces of both of the terminal molars. The retainer 800 includes a bar shaped to run along the buccal and lingual surfaces of the teeth between the two terminal molars. The retainer 800 has reduced overall tooth coverage that allows for increased occlusal settling and improved patient comfort. The material of the bars and other portions of the retainer can be tailored to provide the desired physical properties. For example, the thickness can be increased regionally to increase the force applied to the teeth if they start to move out of alignment. The removal of the palate coverage may also reduce the retainer's 800 impact on speech.

FIGS. 9A-9D illustrates various views of a retainer 900 in accordance with some embodiments. FIGS. 9A-9D illustrate a bottom view, isometric view, side view, and front view respectively of a retainer 900 made using additive printing, such as 3D printing. The retainer 900 covers the lingual surface and a portion of the buccal surface of all the teeth except the terminal molars. The terminal molars are completely covered by the retainer 900. The retainer 900 does not include occlusal coverage of the teeth, with the exception of the two terminal molars. The retainer 900 includes a bar shaped to run along the buccal surfaces of the teeth between the two terminal molars. The retainer 900 also includes full palatal coverage. The retainer 900 provides increased lateral stiffness with the palatal coverage that can be useful for retaining an expanded arch post treatment. The retainer 900 provides less coverage on the buccal surfaces that can be more aesthetically pleasing. The occlusal openings of the retainer allow for occlusal settling post treatment.

FIGS. 10A-10D illustrates various views of a retainer 1000 in accordance with some embodiments. FIGS. 10A-10D illustrate a bottom view, isometric view, side view, and front view respectively of a retainer 1000 made using additive printing, such as 3D printing. The retainer 1000 covers the lingual surfaces, occlusal surfaces, and buccal surfaces of the teeth with the exception of the buccal surfaces of the anterior teeth. The retainer 1000 also includes full palatal coverage. The retainer 1000 provides increased lateral stiffness with the palatal coverage that can be useful for retaining an expanded arch post treatment. The retainer

1000 provides substantially full coverage on the posterior teeth to retain alignment post treatment. The retainer 1000 provides an opening on the buccal surfaces of the anterior teeth to increase aesthetics of the retainer 1000. The retainer provides substantially full lingual coverage on the anterior teeth to provide additional support to the anterior teeth to maintain their position post treatment.

FIGS. 11A-11D illustrates various views of a retainer 1100 in accordance with some embodiments. FIGS. 11A-11D illustrate a bottom view, isometric view, side view, and front view respectively of a retainer 1100 made using additive printing, such as 3D printing. The retainer 1100 covers the lingual surfaces, occlusal surfaces, and buccal surfaces of the teeth. The retainer 1100 also includes palatal coverage. The palatal coverage is shaped such that it can function as a rapid plate expander. The retainer 1100 provides increased lateral forces with the palatal coverage that can also be useful for retaining an expanded arch post treatment. The palatal coverage portion of the retainer extends from the lingual surfaces of the posterior teeth but not the lingual portion of the anterior teeth. The retainer 1100 provides substantially full coverage on the posterior teeth to retain alignment post treatment. The configuration of the retainer 1100 allows the doctors to have the option to use a rapid palate expander post treatment of arch expansion in order to maintain expansion as well as retain the position of the teeth post treatment.

FIGS. 12A-12D illustrates various views of a retainer 1200 in accordance with some embodiments. FIGS. 12A-12D illustrate a bottom view, isometric view, side view, and front view respectively of a retainer 1200 made using additive printing, such as 3D printing. The retainer 1200 is designed to cover buccal surfaces, lingual surfaces, occlusal surfaces, and incisal surfaces of the teeth. The illustrated retainer 1200 is designed with a complementary shape to the patient dental anatomy such that substantially all of the top or bottom teeth are covered by the retainer 1200 when worn by the patient. The retainer 1200 offers many of the benefits of the retainer 100 discussed above. The retainer 1200 also includes a mandibular advancement feature 1202. The retainer 1200 provides the doctor with the option to retain Class II correction while also retaining alignment of the other teeth post treatment.

FIGS. 13A-13D illustrates various views of a retainer 1300 in accordance with some embodiments. FIGS. 13A-13D illustrate a bottom view, isometric view, side view, and front view respectively of a retainer 1300 made using additive printing, such as 3D printing. The retainer 1300 is designed to cover buccal surfaces, lingual surfaces, occlusal surfaces, and incisal surfaces of the teeth. The illustrated retainer 1300 is designed with a complementary shape to the patient dental anatomy such that substantially all of the top or bottom teeth are covered by the retainer 1300 when worn by the patient. The retainer 1300 also includes a mandibular advancement feature 1302 and a rapid palatal expander. The retainer 1300 provides the doctor with the option to provide a patient with a rapid palatal expander and a mandibular advancement feature. The retainer 1300 can provide an expanded arch, Class II correction, and also retaining alignment of the other teeth post treatment.

FIGS. 14A-14D illustrates various views of a retainer 1400 in accordance with some embodiments. FIGS. 14A-14D illustrate a bottom view, isometric view, side view, and front view respectively of a retainer 1400 made using additive printing, such as 3D printing. The retainer 1400 is designed to cover buccal surfaces, lingual surfaces, occlusal surfaces, and incisal surfaces of the teeth. The illustrated retainer 1400 is designed with a complementary shape to the patient dental anatomy such that substantially all of the top or bottom teeth are covered by the retainer 1400 when worn by the patient. The retainer 1400 offers many of the benefits of the retainer 100 discussed above. The retainer 1400 also includes a solid occlusal mandibular advancement feature 1402 on the upper posterior teeth. The solid occlusal mandibular advancement feature on the upper posterior teeth can be used to provide treatment of Class II correction. The retainer 1400 can be used as a companion device for retaining teeth positioning post Class II correction. The ability to manufacture the occlusal mandibular advancement feature (which may be solid and/or monolithic) with additive manufacturing can increase the durability of the solid occlusal mandibular advancement feature.

FIGS. 15A-15D illustrates various views of a retainer 1500 in accordance with some embodiments. FIGS. 15A-15D illustrate a bottom view, isometric view, side view, and front view respectively of a retainer 1500 made using additive printing, such as 3D printing. The retainer 1500 is designed to cover buccal surfaces, lingual surfaces, occlusal surfaces, and incisal surfaces of the teeth. The illustrated retainer 1500 is designed with a complementary shape to the patient dental anatomy such that substantially all of the top or bottom teeth are covered by the retainer 1500 when worn by the patient. The retainer 1500 offers many of the benefits of the retainers 100 and 1400 discussed above. The retainer 1500 also includes a monolithic occlusal mandibular advancement feature 1502 on the upper posterior teeth. The solid occlusal mandibular advancement feature 1502 on the upper posterior teeth can be used to provide treatment of Class II correction. The retainer 1500 can be used as a companion device for retaining teeth positioning post Class II correction. The ability to manufacture the solid occlusal mandibular advancement feature with additive manufacturing can increase the durability of the solid occlusal mandibular advancement feature.

The additive manufacturing processes described herein allow for additional customization of the color and other aesthetic aspects of the retainer. For example, the colors of the retainer can be selected to match natural tooth colors or decorative colors can be used for improved aesthetics.

Figure 16:
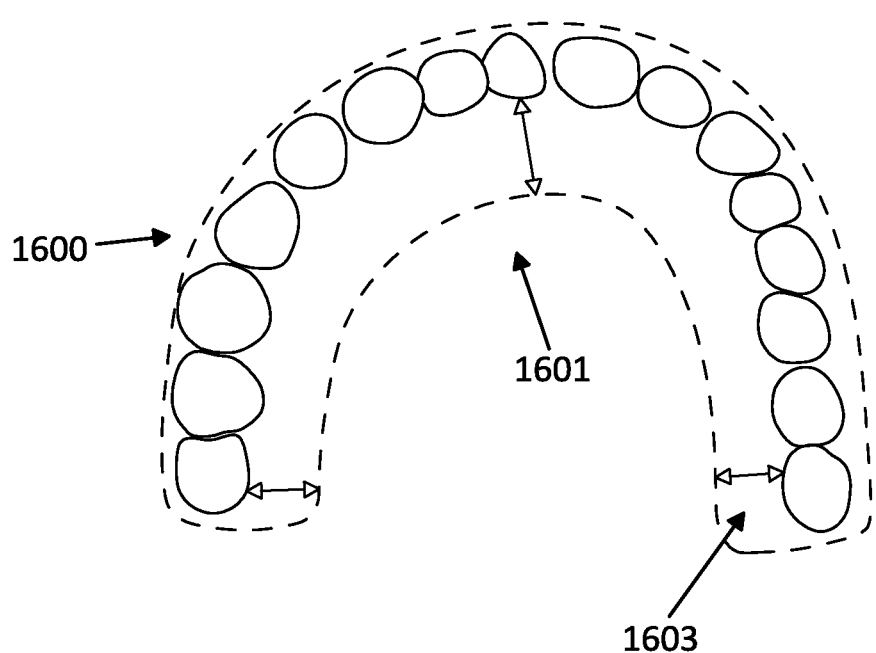
FIG. 16 illustrates a retainer having a gingival-covering region on the lingual sides.

FIG. 16 illustrates a retainer 1600 in accordance with some embodiments. The retainer 1600 includes an increased cut-line 1601 on the lingual side of the retainer/aligner, forming a gingival covering region on this side, which may increase the stiffness of the apparatus and therefore the force placed on the teeth 1603. The retainer 1600 can be used with additive manufacturing and can include multiple different materials.

Both hard and soft materials can be used with the additive manufacturing process to improve the comfort of the retainer 1600 while still providing adequate mechanical support to the teeth. The use of multiple materials and additive manufacturing can also allow for the improved integration of the retainer with sleep appliances. For example, the retainer made via additive manufacturing can be designed to engage with or work with specific sleep appliance designs. Additive manufacturing also allows for the integration of additional items, such as sensors with the retainer configuration. In one example, one or more glucose sensors could be integrated into the retainer to measure glucose levels for patients with diabetes.

Figure 17A:
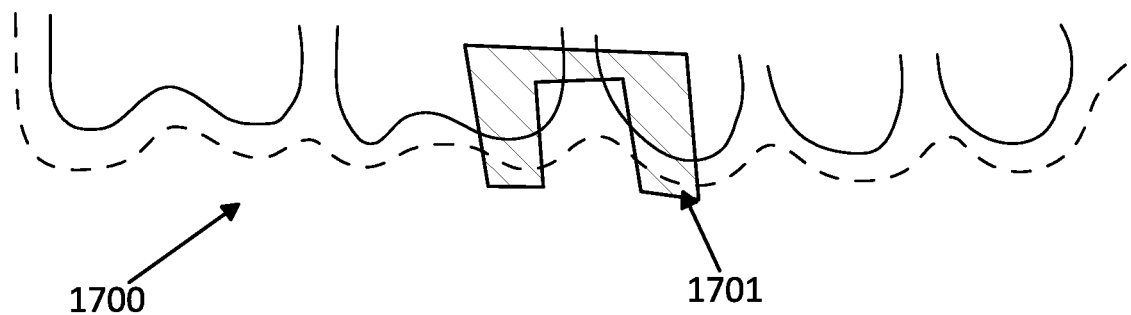
FIGS. 17A-17B illustrate retainers having features such as a universal connectors (for connecting one or more additional element), thicker regions and/or stiffening members.
Figure 17B:
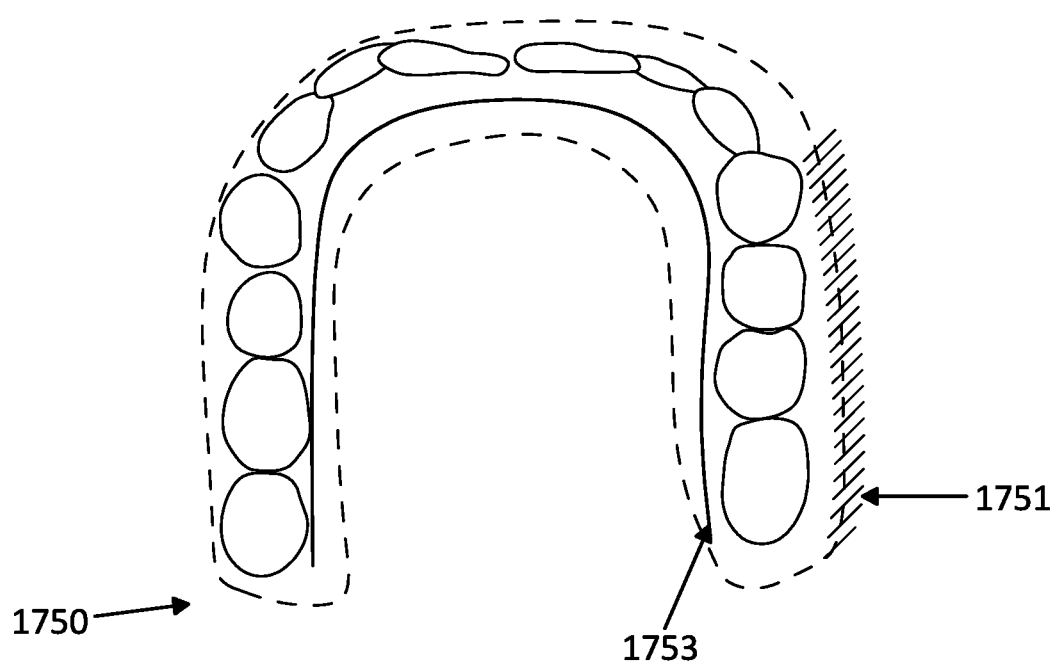

FIGS. 17A-17B illustrate additional embodiments of retainers. FIG. 17A shows a retainer 1700 made from additive manufacturing that includes a universal attachment (shown here as a dovetail adapter 1701) on one or more locations. The universal attachment (e.g., dovetail adapter) can be used to integrate features such as the mandibular advancement feature, sleep devices, bite guards, etc. The size and configuration of the universal dovetail adapter can be designed to have a complementary structure. FIG. 17B illustrates another embodiment of a retainer 1750. The illustrated retainer 1750 includes a thicker posterior base 1751, along with an embedded stiffening element (e.g., wire 1753). The wire can be made out of a shape memory material such as a nickel titanium alloy. The wire can provide additional structural support to control the force exerted on the teeth.

Figure 18A:
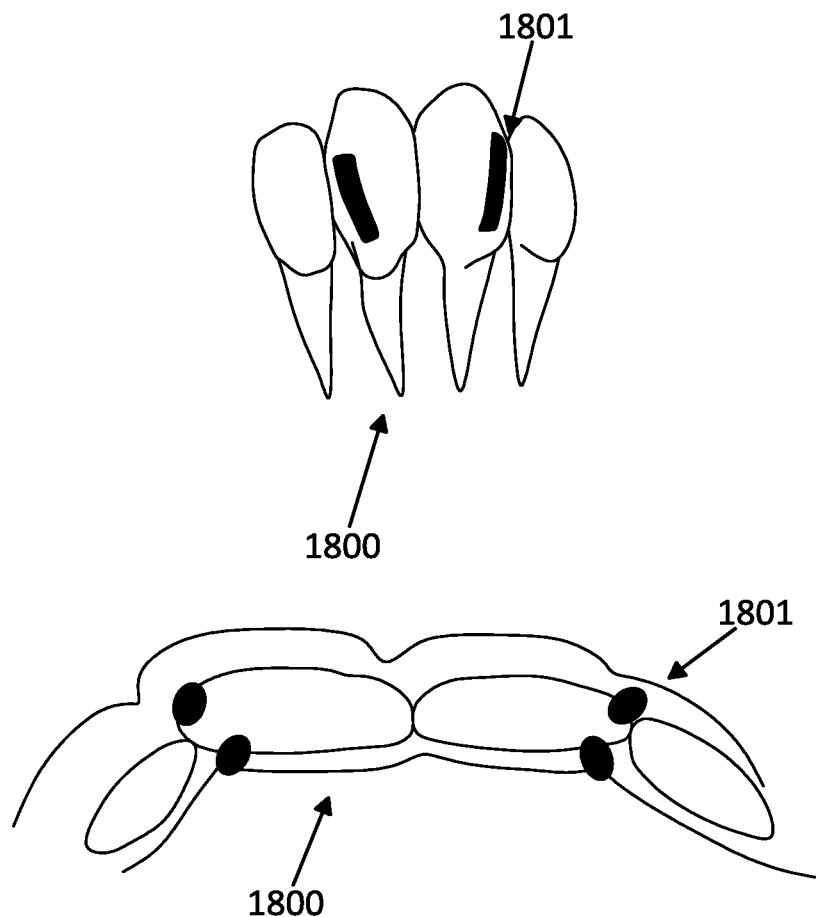
FIGS. 18A-18B illustrate additional embodiments of retainers having additional features such as ridges (e.g., press ridges), and/or variable thicknesses.
Figure 18B:
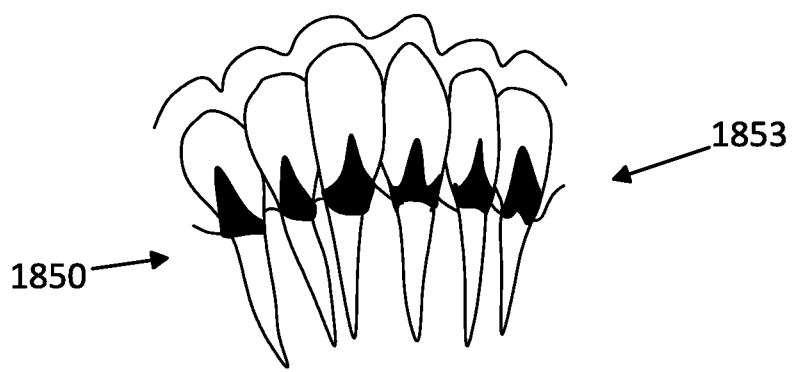

FIGS. 18A-18B illustrate additional embodiments of retainers. FIG. 18A illustrates a retainer 1800 with ridges 1801 configured to stop diastema post treatment. FIG. 18B illustrates a retainer 1850 with a variable thickness 1853.

Figure 19A:
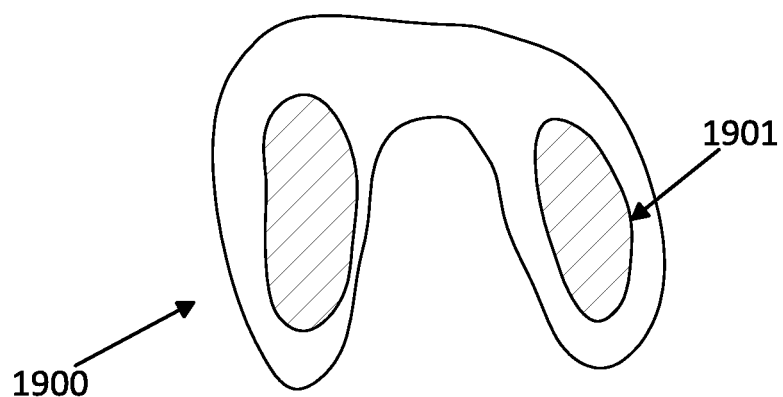
FIGS. 19A-19B illustrate additional examples of retainers having voids or openings through the unitary body to increase flexibility.
Figure 19B:
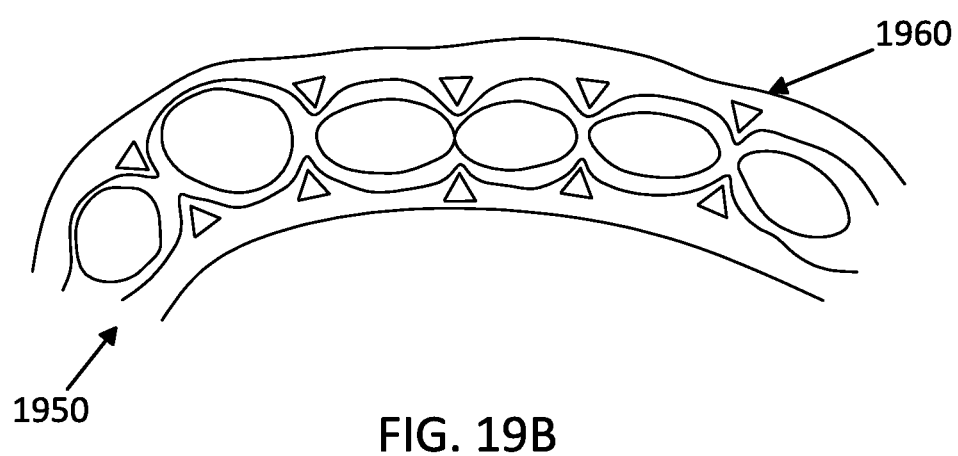

FIGS. 19A-19B illustrate additional embodiments of retainers. FIG. 19A illustrates a portion of a retainer 1900 that is also used as a night guard to prevent damage from grinding teeth together. The retainer 1900 illustrated in FIG. 19A shows a thicker flat occlusal surface 1901 to provide protection from grinding.

FIG. 19B shows a retainer 1950 with an interproximal support feature 1960 that may modify the stiffness of the retainer, including protecting against arch relapse. In particular, regions of the device (e.g., in the pockets) corresponding to the interproximal regions of the teeth 1960 may be configured to be more compliant than the main body of the device. For example an interproximal support feature can include one or more voids, openings, or open spaces to decrease the stiffness of the interproximal region relative to solid interproximal support features. In some cases the interproximal region 1960 can be made out of a less rigid material than the retainer material used in the unitary body. The use of a less stiff material for the interproximal support region 1960 may allow the retainer to extend further into the interproximal spaces between the teeth. The interproximal support feature(s) 1950 can provide better control of the tooth position and provide additional protection against relapse. The use of a stiffer material for the interproximal support feature may otherwise make it more difficult, or uncomfortable, to place and remove the retainer from the patient's mouth. The use of a more compliant/less stiff interproximal support region may allow some of the retainer material farther into the interproximal spaces than would otherwise be possible, protecting against relapse. Thus, although the overall stiffness of the retainer may be greater with interproximal supports, this effect is achieved by making the material forming the interproximal support less stiff than the retainer in this region (e.g., if it were to have a solid structure in the interproximal region, for example) would otherwise be. In FIG. 19B, the reduced stiffness in the interproximal region may be achieved by the geometry of the material, by using a locally more compliant material, or both.

FIG. 20 illustrates additional embodiments of retainers. FIG. 20 shows a retainer 2000 for use during the day and a retainer 2050 for use at night. The day retainer 2000 and night retainer 2050 can each be made via additive manufacturing from the scan of the patient anatomy. The day retainer 2000 has a smaller profile to provide support while also improving the aesthetic of the retainer. The night retainer 2050 provides full coverage and support and is designed to be worn at night.

The retainers described herein can also be designed for use by patients who have mixed dentition where a full coverage is not recommended as some teeth might be in the process of eruption. The retainers can be used for patients where posterior open bites are present to allow for settling of the occlusion. The retainers can be also be used in cases where there was a deep bite that was improved by the treatment. Some retainers may not have occlusal coverage or reduced occlusal coverage for cases where a posterior force is undesirable. For example, a lack of posterior force may be desirable to avoid making teeth to intrude as that is not recommended for use with patients that have deep bite conditions. A current commercial version of a retainer that can be improved through the use of additive manufacturing is the Hawley retainer that is made from a stainless-steel wire and some acrylic that covers the palatal. The retainer illustrated in FIGS. 21A-21B can be used to treat many of these conditions and can be made by additive manufacturing without the use of a wire that is not aesthetically pleasing.

Figure 21A:
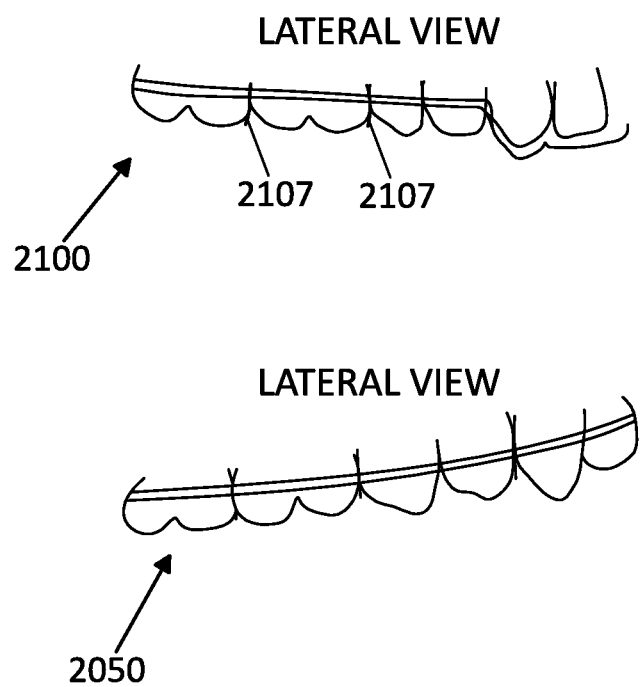
FIGS. 21A-21B illustrates retainers including a buccal bar.
Figure 21B:
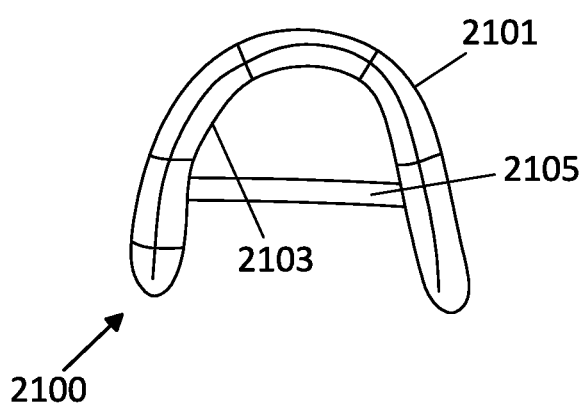

FIGS. 21A-21B illustrate a retainer in accordance with some embodiments. FIG. 21A shows two different lateral views of the retainer 2100. The retainer 2100 includes a clear bar and hooks 2107. FIG. 21B illustrates a top view of the retainer 2100. FIG. 21B shows a clear buccal bar 2101 and a clear lingual bar 2103. The retainer 2100 can also include a retention bar across the palatal portion of the retainer to increase the strength of the retainer. The retainer 2100 can provide similar benefits to the patient as a conventional Hawley retainer but without the use of wires and other less aesthetically pleasing components. The use of additive manufacturing allows for the retainer to be made specifically for the patient out of a plastic material without the use of wires or metal. The retainer shown in 2100 FIGS. 21A-21B has no posterior occlusal coverage to allow occlusion to settle once the treatment is finished. The retainer 2100 shown in FIGS. 21A-21B can help for cases with POB where wearing a full coverage retainer cause the dental conditions to worsen. Additional advantages of the retainer 2100 shown in FIGS. 21A-21B include a clear and aesthetically pleasing design that is convenient and allows for settling of the occlusion. In contrast to the retainer 2100 shown in FIGS. 21A-21B, the commercially available Clear-Bow retainer only has a clear bar on the anterior teeth and does not include a bar over the posterior teeth.

Figure 22:
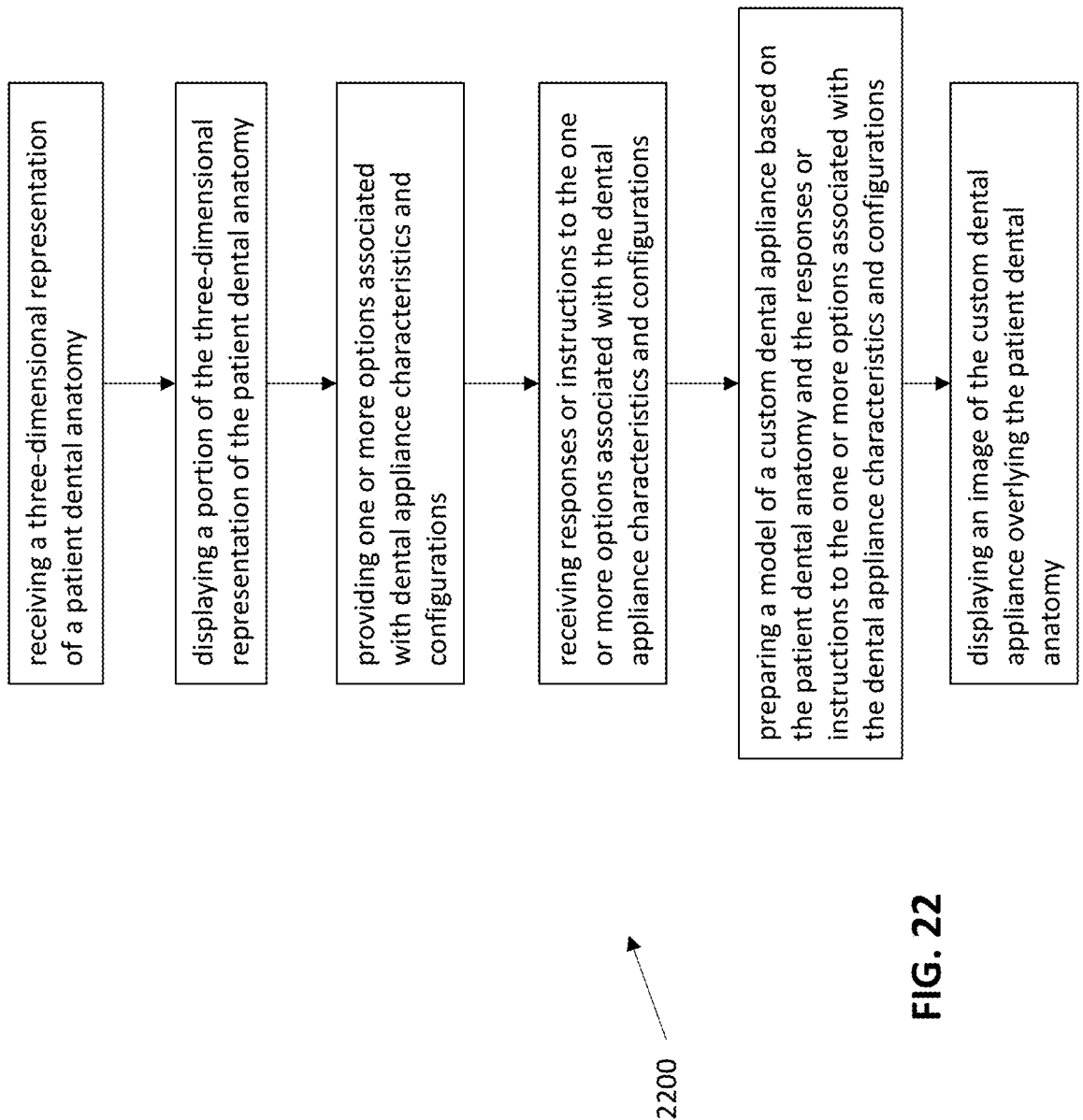
FIG. 22 illustrates a method 2200 for planning a patient-specific retainer device.

FIG. 22 illustrates a method 2200 for planning a patient-specific retainer device. The method can include: receiving a three-dimensional representation of a patient dental anatomy, displaying at least a portion of the three-dimensional representation of the patient dental anatomy; providing one or more options associated with retainer configurations, the one or more options including a palatal configuration, an anterior teeth coverage configuration, and a posterior teeth coverage configuration; providing one or more add-on options for the retainer; receiving responses or instructions to the one or more options and one or more add-on options; and preparing a model of a custom retainer based on the patient dental anatomy and the responses or instructions to the one or more options and one or more add-on options. The methods can further include displaying an image of the custom retainer overlying the three-dimensional representation of the patient dental anatomy. Examples of the anterior teeth coverage configuration and the posterior teeth coverage configuration include options for buccal coverage, lingual coverage, and occlusal coverage for the anterior teeth and the posterior teeth. Examples of the add-on options for the retainer include one or more of: a protrusion, tab, hook, or other attachment structure configured to attach a rubber band, a slot configured to attach a rubber band, a mandibular advancement feature, a ramp, a gingival support region, a thickened base region, and a plurality of ridges. Examples of the custom retainers include any of the retainers described herein.

Any of the apparatuses (e.g., retainers) described herein may be configured to include one or more gaps or spaces for erupting teeth and/or may be configured to constrain the movement of the adjacent teeth to prevent them from moving into the space where the erupting tooth should fit. For example, a retainer may include a space or gap near the gum line (when worn) but the region above the gum line may include a spacer to prevent movement of the adjacent teeth into this region.

As mentioned above, any of the retainer described herein may have regions of greater or lesser thickness. The thicknesses of regions around teeth that are more prone to relapse from orthodontic movement bay be greater than the thicknesses of other regions. For example if a particular tooth or teeth has been moved more than other teeth, the lingual, buccal, and in some variations occlusal regions of the retainer around this tooth or teeth may be thicker compared to regions around other teeth (e.g., based on how far the teeth has been moved during treatment). Alternatively or additionally, the dental professional (e.g., dentist, orthodontist, etc.) may select one or more teeth to provide additional support. An apparatus may highlight candidate teeth (e.g., based on the total movement during treatment) to the user (e.g., dental professional) for selection to have additional support/retention, e.g., by increasing the thickness in the regions around the tooth.

Thus, in general, the user interface for a user designing a retainer may include controls allowing the user to select teeth for additional support or retention, and/or for selecting the thickness of various regions and/or for selecting the material from which the appliance will be constructed. In some variations, the user interface may allow the user (dental professional) to select which regions to include in the retainer (e.g., anterior tooth engaging region, posterior tooth engaging region (s), palatal region, etc.).

Any of the methods described herein may include digital processes for designing and fabricating a removable retainer (e.g., a removable Phase I orthodontic retainer) such as those described herein. These processes may reduce or eliminate the need for taking an alginate impression of the maxillary arch and pouring a mold such as a quick-set plaster model. They may also eliminate or reduce the need for manual steps to thermoform, mark, trim and polish the device. As mentioned, described herein are additive manufacturing techniques that use materials with a higher modulus for rigidity and/or multi materials with a mix of high modulus and soft durometer for comfort. Retainer designs can have variable cross-sectional thickness as well as decorative and identifying features in the design of the retainer.

Figure 23:
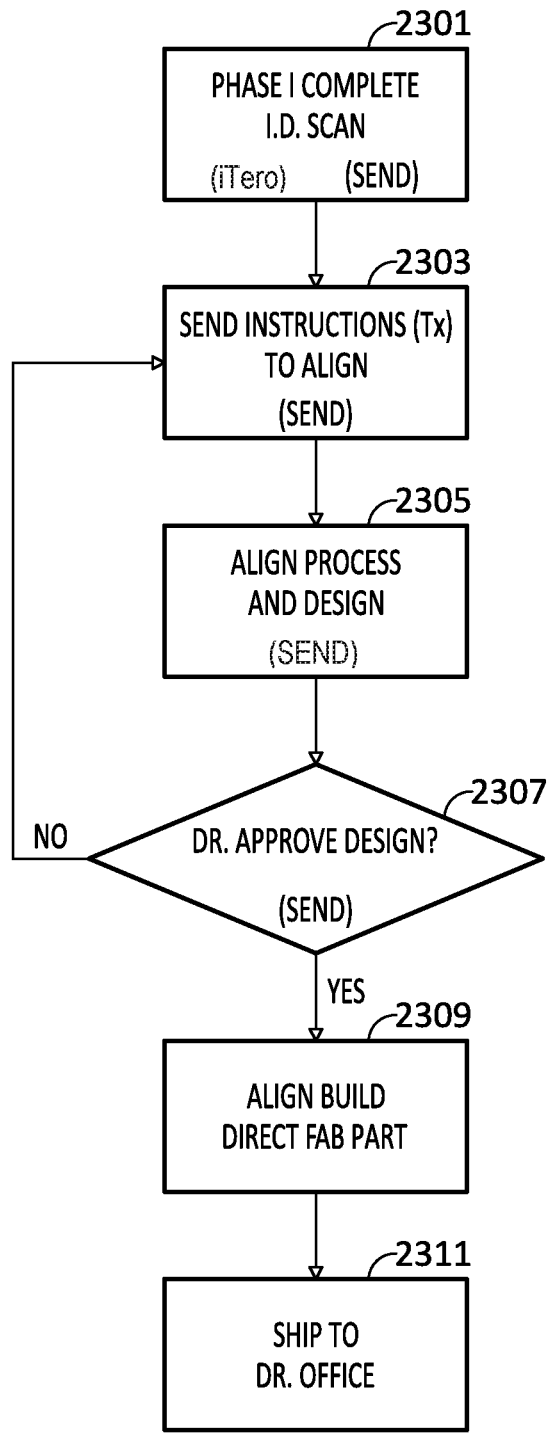
FIG. 23 illustrates an example of a method of designing and building a retainer or multiple retainers as described herein.

For example, FIG. 23 illustrates a schematic of one method of designing and manufacturing a retainer as described herein. In FIG. 23, the treatment is completed 2301 and a scan of the patient's teeth is taken 2303 (e.g., by iTero™ scanner). This scan is sent, with instructions to the lab 2305, where processing occurs to design the retainer(s) and a digital representation of the retainer(s) is/are sent to the dental professional to approve 2307. Alternatively, the dental professional may aid in the design of the retainer(s) directly, e.g., through a user interface showing a digital representation of the patient's teeth and/or allowing the user to select features of the retainer(s). Until the design is approved, the instructions (from the physician) may be used to iterate the design process. Once the design is approved by the physician 2309 (and in some variations, the apparatus may automatically monitor and approve/flag the design), the design manufactured, e.g., by the lab, and shipped to the dental professional's office and/or directly to the patient 2311.

In general, as mentioned above, any of the retainers described herein may be helpful to maintain palatal expansion (after a palatal expansion procedure). Such procedures are often performed on children, for whom there are few permanent teeth.

In general, also described herein are digital process for designing and fabricating a removable orthodontic retainer. These processes may reduce or eliminate the need for taking impressions (e.g., an alginate impressions) of the maxillary arch and pouring a model (e.g., quick-set model). They may also eliminate the manual steps required to thermoform, mark, trim and polish the device. As mentioned, these method may include fabrication by additive manufacturing technology (e.g., 3D printing) using materials with a higher modulus for rigidity and/or multi materials with a mix of high modulus and soft durometer for comfort. Retainer designs can have variable cross sectional thickness as well as decorative and part identifying features in the design. For example, described herein are retainers made with the methods discussed above.

Figure 24B:
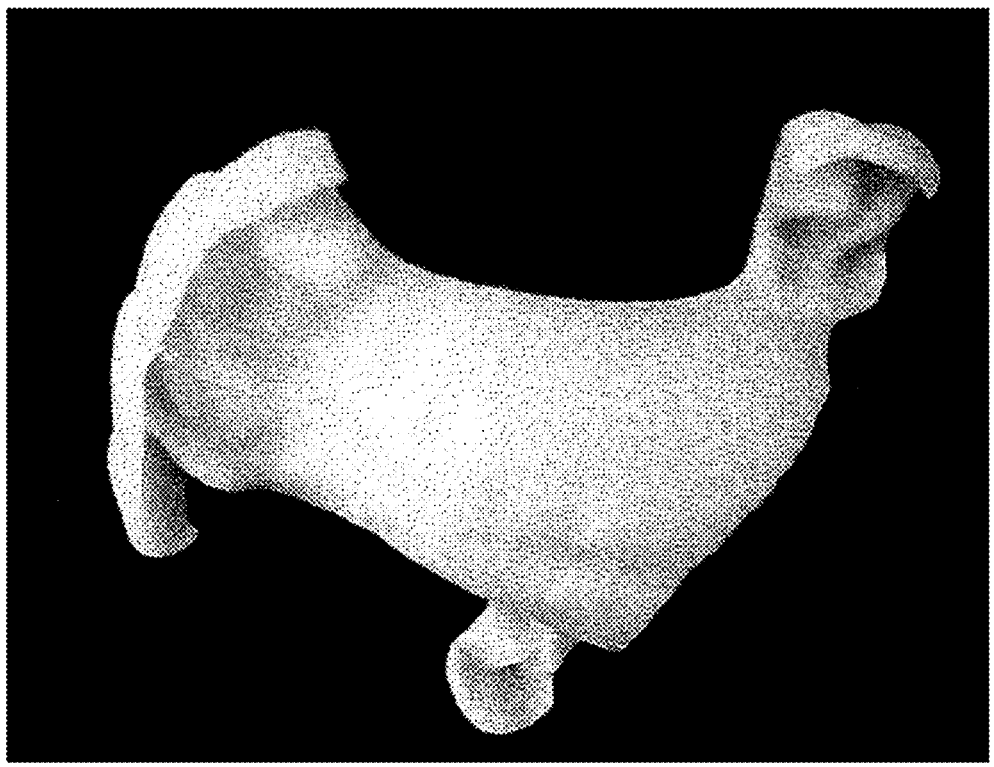
FIGS. 24A-24C illustrate examples of retainers.
Figure 24A:
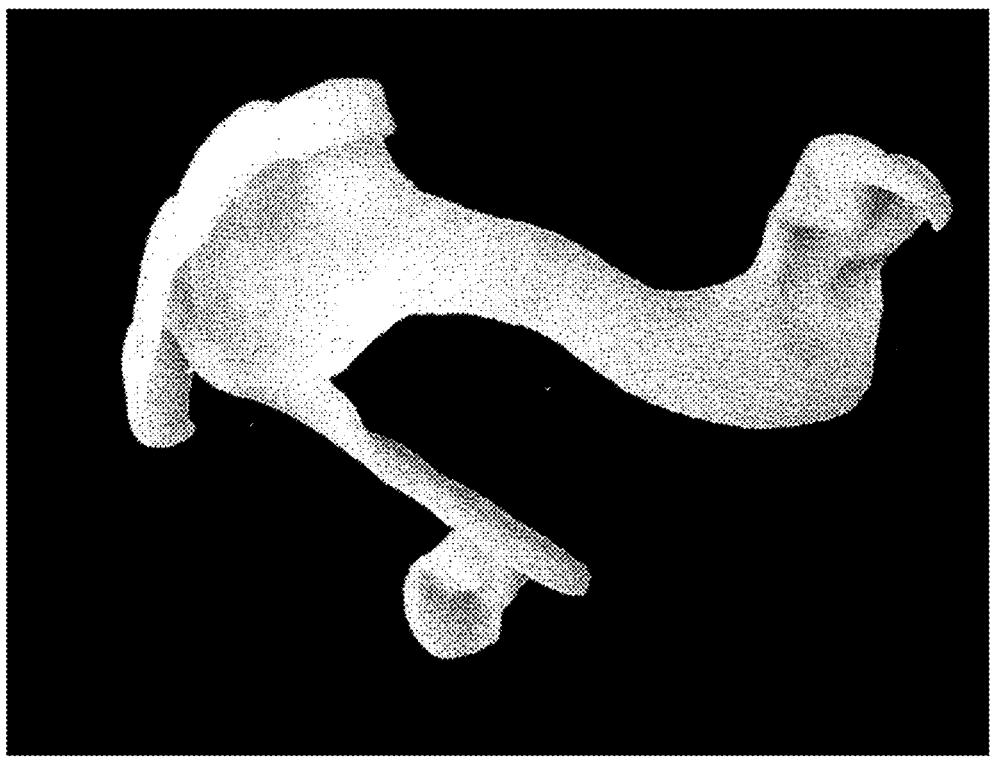

For example, FIG. 24 illustrates one example of a customized retainer as described herein. In this example, a posterior portion of the palatal section has been removed (cut out) to allow additional room for the tongue, enhancing comfort, and reducing material cost and time to manufacture. In any of these variations, the palatal area may be customizable; it can contact the tissue or have clearance. In FIG. 24A, the tooth-containing regions (e.g., the anterior tooth-containing region and at least a portion of the posterior tooth-containing region) is cut-away, exposing the primary teeth and allowing exfoliation and eruption (there is clearance around exfoliating and eruption crowns in this example; the cut away region is customizable). The permanent crowns may be held by the appliance, to maintain the spacing. Occlusal coverage of permanent crowns may also help prevent passive eruption. Additionally, if the permanent anterior teeth or permanent molar need additional room to erupt, space can be designed for them to erupt into (eruption compensation) within the retainer. This may allow the retainer to maintain palatal expansion and permanent teeth (anterior and molars).

Figure 24C:
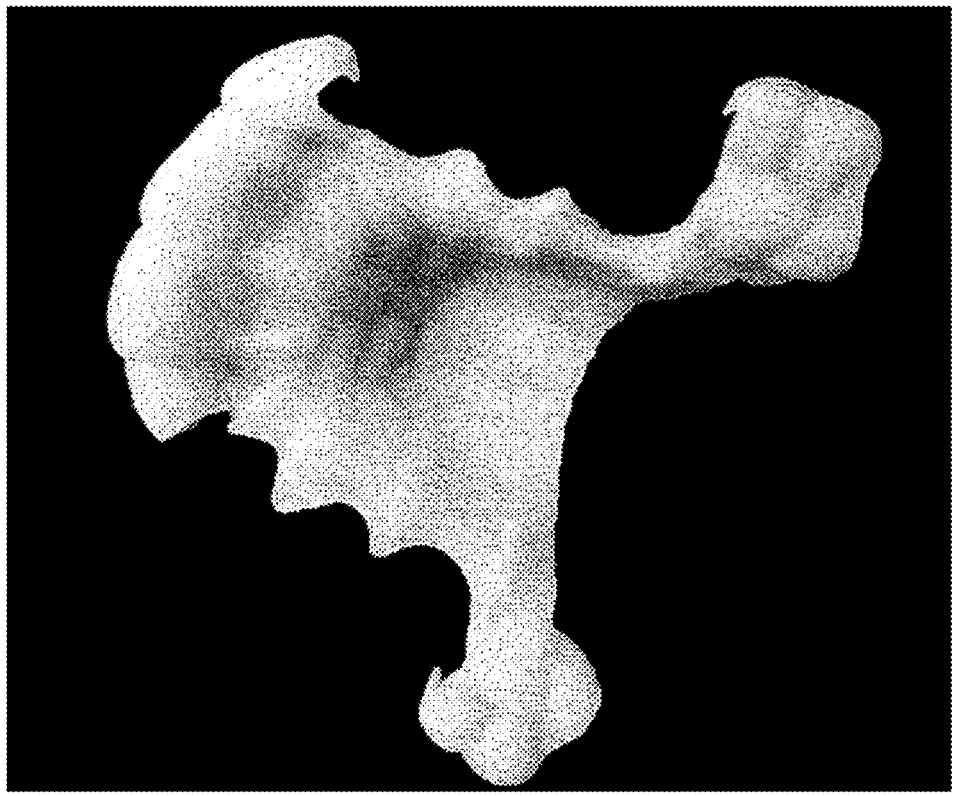

FIG. 24B illustrates another example of a retainer including a full palatal section that may provide maximum stiffness (this region may also be customized, as described above; e.g., it may include one or more cut-out regions, and/or may contact the palate or have an offset from palate surface). The tooth-containing regions may include cut-away regions for primary teeth exfoliation and eruption (in this example, there is clearance around exfoliating and eruption crowns in this example but the cut away region is customizable). The apparatus may also allow capture the permanent crowns for maintenance of spacing of teeth following the orthodontic procedure. Additionally, if the permanent anterior teeth or permanent molar need additional room to erupt, space can be designed for them to erupt into (eruption compensation). Occlusal coverage of permanent crowns may prevent passive eruption. These retainers may provide the ability to maintain palatal expansion and anterior tooth alignment. The example shown in FIG. 24C is similar to that shown in FIG. 24B, but has a contour of the lingual side of the primary teeth. This variation is also includes a cut out region for exfoliation and eruption (the lateral sides).

Figure 25:
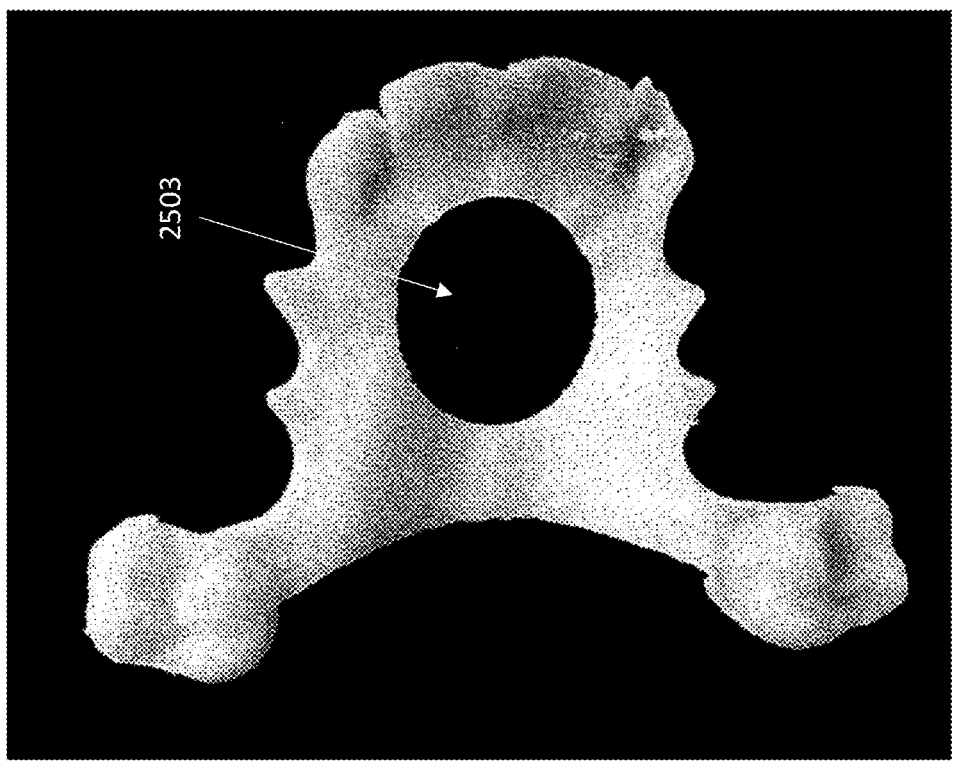
FIG. 25 shows a retainer similar to the retainer of FIG. 24C but includes a central cut-our region within the palatal region.

FIG. 25 shows another example of an apparatus similar to that shown in FIG. 24B, including a full palatal section, however it include a central opening 2503 through the palatal region. This variation may be safer for use, particularly by a child, if the device were to be swallowed. Again the apparatus is customizable. For example, one or more holes or openings may be included, a contact palate may be included, and/or an offset from palate surface may be included. As above, cut-away regions in the tooth-containing portions may allow space for primary teeth exfoliation and eruption (e.g., there is no clearance around exfoliating and eruption crowns in this example but the cut away region is customizable). In some variations, for esthetics on the anterior, the device may cover only the lingual surface of the anterior teeth, to help retain the teeth (e.g., for space maintenance) and to allow passive eruption. In this example the posterior tooth-containing region may capture the permanent molar crowns to help maintain the tooth spacing; in addition, occlusal coverage of permanent molars may prevent passive eruption of the teeth. Thus, this variation may also maintain palatal expansion and anterior tooth alignment.

Figure 26:
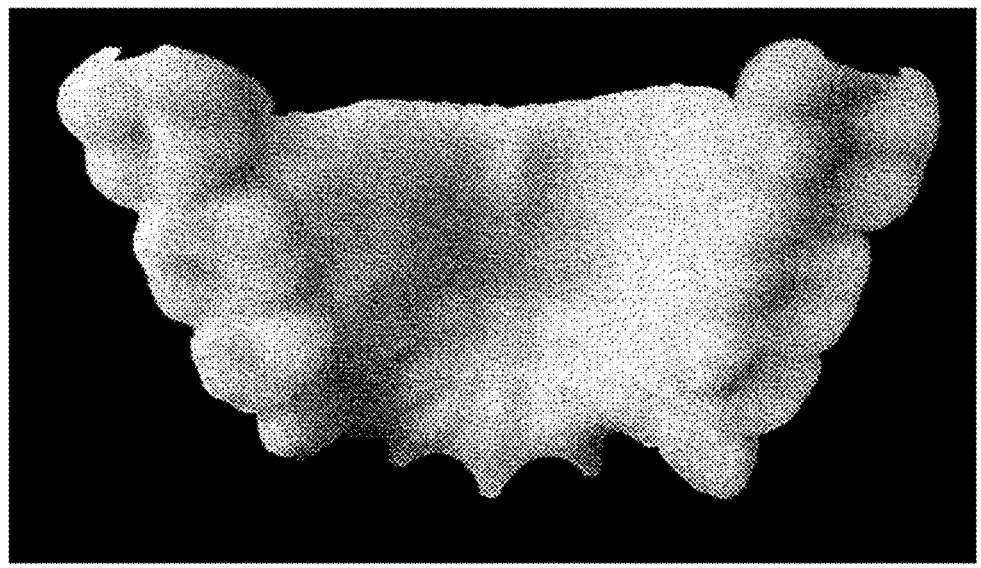
FIG. 26 is another example of a retainer including posterior tooth-retaining regions, and a palatal region, but missing the anterior tooth-regaining region.

FIG. 26 shows another example of a retainer as described herein. In this example, the retainer does not include an anterior tooth-retaining portion (anterior teeth region). In addition, this retainer shape may also be further customized to remove coverage over any teeth that may need additional space in which they can erupt into (e.g., eruption compensation). The area around the crowns can have permanent teeth eruption compensation room, allowing space for erupting teeth to fully erupt.

Figure 27:
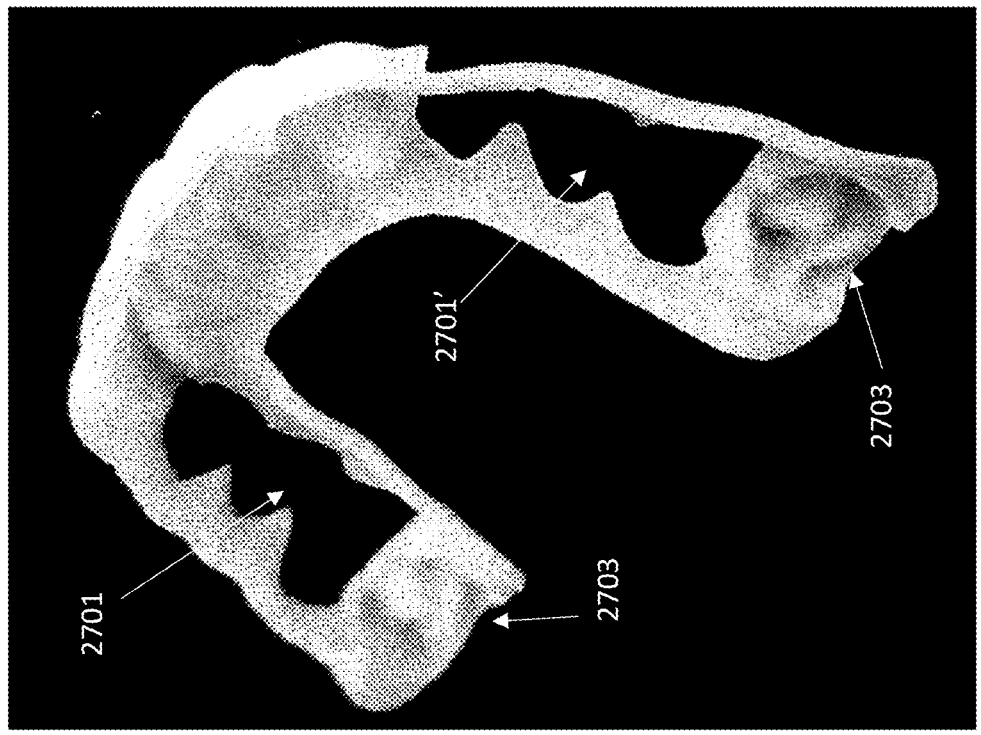
FIG. 27 is another example of a retainer having an anterior tooth-retaining region and a pair of partial posterior tooth retaining regions missing occlusal portions over the majority of the tooth-retaining regions.
Figure 28:
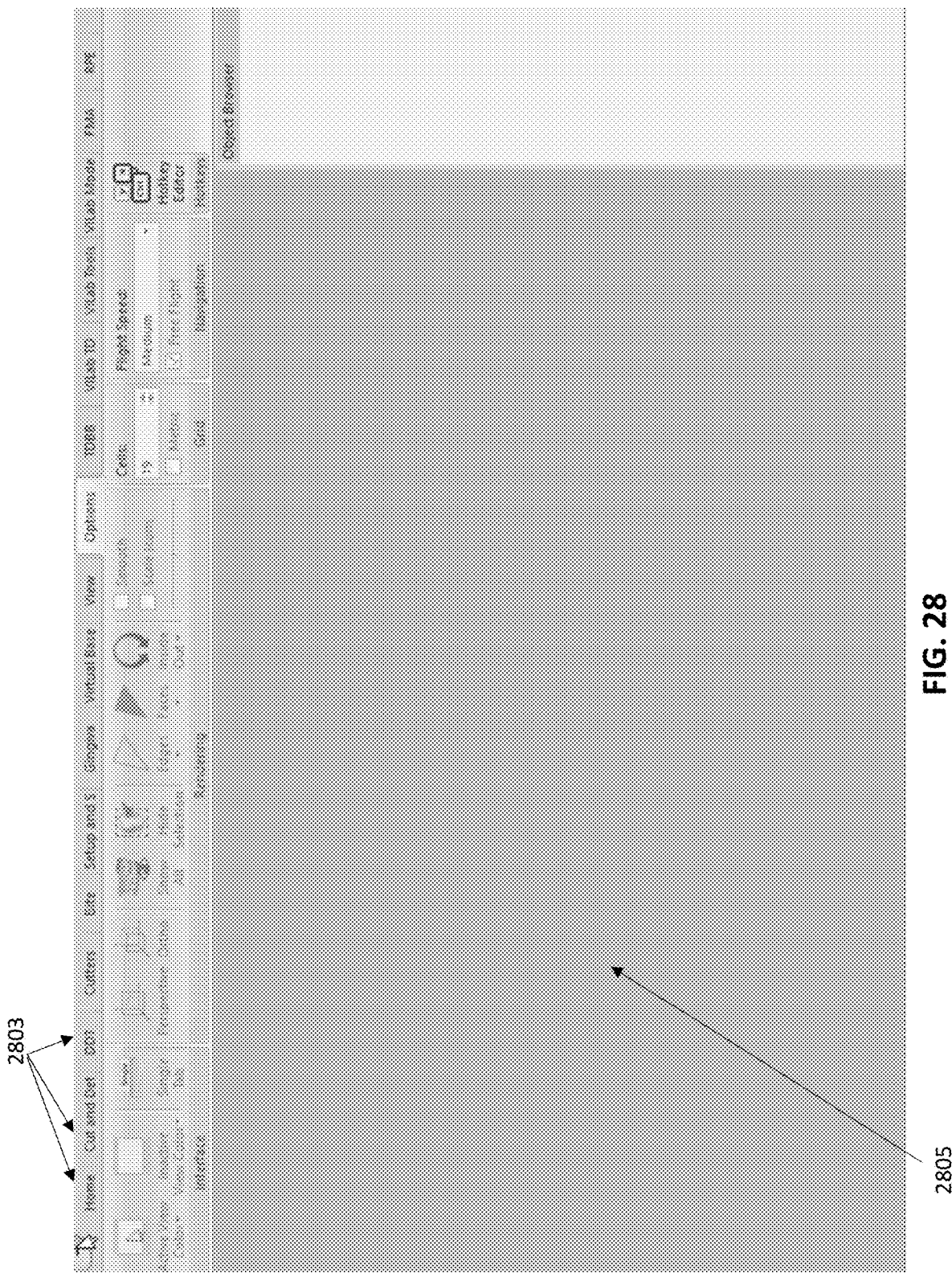
FIG. 28 is an example of a user interface for an apparatus for designing a retainer as described herein.

FIG. 27 is another example of a retainer as described herein. In this example, the apparatus includes an anterior tooth-retaining region, and includes clearance around exfoliating and eruption crowns (shown as cut away regions 2701, 2701'). The permanent crowns are captured within the posterior tooth-retaining region 2703, 2703', for maintenance of the tooth spacing. In FIG. 28, permanent crowns include occlusal coverage (occlusal surfaces) to prevent passive eruption. Additionally, if the permanent anterior teeth or permanent molars need additional room to erupt, space can be designed for them to erupt into (eruption compensation). These apparatuses may maintain palatal expansion and anterior tooth alignment.

In general, the custom, patient-specific phase I retainers described herein may be made by digital processing, additive manufacturing and may be designed to: maintain permanent tooth position, allow for primary teeth eruption, provide space maintenance, prevent passive eruption, and/or maintain palatal expansion.

These retainers may include any combination of: full palatal width for rigidity (e.g., one size fits all or with control of: contacting the palate or offset from palate and/or thickness of the trans palatal arch), one or more holes in the palate (of any other shape for choking safety); one or more cut away regions in the palate to maximize room for tongue (e.g., enhancing comfort, including one size fits all or control of where the trans palatal arch covers), cut-away regions for primary tooth exfoliation (one size fits all or with control of where to cut away from teeth), encapsulate the permanent teeth to maintain tooth alignment, space maintenance, eruption compensation, and/or prevent passive eruption (one size fits all or control of tooth coverage), no buccal coverage of anterior teeth for esthetic (e.g., one design or control of how much anterior tooth will be covered), pre-made selections of different occlusal thickness or control of occlusal thickness, pre-made occlusal shape or control of occlusal shape (with cusps or flat), and/or including identifier (e.g., ID number) or data matrix in the design These retainers may require less manual processing to make the retainer (e.g. eliminating or reducing the need for alginate impressions, plaster model, thermoforming, marking, trimming and polishing). Digitizing the retainer process will enable a menu of choices for retainers (palatal offset, clearance around exfoliating primary or erupting permanent dentition, occlusal thickness . . . etc.). The digital workflow may also enable tooth movement (treatment) in some oral regions while retaining in other areas. The use of additive manufacturing with superior material properties may enable more comfort to the patient (e.g. thinner cross sections with the same rigidity, accurate parts (no warping) and multi-material/different durometer capability. Unlike thermoforming, these methods may allow variable cross sectional thickness. Any of these apparatuses may also include decorative features and useful part identification numbers or data matrix information that can be included into the retainer design with additive manufacturing.

Fabrication of Retainers

As mentioned, any of the methods and apparatuses described herein may include apparatuses, including software and firmware, for running on a processor to perform any of the methods, including in particular, software for creating the retainers, including interactively creating the retainers with a dental professional, and fabricating the retainers. For example, described herein are methods and apparatuses (including in particular a set of non-volatile instructions that control a processor to create a retainer by 3D printing (direct fabrication), including creating the retainer shape automatically. The retainer type can be a Phase I retainer (e.g., for use after phase I treatment like rapid arch expansion), or after other orthodontic treatment.

The steps to building a retainer shape may include: building a scan basis (e.g., scan of the patient's teeth, gingiva and, for upper teeth, palatal region); create split curves (e.g., segment the scan); create scan axis curve; build a bottom grid of the retainer by scan palate and crown; build a top grid of retainer, from bottom grid; build a retainer shape from bottom grid and top grid; and export the result (e.g., as a digital file, such as an STL file) for fabrication.

In general, these methods and apparatuses may automatically create retainer shape from a digital file and/or an initial scan of the patient's teeth (e.g., a direct scan or an impression scan), and may save result as a digital file for 3D printing. The retainer shape may be customized for each patient. The user interface may allow customization. The retainer may cover full or partially palate surface, all/some tooth crowns, buccal gingiva side. The thickness of palate, crown and buccal can be set differently, and smoothly changed, in automatic way. The clearance of retainer to palate, tooth crown and gingiva can be set differently. A tag string and/or bar code may be included on the retainer for manufacture, shipping, and user tracking. These retainers may also include and allow space for partially erupted teeth, which may be selected by the user as well.

For example, a user interface may provide a variety of templates that may be modified for the retainer. The tools in the user interface may provide the user with options for including various regions, including tooth-enclosing regions (e.g., anterior tooth-containing region, posterior tooth-containing regions), palatal regions, etc. In addition, all or parts of these various regions may be interactively selected for removal. For example, the user interface may allow the removal of all or a portion of the lingual side of the tooth-enclosing regions, all or a portion of the buccal side of one or more of the tooth-enclosing regions, all or a portion of the occlusal side of one or more of the tooth-enclosing regions, and all or a portion of the palatal region. In addition, the tools may allow the user to select the thickness of these different regions and portions (e.g., the palatal region, the buccal/lingual/occlusal regions of the various tooth-enclosing regions, etc.) and may also be used to select or control the smoothness of these various regions, including in particular the smoothness of the lingual-facing surface of the palatal region.

The methods and apparatuses (including software) described herein may be used to modify region of any of the retainers described herein. For example, the user interface may be configured to allow a user to select controls to adjust the thickness and clearance for crown, buccal and lingual sides of the retainer. For example, the patient's dental arch(s) may be displayed in the user interface and controls may allow selection of various regions forming the dental retainer; the user may drag and drop, for example, these various portions onto the dental arch, or may select them from a pull-down menu, etc. A digital model of the retainer may be manipulated (rotated, enlarged, etc.) by the user, and regions may be modified for thickness, extent, etc. by selecting one or more controls (e.g., buttons, etc.). The user interface may be a visual or display user interface.

For example, a user interface may allow the user to create a retainer shape for 3D printing. The formation of the retainer may including preparing a digital model that can be manipulated. If a digital model of the patient's teeth, gingiva and palate (for upper arch) is not already included, the methods and apparatus may generate them from scan(s) of the patient's oral cavity and/or impressions of the patient's teeth. For example, one or more scans may be segmented to isolate the teeth (e.g., including tooth crowns) as separate objects, the gingiva can also be extracted from the initial scan(s), and morphed from the initial to a final (post-treatment) configuration following the tooth and/or palatal movement. The palate may be similarly modeled. Thus, the final model may include tooth crown, at least partial gingiva surfaces, and (for the upper arch) the palate. This model may be used to generate the retainer model(s).

The methods and apparatuses may include setting up and modify boundaries for the retainer. Boundaries may be set manually (e.g., by drawing lines on the 3D surface of tooth, gingiva and palate model build the boundary), fully automatically (e.g., from gingiva line and automatic detected curves, including posterior and cutout points), or semi-automatically (adjustable automatic, e.g., boundary is initially build by full automatic way, then adjusted manually around the surface manually). For example, this may include changing and adjusting the retainer coverage of the teeth, gingiva and palate in a variety of different ways. The user may create dental retainers that fit many different application and patient. As mentioned, in general, holes may also be added to create retainer. The hole(s) can be around the teeth, or in the palate surface.

For example, FIG. 28 illustrates one example of a prototype user interface that may be used, including a variety of user-selectable controls. In FIG. 28, the user interface includes pull-down menus and tabs 2801 with options for adding/importing a patient's teeth and/or treatment plan, and for modifying portions of the digital model, including the final position of the upper and/or lower arch. The user interface may include a display region in which the patient's arch and/or a manipulatable retainer may be displayed.

FIGS. 29A-D shows an example of a retainer as it may be displayed in a user interface such as the one shown in FIG. 28. In FIG. 29A, the retainer 2903 includes an anterior tooth-containing region 2905 (circled region), two posterior (permanent molar) tooth-retaining regions 2907, 2907', a flat posterior boundary 2911 and smooth cutout curve regions 2915, 2915' between the anterior and posterior tooth-containing regions. The retainer also includes a 3D scan/QR code tab 2917 extending as a tab from the back of the retainer (this may be removable). As shown in FIG. 29B, rotated slightly from the view of FIG. 29A, the bottom, lingual-facing surface 2921 may be smooth/smoothed. FIG. 29C shows a bottom view (rotated from the view showing the upper dental arch with the retainer in FIGS. 29A and 29B). The upper surface (which may be configured to be offset 2931 relative to the patient's palate, may include an identifying tag 2923 (shown as an alphanumeric identifier) inset (e.g., etched into the palatal region). FIG. 29D shows another rotation, showing the back (posterior) of the retainer on a model of the patient's teeth, showing the thicknesses 2935 of the palatal and crown regions.

Figure 30A:
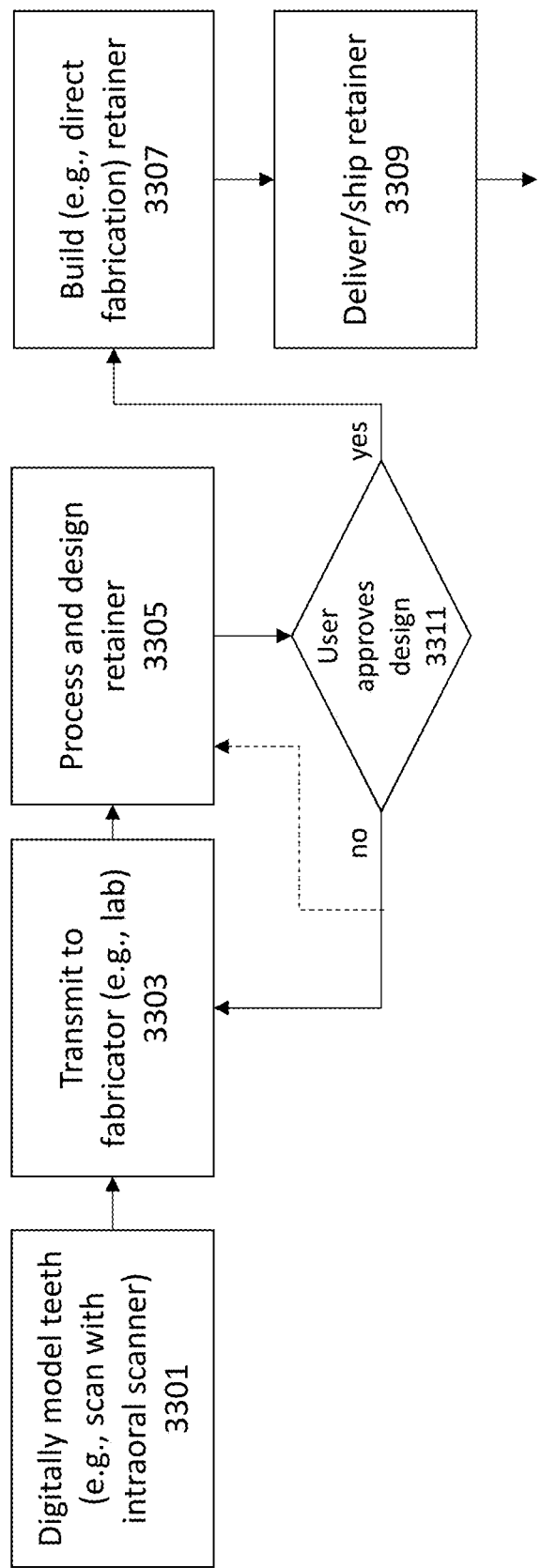
FIG. 30A is a flow diagram of an exemplary process for designing and building a retainer as described herein.

FIG. 30A illustrates a high-level process flow diagram for a method of designing and fabricating a retainer as described herein. In FIG. 30A, the method may begin by generating a digital model of the patient's teeth (e.g., upper jaw) 3301. The digital model may be formed by scanning the jaw directly, e.g., using an intraoral scanner, and/or scanning a model of the patient's teeth, or any other appropriate method. This information may be collected directly in the user's (e.g., dental practitioner's) office, and it may be transmitted to the fabricator (e.g. a remote lab, or a local, e.g., benchtop fabricator 3303. The digital model may be processed to select the retainer features and used to design the retainer, as described in greater detail herein 3305. The design may be interactively made and/or approved by the user 3311 (shown here as just a final approval stage, but other steps, including feature selection from a menu of options, etc. may be included in this iterative design loop, as an optional step). Once finally approved by the user, the retainer may be fabricate 3307 and shipped to the patient and/or the user for delivery to the patient 3309.

Figure 30B:
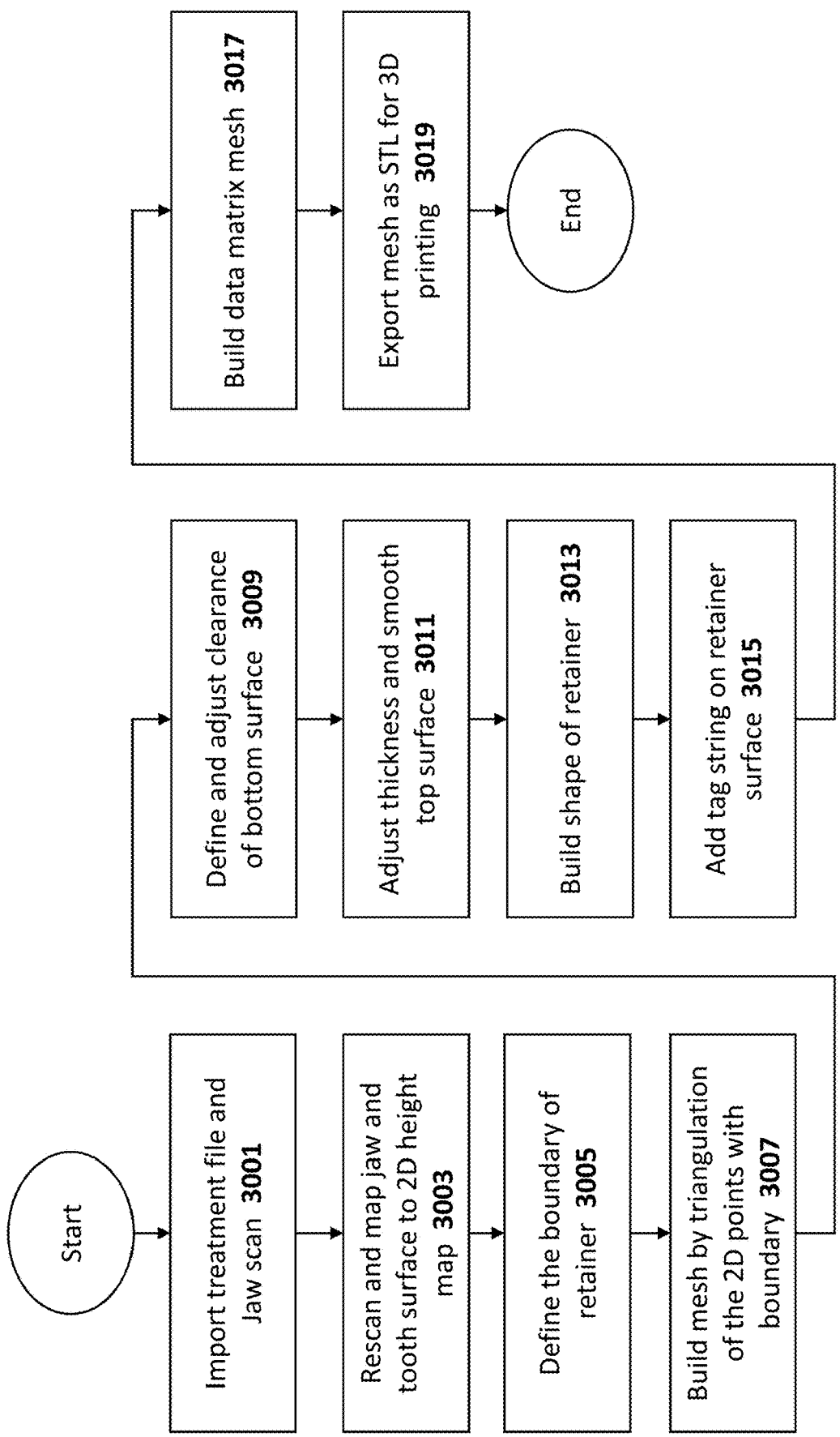
FIG. 30B illustrates one example of a method of designing a retainer.

FIG. 30B illustrates a method of forming a retainer as described herein. This method may be used as part of the overall process of FIG. 30A. For example, the method or apparatus (e.g., software) may begin by importing a file including the treatment plan (e.g., showing tooth movements, etc.) and the initial and final position of the patient's teeth 3001. The method may then rescan and map the tooth surface from the model to a 2D height map 3003, and define the boundary of the retainer 3005. A mesh model may then be built by triangulating the 2D points with the boundary 3007. The user may at any point indicate which features of the retainer to include (e.g., anterior tooth-containing regions, posterior tooth-containing regions, palatal region, etc.), and may indicate openings/holes, and removed portions, thicknesses, etc.). The software may calculate the retainer to these specifications and may confirm that the retainer will effectively retain the teeth and/or palate in the desired configuration. For example, the software may define and adjust the clearance of the palatal-facing side of the retainer when it includes a palatal region 3009, and may also adjust the thickness and/or smooth the opposite (lingual-facing) surface 3011. The shape of the retainer may then be built 3013, and any markings may be added 3015. If the retainer is to be printed directly from the digital model, it may be converted into a printable format (e.g., by building a matrix mesh 2017) and exported for printing 3019.

Figure 30C:
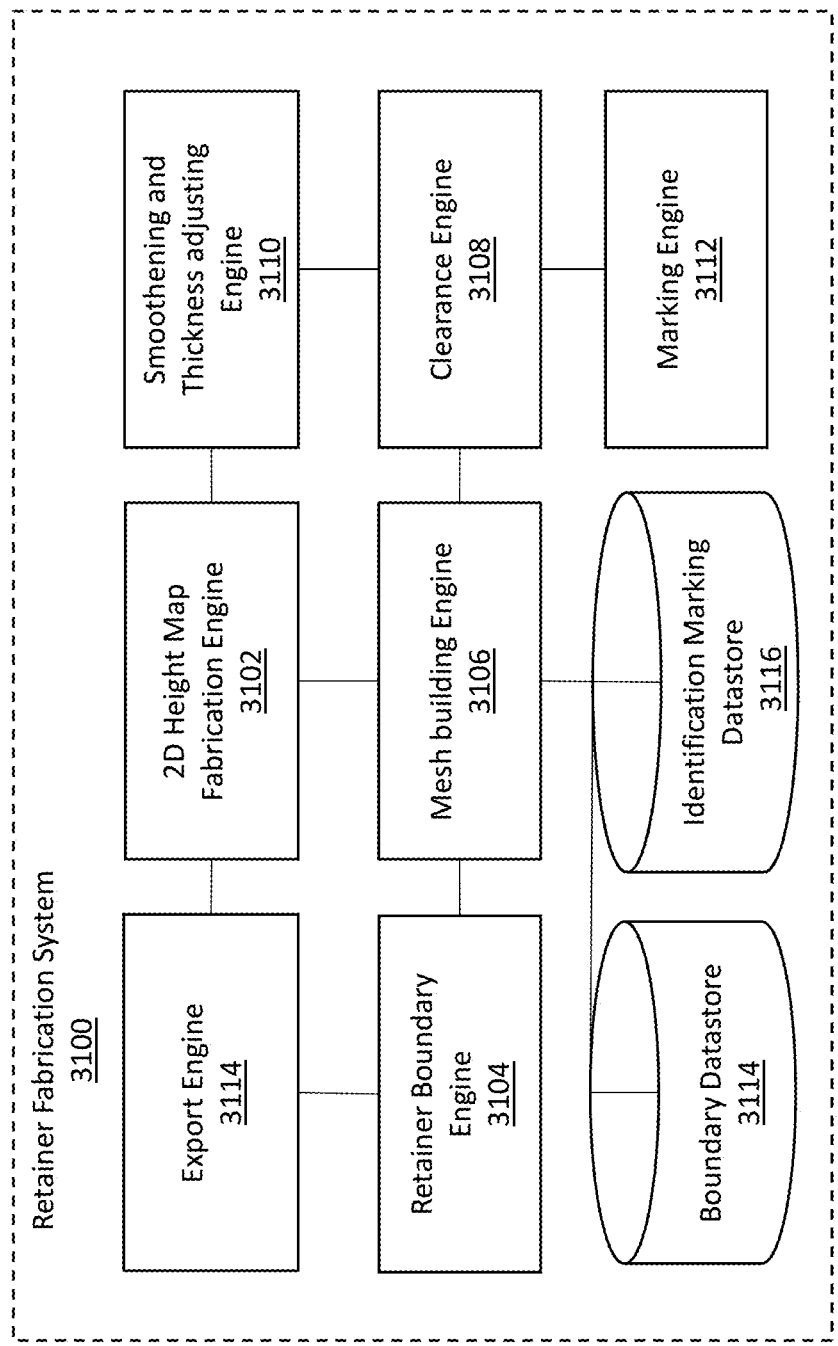
FIG. 30C is a diagram illustrating one system for designing and/or fabricating a retainer as described herein.

FIG. 30C is a diagram showing an example of an retainer fabrication system 3100A. The modules of the retainer fabrication system 3100A may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The retainer fabrication system 3100A may include a computer-readable medium and/or an input for receiving, for example, a 3D model of the patient's dentition, and in particular of the final (or anticipated final) configuration of the patient's teeth. The computer-readable medium 102 may include any computer-readable medium, including without limitation a bus, a wired network, a wireless network, or some combination thereof. In some variations the system may include an input for receiving a treatment plan (treatment file) including a scan, such as a 3D scan, of the patient's dentition; this input may be stored for access by the system later and/or immediately. For example, the 3D scan and treatment plan (or the final stage of the treatment plan) may be stored in a 3D dentition data store (not shown).

In FIG. 30B, the system 3100 may also include a 2D Height Map Fabrication Engine 3102, for translating the 3D model of the patient's teeth in a final target arrangement into a 2D height map, a Retainer Boundary Engine 3104, for defining one or more boundaries of the retainer. The system may also include a Boundary Datastore 3114 that may specify one or more boundaries or boundary parameters to be applied. The system 3100 may also include a Mesh Building Engine 3106 that may build a mesh, e.g., by triangulation of the 2D height map with the boundary or boundaries of the retainer, a Clearance Engine 3108 that may adjust the clearance of the model retainer relative to the patient's dentition (e.g., the clearance of the bottom surface of the model retainer relative to the teeth and/or palate), and a Smoothening and Thickness Adjusting Engine 3110 that may smooth the top surface and/or edges of the retainer model. In some variations the system may also include a Marking Engine 3112 that may add a patient-specific marking (e.g., an alphanumeric code, a QR code, etc.) to the retainer, by engraving and/or embossing; an Identification Marking Datastore 3116 may reference the marking to be included. Any of these systems may also include an Export Engine 3118 that may format the retainer model into a form for output by the system and/or for direct fabrication, e.g., by a 3D printer (e.g., as a stereolithography, or STL, file format). The various engines of the system may implement one or more automated agents configured to automatically perform any of the functions of the engine.

In some variations, the retainer to be formed is a thin shell shape, as described above. Thus, in some variations, the bottom surface may be constructed from jaw and tooth digital model of the final configuration, with some clearance added. The top surface may be constructed from the bottom surface, with a variable thickness. The bottom surface may be built, for example, by cutting from the original jaw scan. Alternatively, the bottom surface may be rebuild as a surface from a point cloud of crown and jaw. When rescanning the jaw and teeth as a 2D height map, the scan surface may be un-wrapped to 2D and the teeth and jaw rescanned to the height map, resulting in a bottom (e.g., palatal-facing) surface. The original jaw and crown points can be projected into the "scan surface", and map to 2D. The distance to the "scan surface" is converted into height. The 3D shape/surface may be re-scanned (rasterized) as 2D height map points. The bottom surface mesh may be built from the 2D points, and the boundary.

The model of the patient's teeth may be segmented (automatically, manually or semi-automatically) into regions, such as tooth/crown regions, gingiva, and palate, etc.) and further into buccal, lingual, occlusal surfaces. Automatic segmentation may be improved by using scan axis curves and occlusal curves. The user may define, or may correct automatically defined, regions such as the crown region, palatal region and buccal regions.

Thus, any of the methods and apparatuses (e.g., systems) for designing and/or fabricating a retainer as described herein may collect (e.g., may access, may gather, may receiving, may import, etc.) a digital model of the patient's dentition (e.g., jaw(s)) either in a target final configuration to be retained, such as a 3D model of the patient's dentition (teeth, and in some variations palate and/or gingiva) in the target arrangement, or a 3D model of the patient's dentition with a key indicating the target arrangement. As mentioned above, this may include a treatment file and a scan (3D) of the patient's dentition. All of these variations may be described as collecting the 3D model of the patient's target dentition. The 3D model of the patient's target dentition may be represented as a digital 3D model from which the retainer may be designed. As described above in reference to FIGS. 30B (and in the system of 30C), this may include rescanning and mapping the 3D model of patient's target dentition as a 2D height map. One example of this rescanning and mapping the 3D model as a 2D height map is illustrated in FIGS. 33A-46C.

Figure 33A:
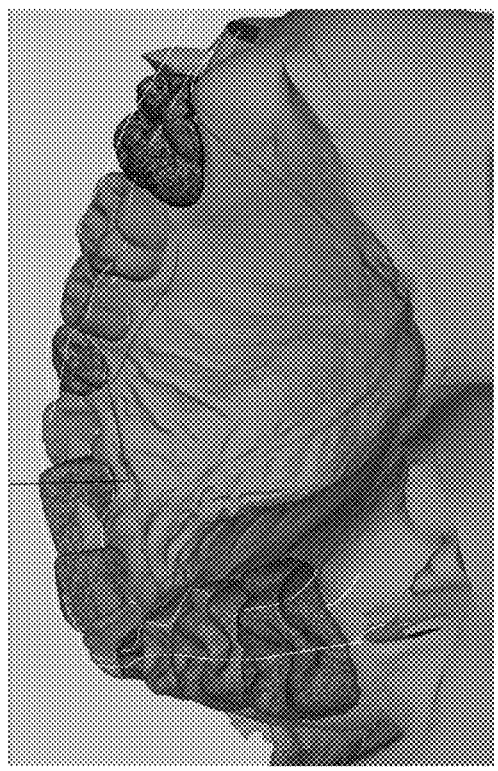
FIG. 33A is an example of a 3D model of a patient's dentition (teeth, gingiva and palate region) in a target configuration.
Figure 33B:
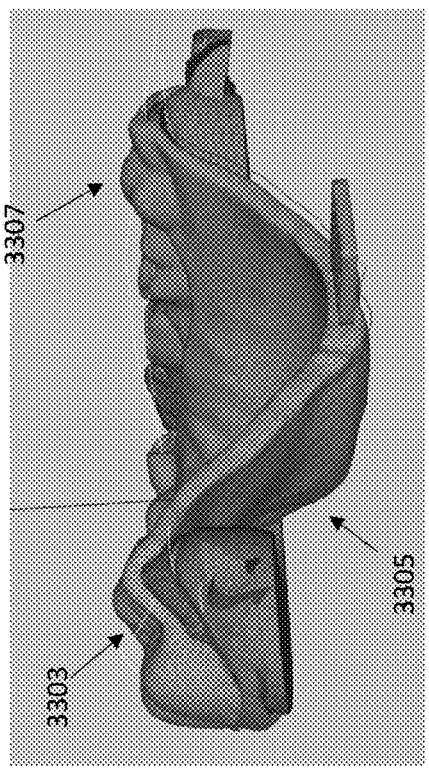
FIG. 33B is an example of a retainer as described herein.

For example, in FIGS. 33A-33B a 3D digital model of the patient's dentition in the target arrangement is shown (FIG. 33A), and a thin shell retainer 3303 is shown fitting over the teeth (FIG. 33B). In this example the retainer includes a bottom surface 3305 that extends from jaw and tooth, with some clearance, and top surface 3307 that extends from bottom surface with a variable thickness. Although this example includes a palate-spanning region, any of the retainers described herein may be formed using a similar method, including those without a full palatal region. The retainer may be digitally formed using a 3D model of the patient's dentition in the target configuration.

Figure 34A:
FIGS. 34A-34D illustrate an overview of a method of forming a retainer.
Figure 34B:
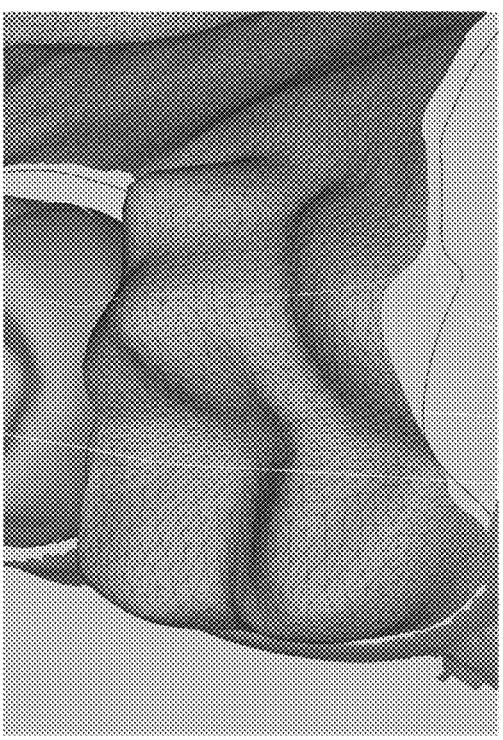
Figure 34C:
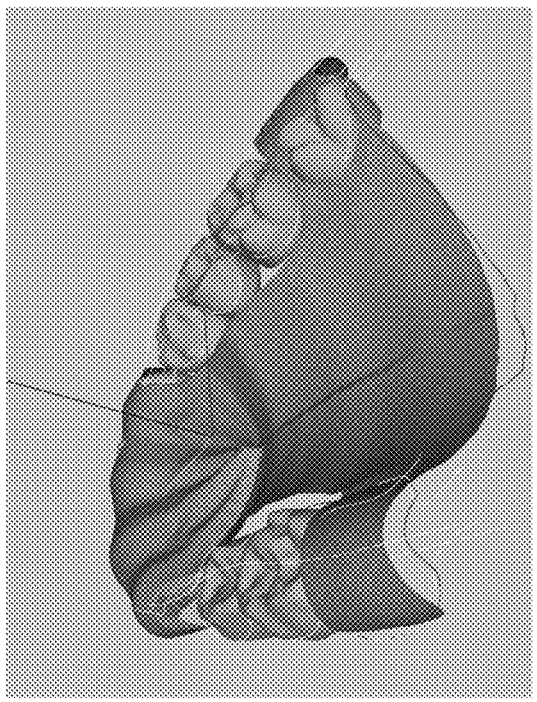
Figure 34D:
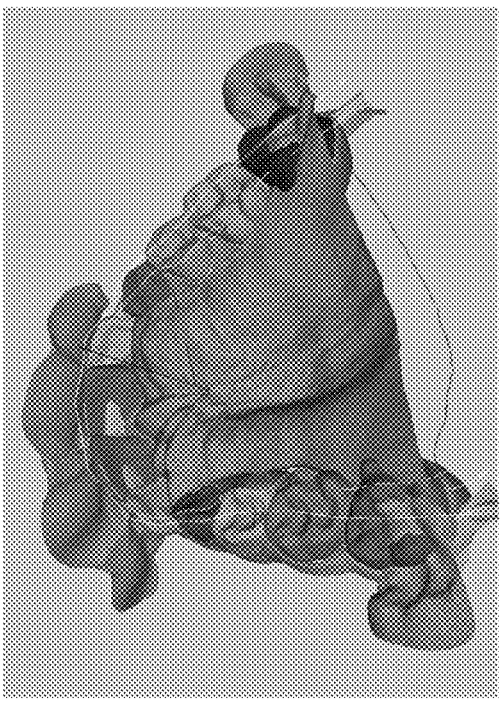

In general, the methods and apparatuses described herein for forming and/or fabricating a retainer may map the 3D model of the patient's dentition in the target configuration into a 2D height map. FIGS. 34A-34D show an overview of on variation of this method. In FIG. 34A, the method or system may assume that there is scan surface with roughly the shape of jaw and teeth (e.g., crowns of the teeth); this surface can be un-warped into a flat surface in 2D image, as shown in FIG. 34B. The original jaw and crown points can be projected into the scan surface and mapped in 2D, as shown in FIG. 34C; the distance to the "scan surface" is converted into height. As shown in FIG. 34D, the 3D shape/surface may then be re-scanned (rasterized) as 2D height map points, and the bottom surface mesh of the retainer may then be built from the 2D points, and the boundary. The thickness (and therefore the top surface) of the retainer may then be determined and set.

Figure 35:
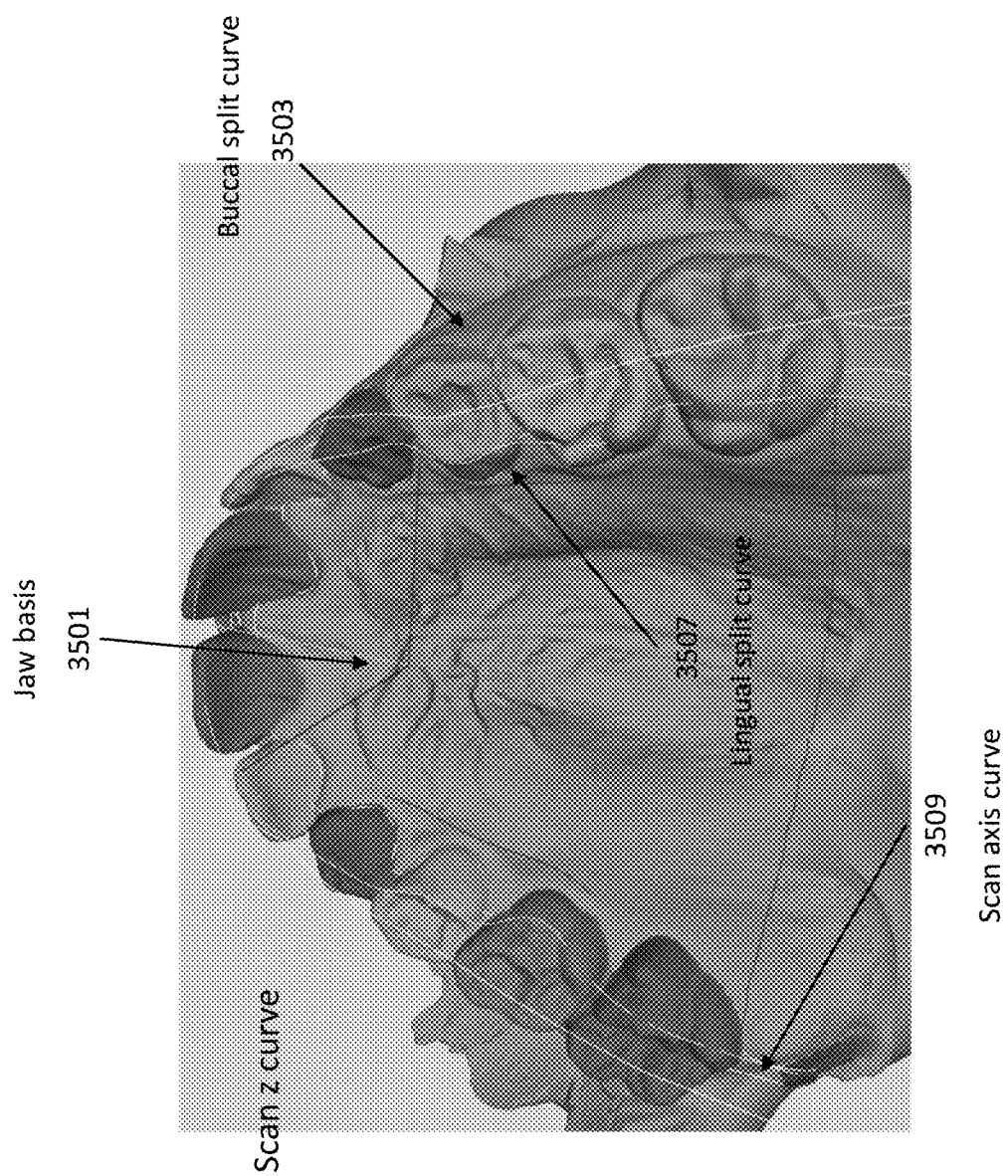
FIG. 35 is an example of a portion of a patient's dentition showing reference mapping regions.

In any of these methods and apparatuses, the digital 3D scan ("jaw scan") may be organized using a set of reference axes and/or split into various curves. FIG. 35A illustrates this scanning basis. As shown, a basis (coordinate) may be used to rescan jaw and crowns. For example, an XY plane is a plane that approximate crown centers of all teeth. An YZ plane may include the middle plate of left and right teeth. In this example, the origin is roughly the middle point center of canine crown centers. In FIG. 35, a lingual 3507 and buccal 3503 split curve are shown, and may be built from the gingival lines of each teeth. These curves may be used to define buccal, crown and lingual (palate) sections of jaw scan.

In addition, the original 3D scan (e.g., jaw scan or impression) may be split to palatal and buccal patches, as shown in FIGS. 36A-36C. In FIG. 36A, the palatal patch 3605 is shown, and is inside the lingual split curve (closer to the center), and the vertex normal is "upper" (n.z.>0.0f). As shown in FIG. 36B, the buccal patch 3607 is not inside palate patch, and roughly points in the buccal direction (e.g., outside and below the buccal split curve). The surface distance (e.g., Dijkstra distance) to the split curve may be less than some maximum (e.g., less than about 3 mm), which may remove extract material of the scan, as shown in FIG. 36C.

Figure 37B:
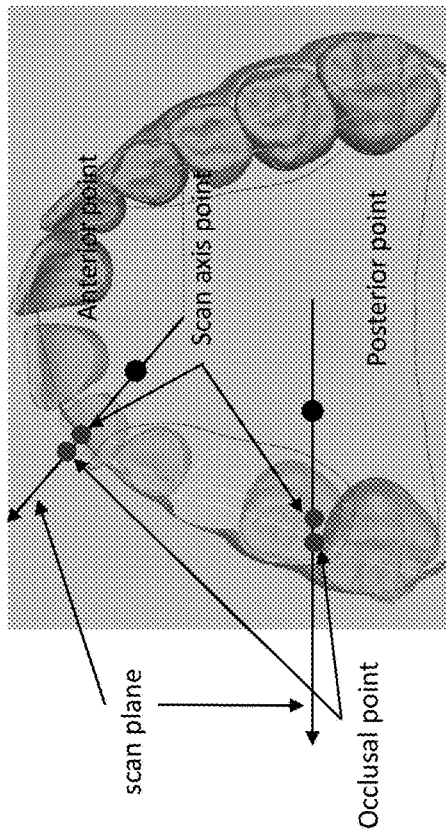
FIGS. 37A-37B show the scan axis curve and occlusal curve of one example of a 3D model of a patient's dentition in a final configuration.
Figure 37A:
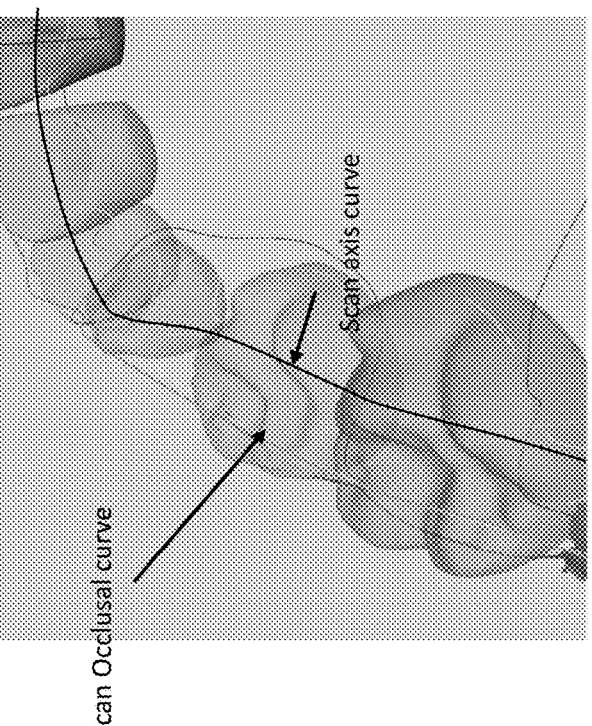

The scan axis curve is illustrated in FIG. 37A, and passes the crown centers of all teeth and contact points. The occlusal curve may be defined as the occlusal direction of all teeth. For any vertex in the jaw or tooth crown, it may be located as anterior (v.y.>0 in the scan basis) or posterior (v.y.<0 in the scan basis). As shown in FIG. 37B, the scan plane may include an anterior point or region from an origin of scan basis, to the anterior vertex, and a posterior point or region, in the X direction and passing the posterior vertex. The intersection of the scan plane and the scan axis curve may be referred to as the scan axis point, and may be used for the scan for the occlusal point.

Figure 38:
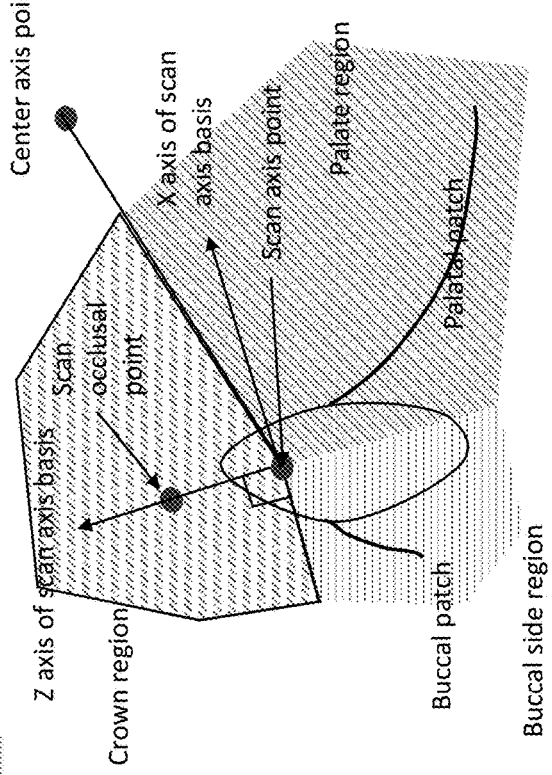
FIG. 38 is an example of a scan axis base and regions of one example of a model of a patient's dentition in a final configuration.

FIG. 38 further illustrates the basis and regions of the scan axis. As illustrated, for a vertex, the method or apparatus may find the scan plane, and the scan axis point, scan occlusal point, also the center axis point, and may build a scan axis basis by setting an origin as the scan axis point, Z is the direction from scan axis point to occlusal point, and the X axis as perpendicular to Z axis. The scan plane may be divided into 3 regions: a palate/lingual region (the boundary may be the link between scan axis and center axis point (e.g., x>0) and under the link line); a crown region, until the negative X axis (e.g., z>0), and a buccal side region (e.g., x<0, z<0).

Figure 39:
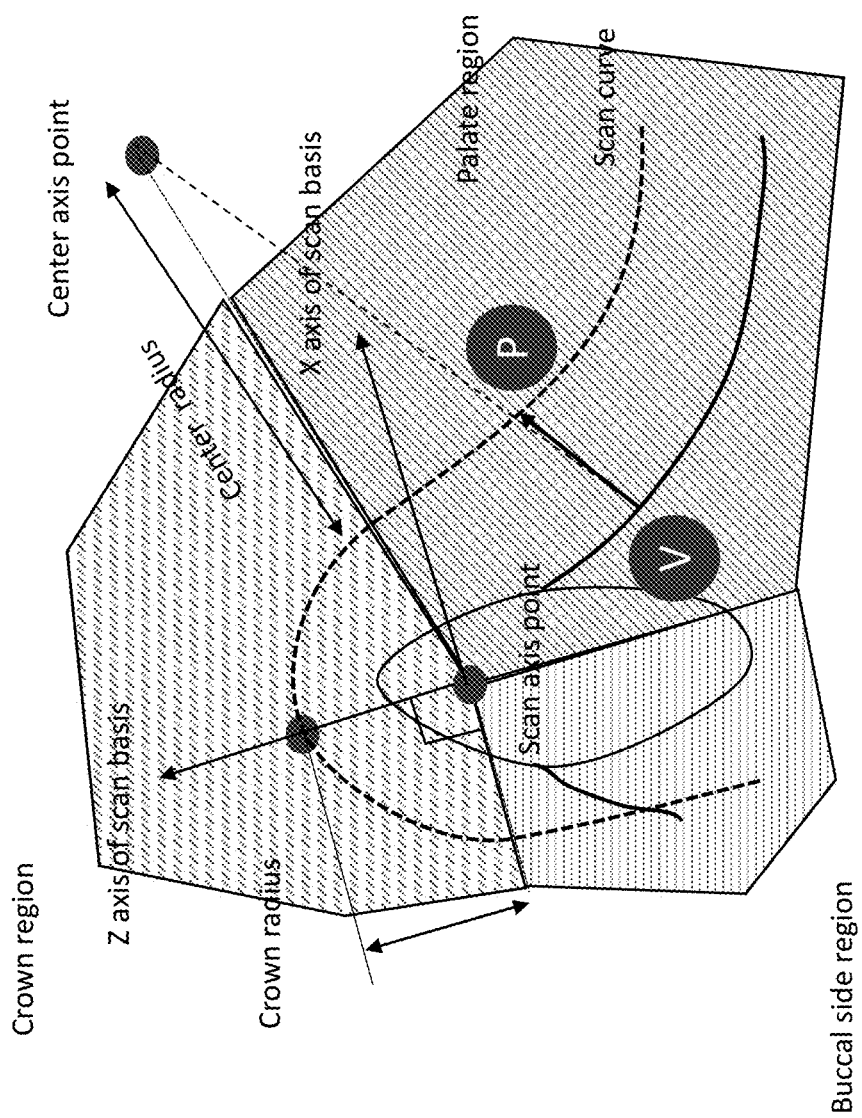
FIG. 39 shows a scan curve of a model of one example of a patient's dentition in a final configuration.

As shown in FIG. 39, the scan curve may define a crown radius and a center radius. The scan curve may include 3 segments: a palate region (e.g., an arch with center in center axis point and center radius); a crown region (e.g., an arch with center in scan axis point and crown radius); and a buccal region (e.g., a line with distance to z axis equal to the crown radius). For one vertex, V, in palatal patch, crown or buccal path, the method or apparatus may project it into the scan curve as P; the distance of V to P may be referred to as the height.

Figure 40:
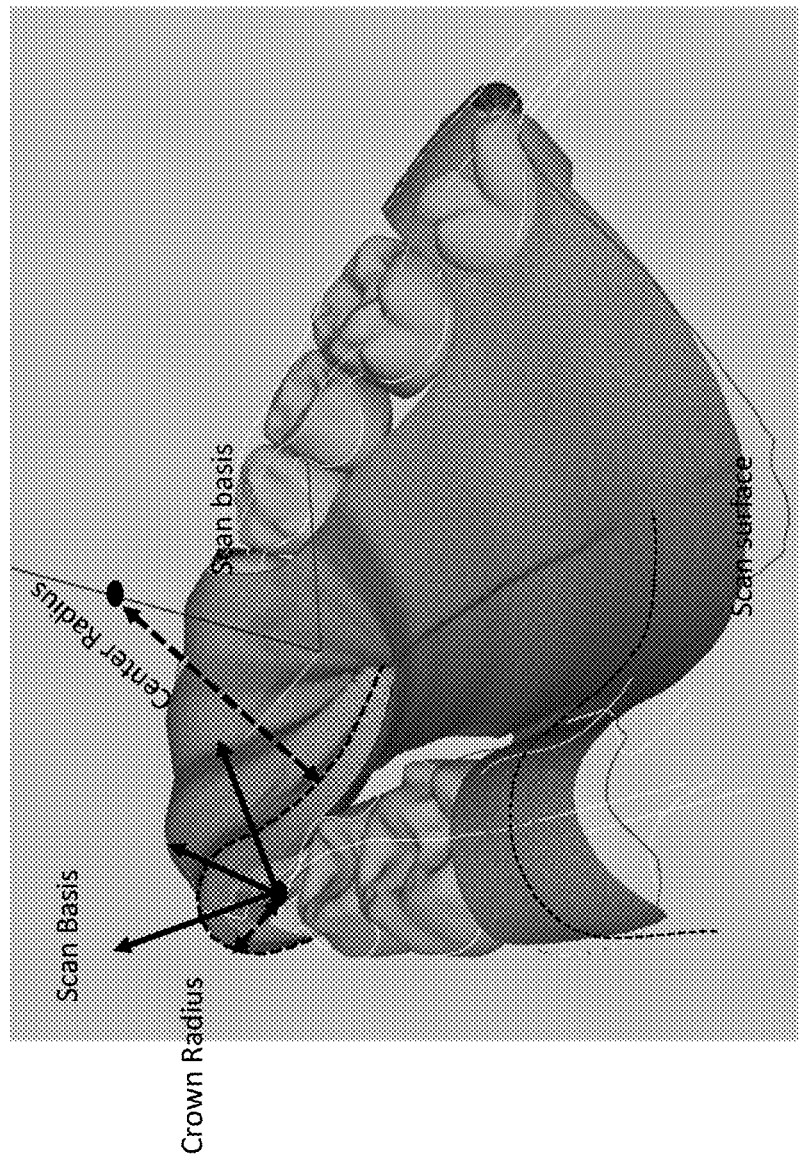
FIG. 40 illustrates a scan surface of a model of a patient's dentition in a final configuration.
Figure 41:
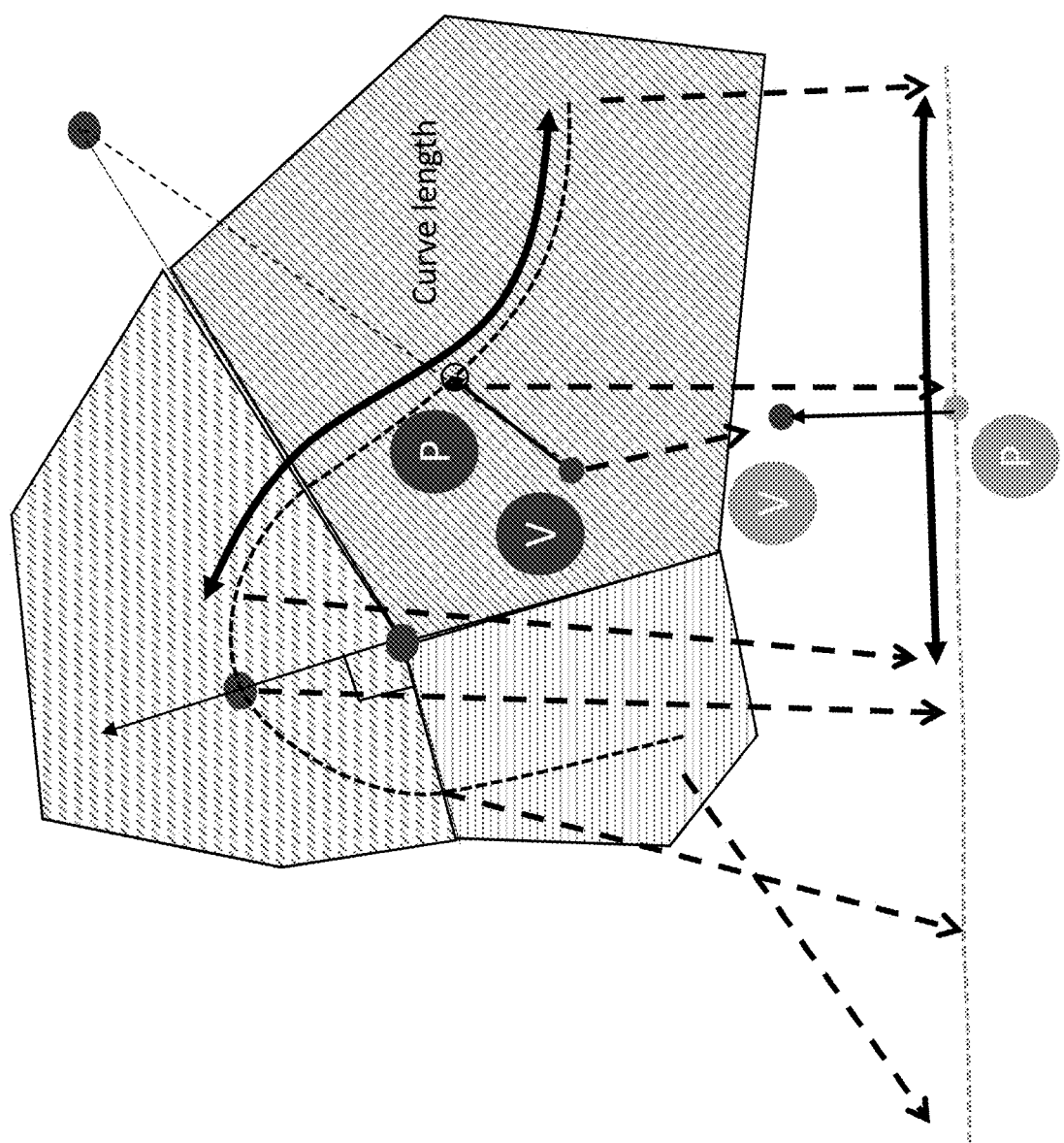
FIG. 41 illustrates a method of using a scan curve to map a 3D model in one example of a patient's dentition in a final configuration to a 2D height map.
Figure 42B:
FIGS. 42A-42C graphically illustrate one example of a method of unwarping and mapping a 3D to 2D height map.
Figure 42A:
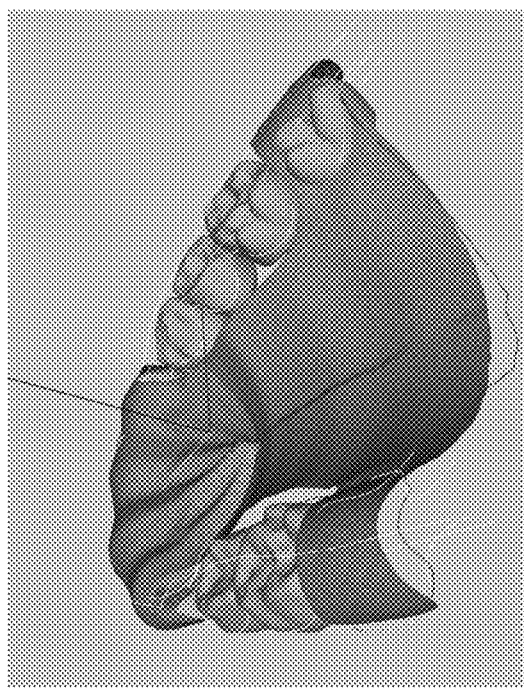
Figure 42C:

As shown in FIG. 40 (similar to FIG. 34A), the surface may be scanned, e.g., using a scan curve. The anterior may be scanned starting from the origin of scan basis, and in the XY direction. The posterior may be scanned starting from the Y axis, and in the X direction. All of the scan curves may form the scan surface, which is an approximation of the shape of the jaw, including the palate, gingiva and tooth. Any 3D vertex of the jaw can be projected into the scan surface. A 2D height map may then be mapped from the 3D surface. As shown schematically in FIG. 41, for each scan curve, it can be un-warped to a straight line, using the curve length to the start point. The scan surface can also be un-warped as a flat 2D surface. For vertex V in the 3D model, it is projected into the scan curve as P, then is "un-warped" to the line. The distance from V to P is converted to the height to the line. For example, in FIG. 42A, the scan surface is shown in 3D; in FIG. 42B, the scan surface may be unwrapped to 2D and (FIG. 42C), the 2D height map of the jaw and crown may be determined.

Figure 44:
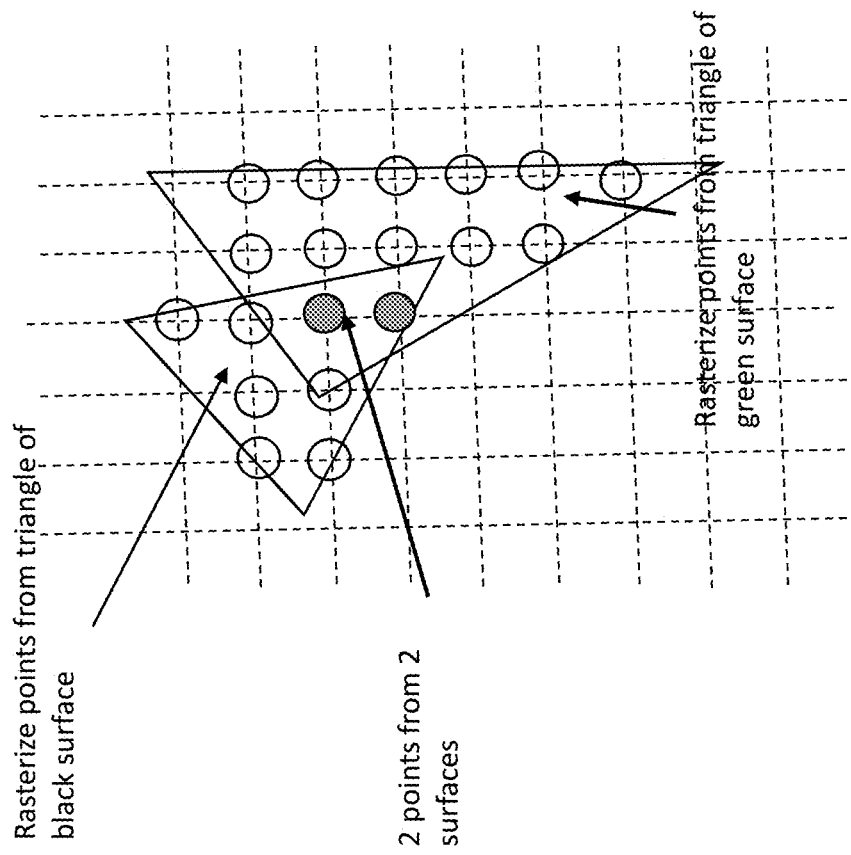
FIG. 44 illustrates one example of rescanning and rasterizing triangles from a 3D mesh to 2D triangles to create a uniform point cloud and nice mesh.
Figure 43:
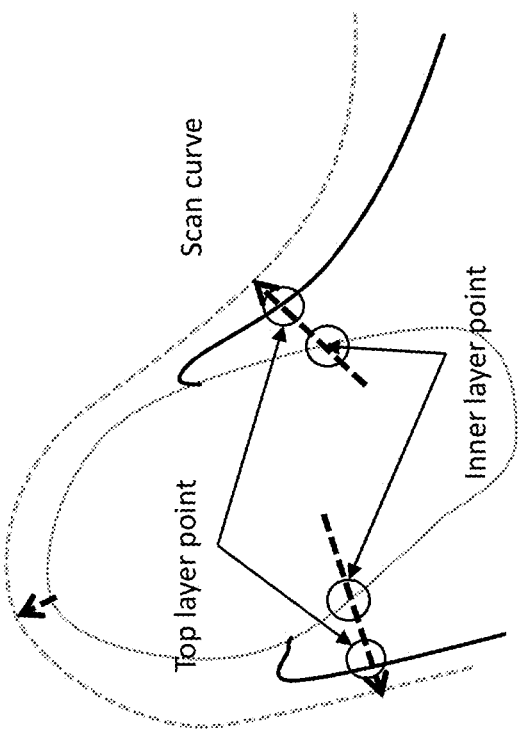
FIG. 43 illustrates one example of surface that may be used to build a retainer (e.g., jaw surfaces, including crown, gingiva, palate, etc.)

From the 2D height map, the surfaces to build the retainer may be determined, setting the tooth and/or gingiva and/or palate surfaces. For example, as shown in FIG. 43, the jaw scan may include the original data from patient's dentition, and may be virtually cut into palate and buccal patches. The tooth crown region may be cut and cleaned from jaw scan, and can be moved by staging. The digital model may also include other natural or artificial features, such as in/on-tooth objects, including attachments, power ridges, etc. (which may be used with the aligners/palatal expanders). Surfaces may overlap each other as "multiple layers" objects. The rescan may keep only the top layer. The rescan may then be rasterized. As shown in FIG. 44, a triangle in the 3D mesh can be mapped to a scan surface as a 2D triangle, then be rasterized to get all points inside the triangle (both in original 3D and 2D height map). For a point in the rasterizing grid, if there are multiple points from different surfaces, only the point with biggest height may be kept. That will fill grid with only point from top layer. Also, the rasterizing may create uniform point cloud and nice mesh.

Figure 46A:
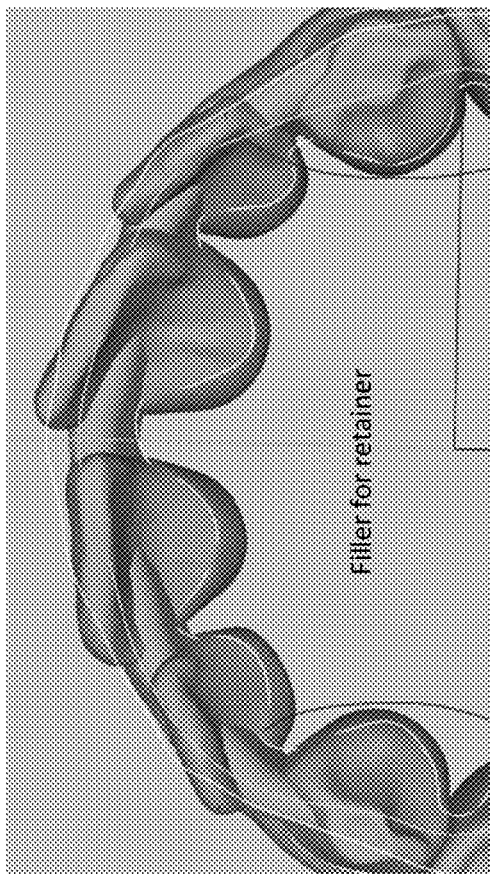
FIGS. 46A-46C illustrate an example of a method of adjusting a model of the patient's dentition to correct for narrow regions (e.g., long, thin and/or sharp regions) when using the model of the patient's dentition as the template for forming a retainer, including the use of a filler.
Figure 46C:
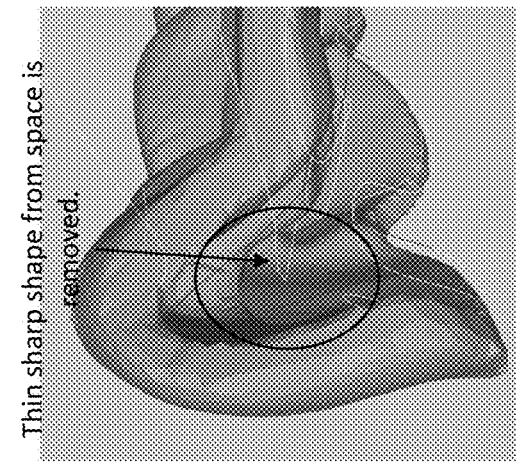
Figure 46B:
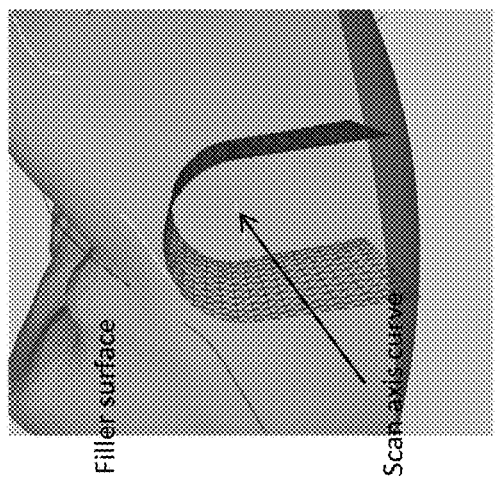
Figure 45A:
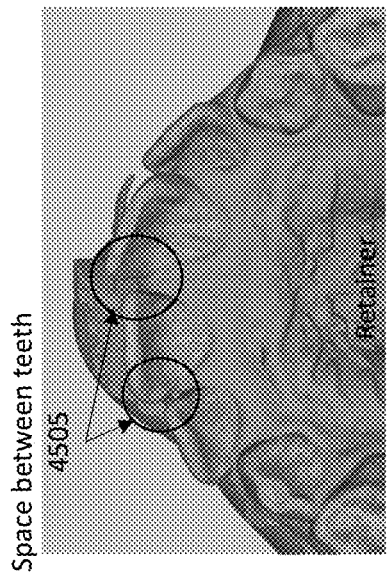
FIGS. 45A-45B show one example of a method of adjusting a model of the patient's dentition to correct for narrow regions (e.g., long, thin and/or sharp regions) when using the model of the patient's dentition as the template for forming a retainer.
Figure 45B:
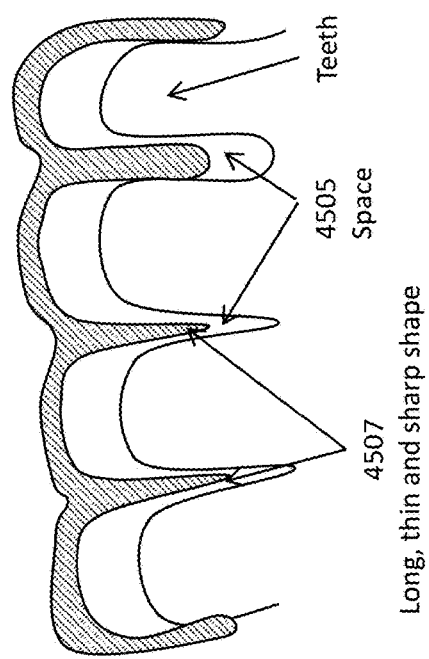

Rescanning may include the palate patch, cut from the initial jaw scan, the buccal patch, e.g., the buccal gingiva strip cut from the initial jaw scan, and the tooth crown, from the cut tooth shape. As shown in FIGS. 45A-45B, when there are spaces 4505 between teeth, especially for space case, using this surface may result in a retainer with deep, sharp inserting shapes that may be thin and easy to break. Thus, in some variations, the methods and apparatuses may include a filler between the teeth in the model that provides a surface from which the retainer may be built. FIGS. 46A-46C illustrate one example of a method in which a filler shape is used. The filler shape for retainer may be any appropriate shape, for example, as shown in FIGS. 46A-46B, a U-shape that includes a curved surface, and center is the scan axis curve. In some variations, the radius/distance to scan axis may be about 1 mm, and the filler shape may pass through all teeth to cover any space. Thus, in some variations, a retainer formed when filler is used may avoid the thin shapes between teeth, as shown in FIG. 46C.

Figure 47A:
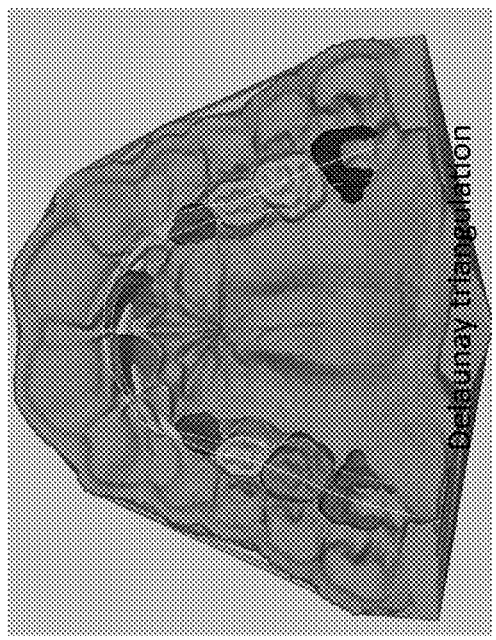
FIGS. 47A-47B illustrate one example of using boundaries to form a mesh from a point cloud of one example of a model of a patient's dentition.
Figure 47B:
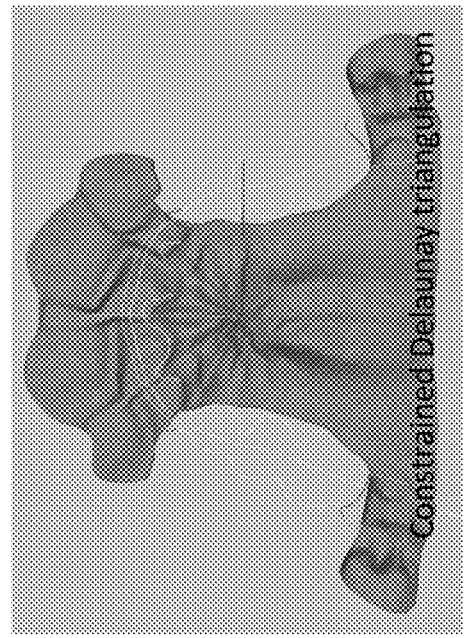

While or after the 2D height map has been completed (including any modification to the map, e.g., to include filler regions, etc.) the boundaries of the putative retainer may be defined. The boundaries may depend on the intended configuration of the retainer, including any of the retainers illustrated above (e.g., in FIGS. 1A-15D and 24A-27). Boundaries may be set using the mesh from a point cloud. For example, by rescan (rasterizing), originally meshes may be converted to a point cloud in 3D, and mapped to 2D height map as described above. A new mesh may be built from the 2D points by a triangulation algorithm, including in some variations the use of a constraining technique such as Delaunay triangulation or any other appropriate technique, which may be used to build clean and correct meshes can be build. FIGS. 47A-47B illustrate one example of the use of a triangulation technique to set or define the boundaries.

Figure 48:
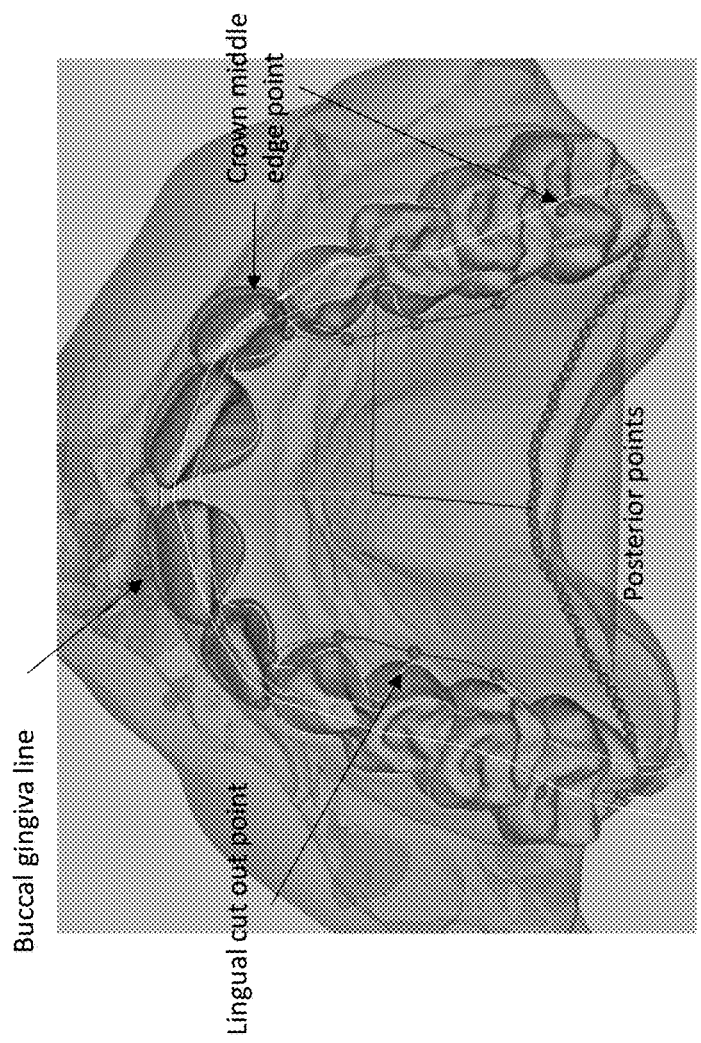
FIG. 48 is an example of determining boundaries in a model of a patient's dentition to form the retainer, having a small U-shaped posterior boundary.

In one example of a retainer having an anterior pocket for anterior teeth and two posterior pocket for posterior teeth as well as a palatal region, the methods and apparatuses described herein may build a boundary from a buccal side gingiva line of molar, the middle edge point of crown, lingual cut out points of primary teeth, with a distance to tooth, for example, 2 mm, the buccal side gingiva line of anterior teeth, and a posterior boundary curve. This is illustrated in FIG. 48. A spline curve may be constructed and resampled to create dense points as boundary points in triangulation algorithm.

In some variations, as shown in FIG. 49, a lingual cut out point may be a point in the palate surface, with a distance in 3D (for example 1.0 mm) to the middle point of each tooth's lingual gingiva line. The posterior boundary may be a smooth U shape curve, with a distance to the last molar's posterior boundary; for a flat posterior, the distance is about 0 mm; for a U-shape, the distance may be about, e.g., 7.5 mm (e.g., between about 1 mm and about 12 mm), for a deep U-shape, the distance may be about, e.g., 15 mm (e.g., between about 12.1 mm and about 25 mm, etc.).

The methods and apparatuses described herein may modify the boundary to remove discontinuities and loops. For example, the boundary curve is typically a smooth spline in 3D that may be resampled as polygon and mapped into to 2D height map as boundary for triangulation. In some case, a small loop/overlap of polygon regions may occur (see, e.g., FIG. 50A), which may cause create incorrect mesh or prevent the methods and/or apparatus from forming a retainer model. A small loop may be removed by detection self-intersection of polygon, and remove all the points of the loop, as shown in FIG. 50B.

Figure 51B:
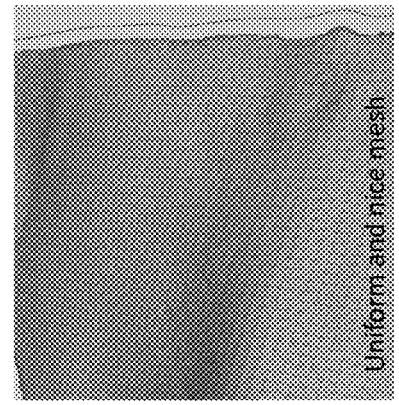
FIGS. 51A-51C illustrate one example of building a mesh from a point cloud as described herein in the process of forming a retainer.
Figure 51A:
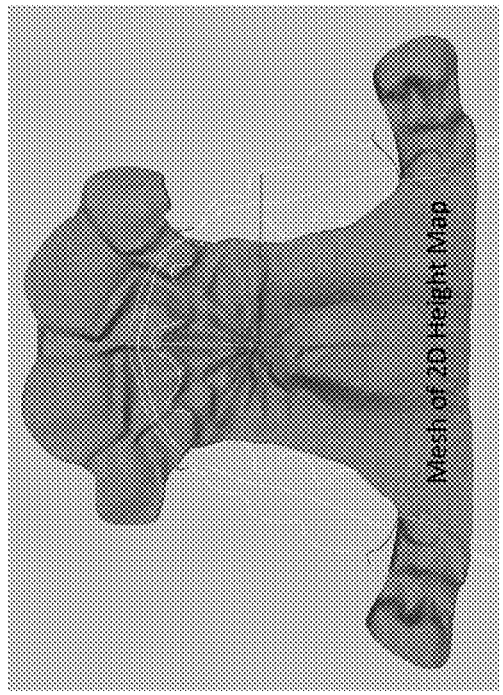
Figure 51C:
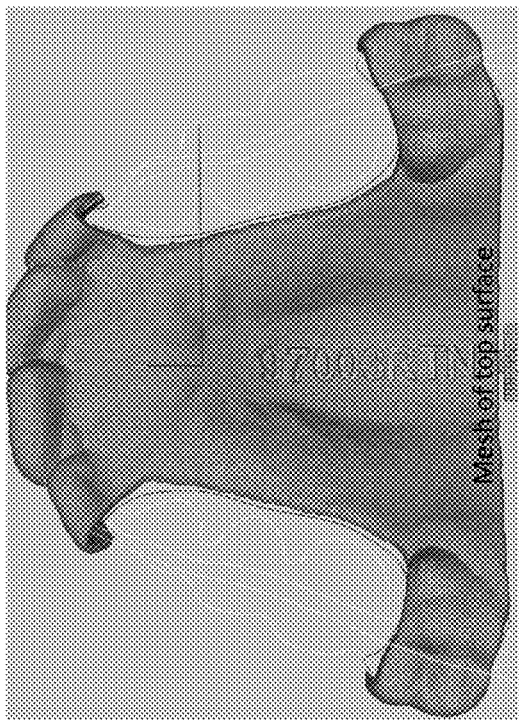

Once the boundary has been established, a mesh may be built from the point cloud (based on the 2D height map) and boundary. For example, triangles forming a mesh of the top/outer surface of the patient's dentition may be built by any appropriate triangulation method (e.g., such as a constrained Delaunay triangulation algorithm), using rasterized points and boundary. In some variations, the original 3D points are used as mesh vertices, so the 2D mesh may be converted to 3D mesh. FIG. 51A illustrates the mesh of a 2D height map of the bounded portion of the patient's dentition. A uniform and nice mesh of this surface may be formed (as shown in FIG. 51B), and a mesh of this top surface may be formed, as shown in FIG. 51C. In this example, the sample triangles are used for upper surface. Because the points are rasterized from original surfaces, the mesh is uniform and nice.

Figure 52A:
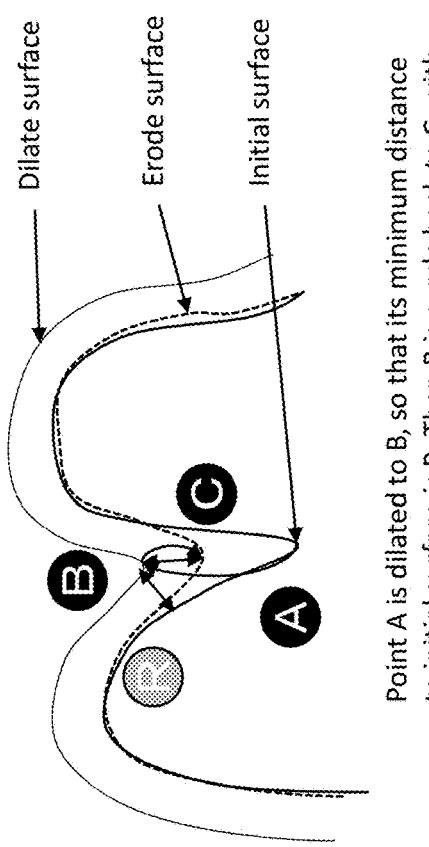
FIGS. 52A-52B illustrate one example of a method of smoothing the bottom surface of an aligner when forming a retainer as described herein.
Figure 52B:
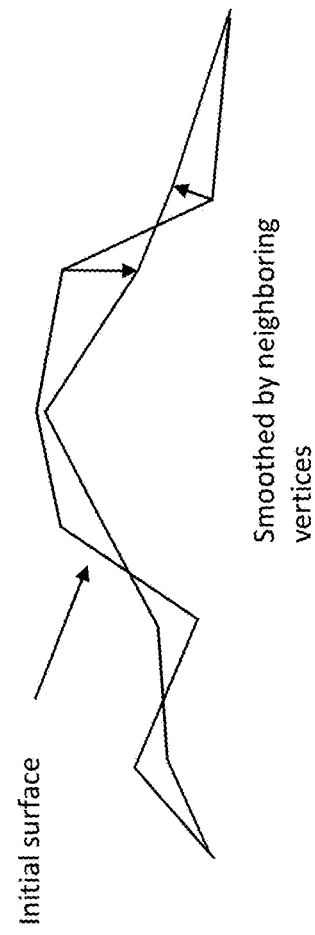

The top surface of the patient's dentition may then be used to generate the bottom surface of the retainer. FIG. 52A shows a bottom surface based on the mesh of the top surface of the patient's dentition. The bottom surface should be smoothed, to remove sharp corner, tip, thin sheet and so on. The bottom surface may be dilated and eroded to remove sharp feature. For example, a point in the bottom surface may be dilated (e.g., offset) by a distance, for example 1 mm, so that the minimum distance to the original surface is at least 1 mm; it may then be eroded back by the same distance (e.g., 1 mm). This may remove a sharp shape, as shown in FIG. 52A. In this example, Point A is dilated to point B, so that its minimum distance to initial surface is R. Then B is erode back to C, with minimum distance to dilate surface that is also R. As shown in FIG. 52B, the surface may also be smoothed. For example, the normal surface may be smoothed using average of neighboring vertices.

Figure 53:
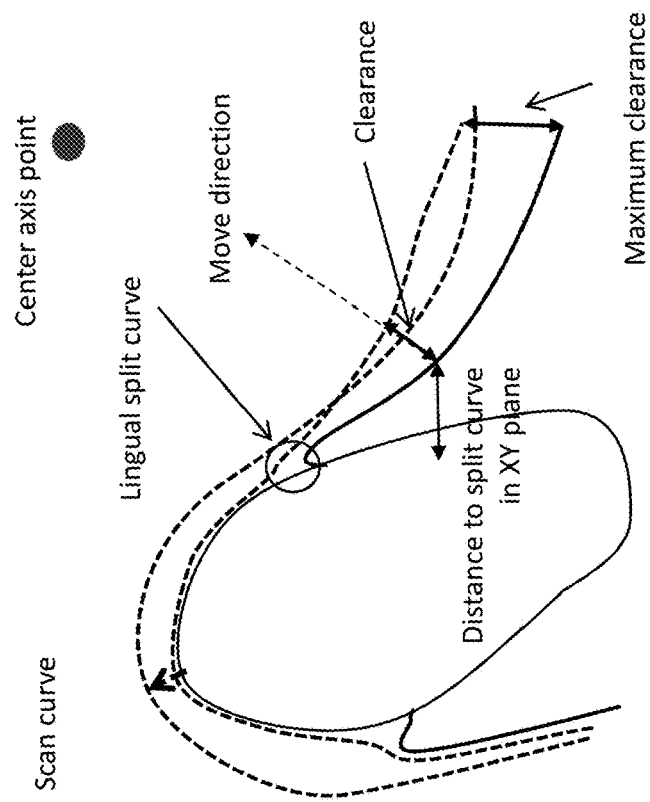
FIG. 53 shows one example of creating clearance between the retainer being designed and a palate surface as described herein.

The method or apparatus may then determine and set a clearance between the bottom surface of the putative retainer and the patient's dentition, including the teeth, gingiva and/or palate. For example, FIG. 53 illustrates one method of determining clearance. The bottom surface may be sampled from the original palate surface and then moved with a distance (clearance) in the direction of scan curve normal, as shown. The clearance may be linearly increased with the distance to the lingual split curve. If the distance is equal to zero, the surface is in the lingual split curve. When it's far from lingual split curve, for example greater than or equal to about 2 mm in the XY plane, there may be maximal clearance. Similarly, it's also possible to add crown or buccal thickness.

Figure 54B:
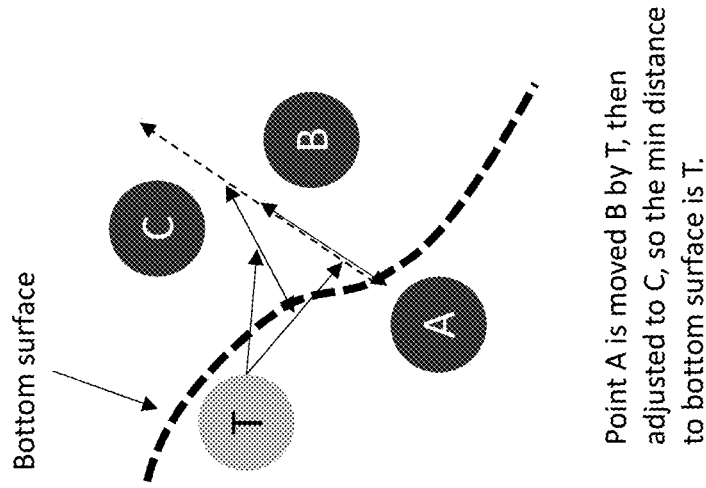
FIGS. 54A-54B illustrate one example forming a top layer and adjusting the thickness of a retainer being designed.
Figure 54A:
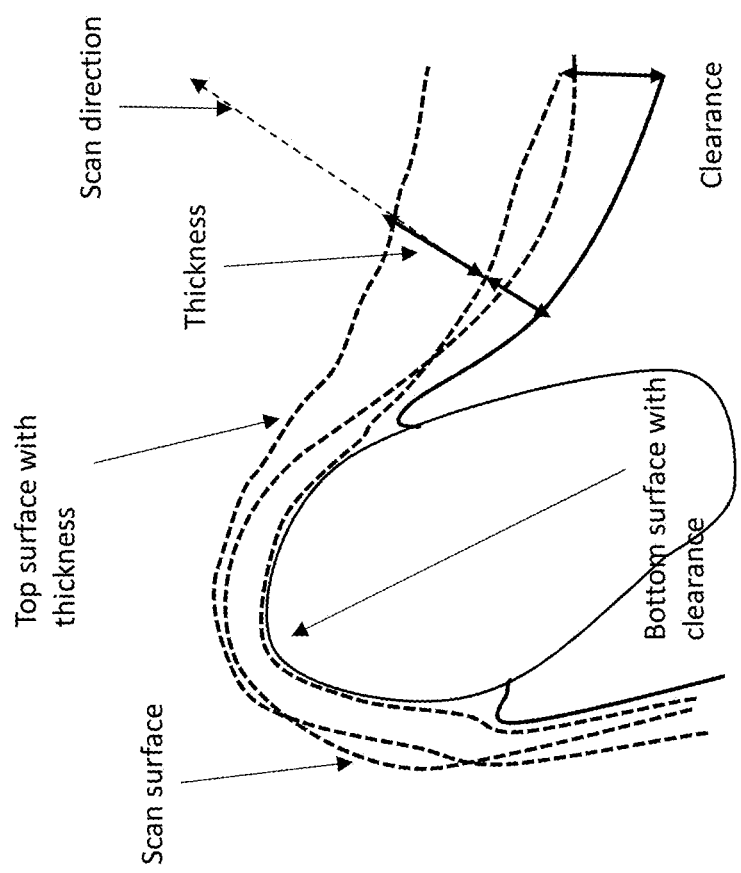

Once the clearance between the putative retainer and the patient's dentition has been set, e.g., defining the shape of the bottom surface, the location and shape of the opposite (e.g., top) surface may be determined. Thus, the methods and systems for performing them may determine the thickness and smoothness of the top surface. For example, the top surface points may be copied from bottom surface, added with a thickness T in the scan direction, as shown in FIG. 54A. This may then be adjusted to a 3D thickness, with a minimum distance to any point in bottom surface (shown as T in FIG. 54B).

Figures 55A, 55B:
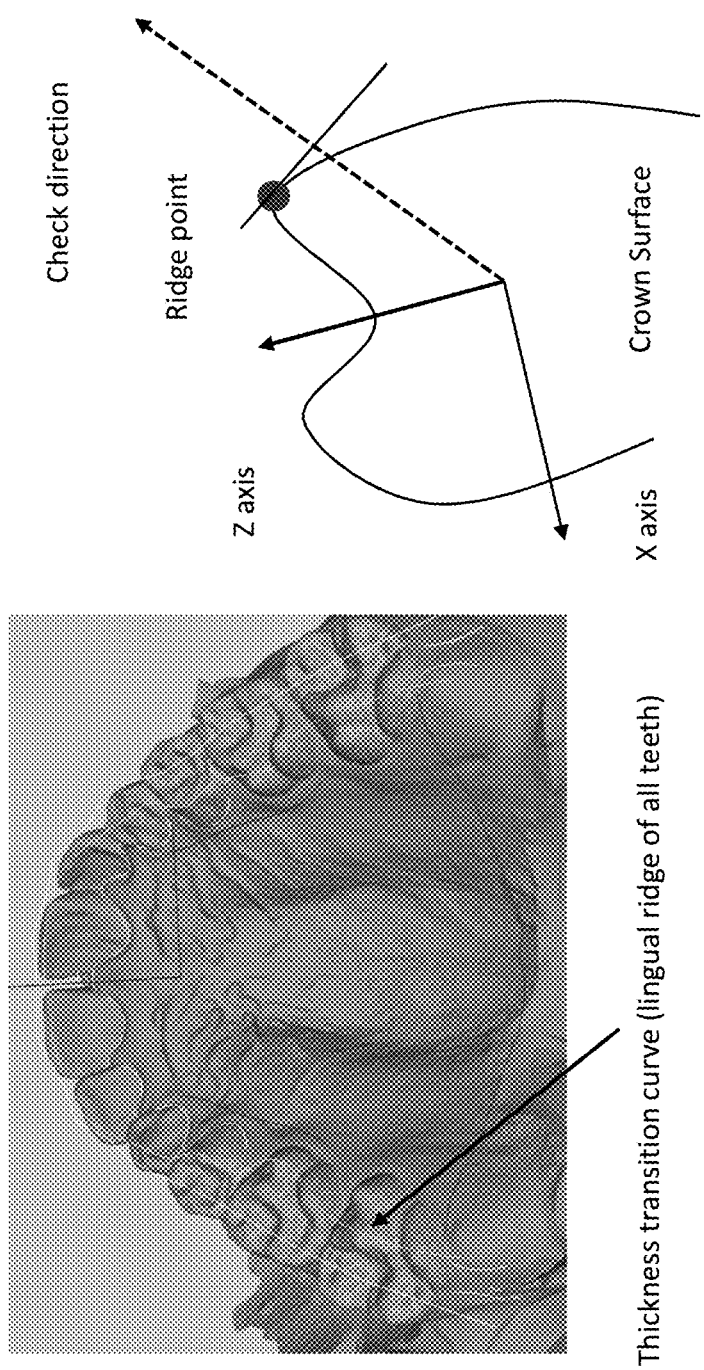
FIGS. 55A-55B illustrate one example of a thickness transition curve that may be used to adjust the thickness of a retainer being designed.

The smoothness and thickness of the retainer may be adjusted. For example, as shown in FIGS. 55A and 55B, the thickness of the palate and crown region of the retainer may be adjusted; the palate part of retainer may be made thicker, so that it's stiffer enough to retain the trans palate space. Similarly, the crown region may be thinner, so it's flexible and easy to put-on and take out from crown. The thickness may be increased gradually from the transition curve (lingual ridge curve). The ridge point may be detected by checking the distance of point in the lingual occlusal direction. Ridge points from all teeth may be linked and smoothed to form the lingual ridge curve, or the thickness transition curve.

Figure 56A:
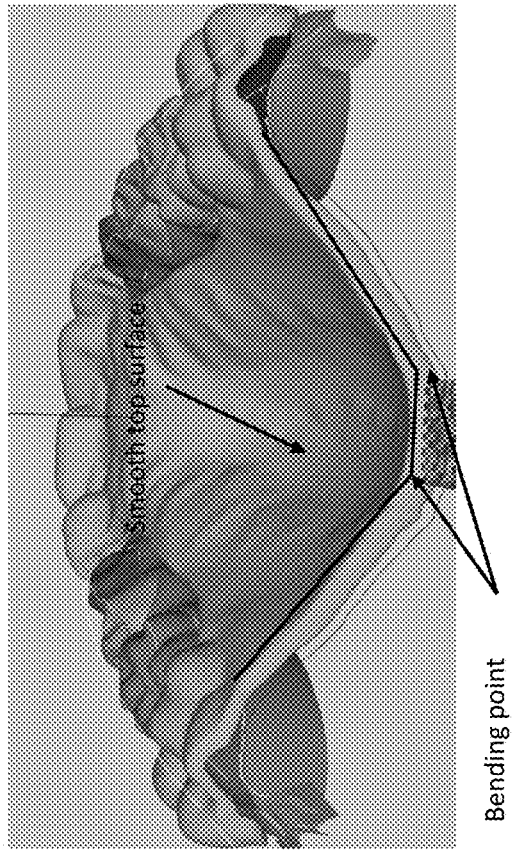
FIGS. 56A-56B illustrate a method of adjusting or correcting the top surface smoothness of a retainer being designed as described herein.
Figure 56B:
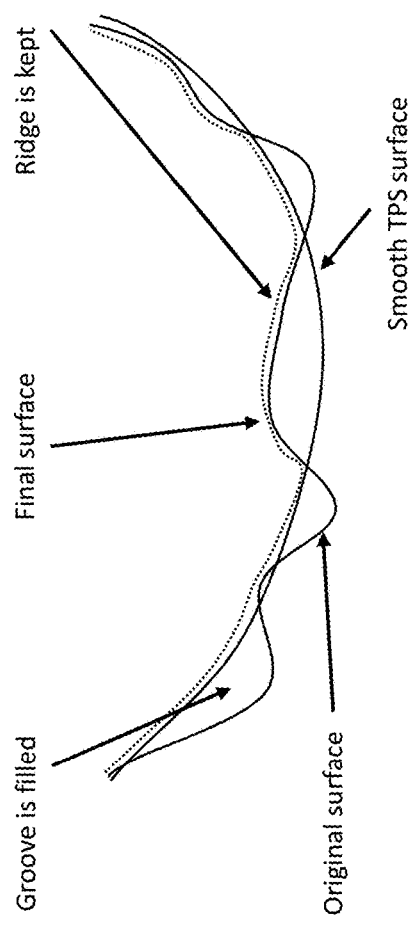

As shown in FIGS. 56A and 56B, the smoothness and thickness of the top surface may also be adjusted to smooth the retainer so that the retainer is more comfort for patient's tongue, and also to reduce stress concentration in the bending point. For example, a smooth thin pate spline surface may be fit by vertices from top central surface points of the retainer. The final outer (top) surface may be the maximum of the original top surface and the smooth TPS, as shown in FIG. 56B. Thus, the vertex may be adjusted so that the outer surface is on top of original position, filling the groove, and keeping any ridges. The thickness is not reduced and retainer is still strong.

Figure 57A:
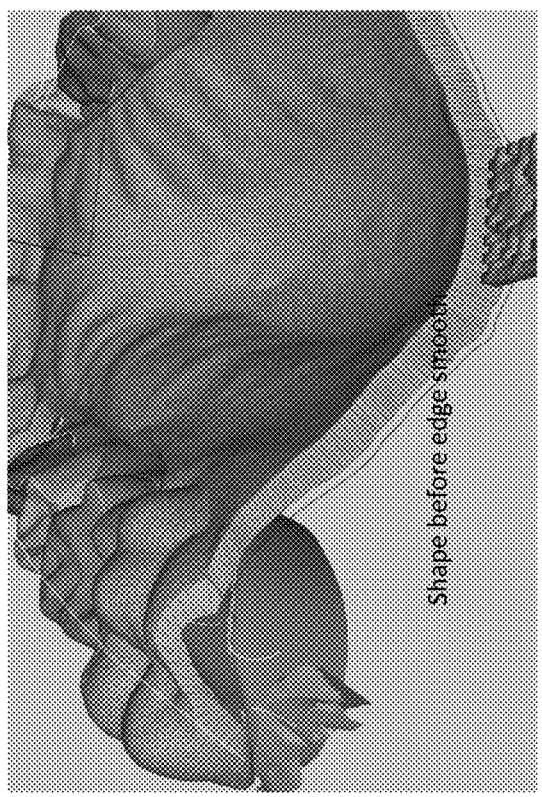
FIGS. 57A-57B illustrate one example of smoothing the outer edges of a retainer being designed (an unsmoothed distal end face is shown in FIG. 57A, the same region shown as smoothed is in FIG. 57B).
Figure 57B:
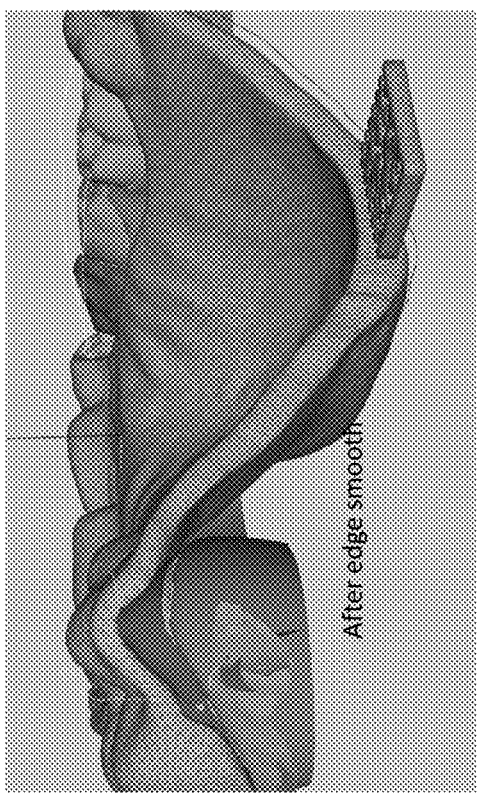

Finally, the space of the retainer may be constructed by smoothing the edges of the digital model, as shown in FIGS. 57A-57B. Points may be rescanned from original surfaces, added by clearance, to form the bottom surface. Triangles may be built, e.g., by constrained Delaunay algorithm, with boundary as described above. The top surface may be formed by extending points from the bottom surface, added by thickness. Triangles may be approximately the same as bottom surface. Edge surfaces may be determined from the boundary points, and may be smoothed. For example, the final surface may be smoothed to make it comfort to wear. In some variations, only the surface(s) near edge is/are smoothed. Thus, the retainer may still keep the shape and mechanical properties.

Figure 58A:
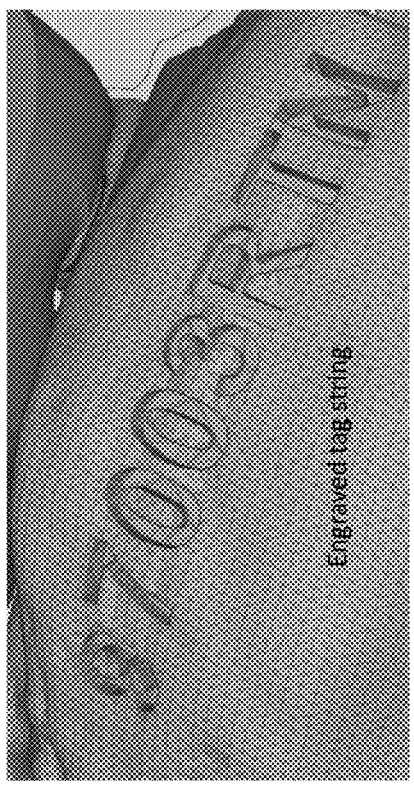
FIGS. 58A-58B illustrate a bottom surface of a retainer that includes an identifier (e.g., tag string) as either an engraved identifier, in FIG. 58A, or an embossed identifier, in FIG. 5B.
Figure 58B:
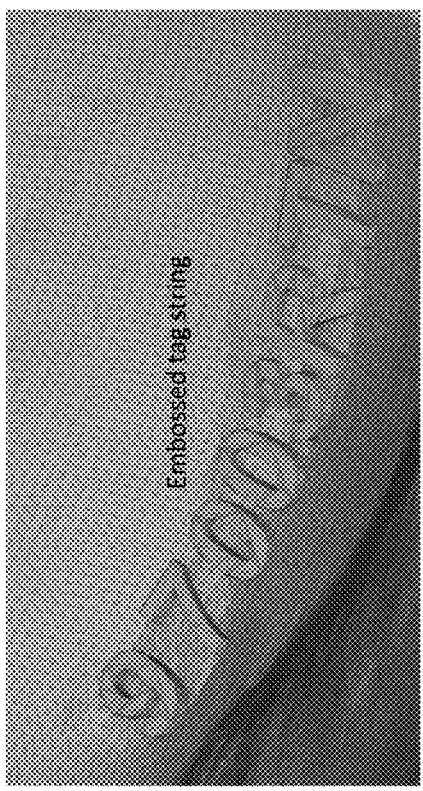

Optionally, in some variations, as shown in FIGS. 58A-58B a code uniquely identifying the patient and/or retainer may be included and formed into or onto the retainer. In FIG. 58A, the retainer includes an alphanumeric code identifying the retainer that is either engraved (FIG. 58A) or embossed (FIG. 58B) onto the retainer. For example, the identifying marking may be a tag string that includes a Patient ID (PID)+"RTN" (retainer). This identifying code may be human readable by the doctor and patient. In FIG. 58A, the code is engraved (debossed) on the retainer surface, and particularly on either the end of the retainer or the bottom surface (facing the palatal region or teeth). In FIG. 58B, the code is embossed on top of the retainer, which may be particularly helpful if the retainer is too thin to engrave. In some variations, the method or apparatus may create a mesh of each character and project the center of each character to a bottom or top surface of retainer, and get the surface direction. For example, a Boolean operation may be used to merge the meshes of the code (e.g., characters) and the retainer. In some variations, the code is a data matrix that may be a machine readable 2D bar code. For example, a mesh may be created from an original "black and white image" of data matrix code in which a raised block equals a black pixel. The data matrix mesh may then connected to the retainer with a short link bar. All shapes may be merged by Boolean operation. In any of these variations of the retainers and methods of making them, the code may be part of an extension from the retainer, which may be removable prior to use. For example, in FIGS. 57A and 57B, a tab including the code (shown as a QR-type code) may be separated from the retainer prior to wearing the retainer. Alternatively this extension region may be left in place.

Figure 31A:
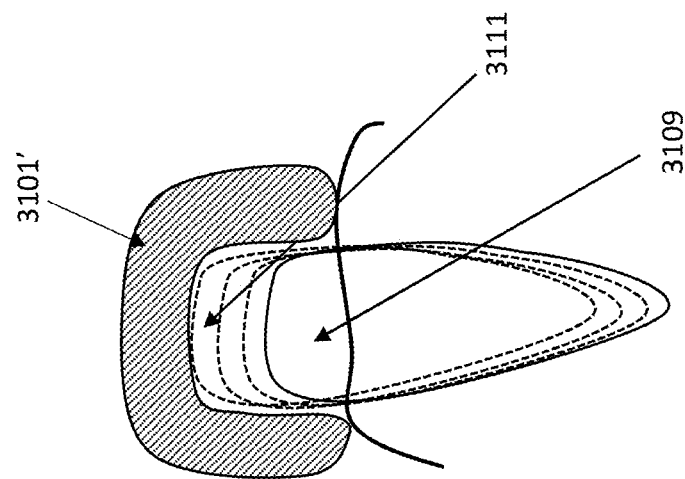
FIGS. 31A and 31B illustrate a method of making a retainer including a space for an erupting teeth and a retainer including a space for an erupting teeth, respectively.
Figure 31B:
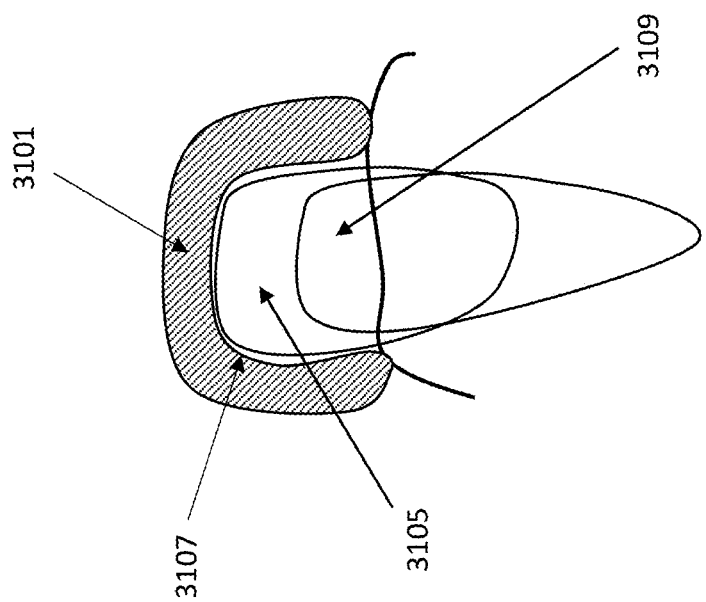

Any of the variations described herein may include spaces for erupting teeth. For example, FIGS. 31A-31B illustrates a section through a retainer 3101, 3101' as described herein, showing a region including a space permitting eruption of a tooth while keeping the adjacent teeth from moving into this region. In FIG. 31A, the retainer 3101 includes a gap or space. In general, the retainer should not block the eruption of permeant teeth. If necessary, a retainer may be created for erupting teeth by using a model (e.g., typodont) tooth 3105 to replace a partially erupted tooth when designing the retainer. This is shown in FIG. 31A. The resulting space 3107 may hold the erupting tooth 3109, as it grown in, shown in FIG. 31B, showing by dashed lines 3111, the stages of growth/eruption.

Figure 32:
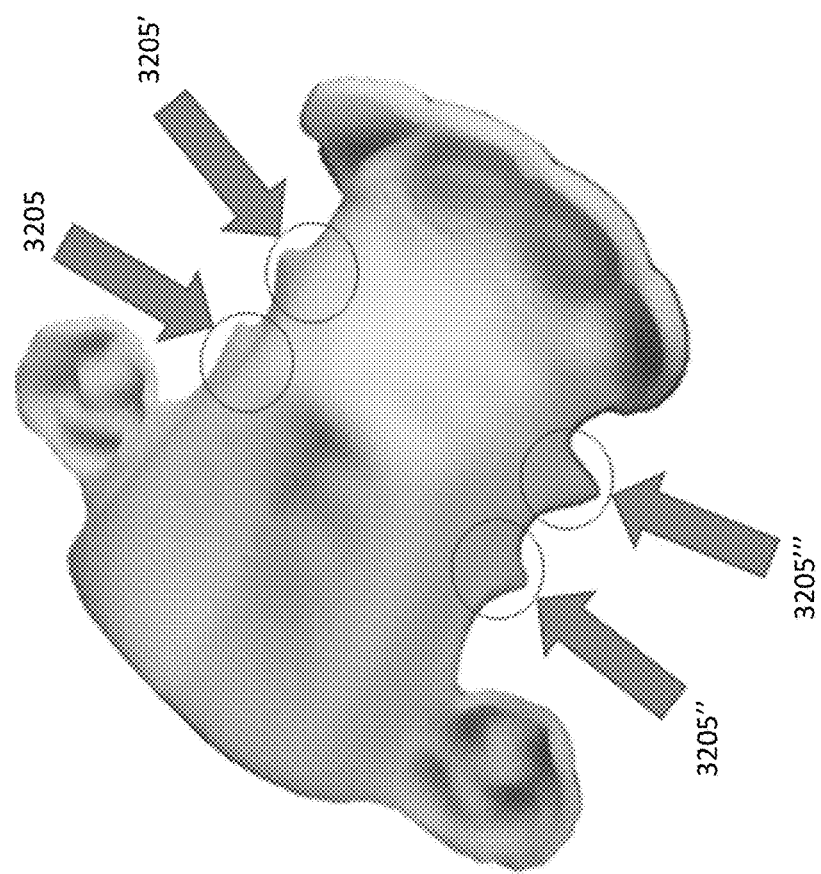
FIG. 32 is an example of a retainer including eruption guidance features that may be used to guide erupting permanent teeth.

Any of the apparatuses described herein may include one or more eruption guidance features for guiding erupting permanent teeth. FIG. 32, similar to FIGS. 24C, 25 and 27 include a plurality of guidance features 3205, 3205', 3205'', 3205'''. These guidance features may be configured ridges or openings on the side of the appliance (retainer) configured to fit into the interproximal region in the erupting tooth, and particularly on either side of the erupting tooth. These guidance features may be on just one side (e.g., the lingual side) or may be on both lingual and buccal sides, as shown in FIG. 27.

In any of the variations described herein, the retainer may include one or more retainer retention attachment regions for mating with an attachment on the patient's teeth (and/or in some variations, a TAD in the palate). For example, the retainer may be configured for coupling with one or more attachments affixed to the teeth; the attachment may be a protrusion, button, bump, hook, etc. that is affixed to the patient's teeth, on either or both the lingual and/or buccal sides.

In general, the retainer apparatuses described herein may help maintain permanent positions of the teeth and/or palate, in some variations may maintain the position of the palate while moving some of the teeth (e.g., anterior teeth). In some variations, these apparatuses may allow for primary teeth eruption, and/or may provide space for maintenance of the teeth position. The retainer apparatuses may prevent passive eruption. These apparatuses may also or alternatively be configured to maintain palatal expansion.

For example, as described above, the retainers described above may include any combination of features including full palatal width; covering the full palatal width may maintain the rigidity (e.g., for one size fits all variations, or with control of one or more of contacting the palate, offset from palate and/or the thickness of the trans palatal arch). These retainers may include one or more holes or openings, e.g., in the palatal region (which may prevent choking and reduce contact with the tissue). These retainers may include one or more cut away regions in the side or palatal region to maximize room for the patient's tongue, which may enhance patient comfort. This may be done as a generic, e.g., one size fits all variation or as part of a variation controlling where the trans-palatal arch covers. Any of these devices may include one or more cut-away regions arranged and/or configured for primary tooth exfoliation. These regions may include one or more eruption guidance features that may act as a guide for erupting permanent teeth. Any of these retainers may also be configured to encapsulate the permanent teeth to maintain tooth alignment, space maintenance, eruption compensation, and/or prevent passive eruption.

The retainers described herein may be free of buccal coverage of the anterior teeth (which may be for aesthetic reasons) or may have less anterior tooth coverage. In some variations the user (e.g., dental practitioner) may select the amount of coverage or no coverage. In the method of designing (e.g., automated or semi-automated, including user interface for user-guided or controlled design of retainers) the occlusal thicknesses may be user-selectable; predetermined different occlusal thicknesses may be included or the user may manually select occlusal thickness. Similarly, the occlusal shape may be pre-selected or may be user-configured (e.g., the occlusal shape may include cusps or flat regions).

As described herein, any of these apparatuses may include a marking (e.g., alphanumeric marking, symbol marking, QR codes, etc.) indicating a unique identifier and/or a part with an ID number or data matrix included in the design.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of forming a retainer, the method comprising:
   gathering a three-dimensional (3D) model of a patient's dentition;
   translating a target arrangement of the patient's teeth from the 3D model of the patient's dentition into a two-dimensional (2D) height map of the patient's dentition, wherein translating the target arrangement includes mapping the 2D height map from a scan surface of the 3D model, the scan surface including a plurality of scan curves, wherein mapping the 2D height map comprises projecting a vertex in the 3D model into a scan curve of the plurality of scan curves;
   defining a boundary of a retainer configured to fit onto the patient's dentition;
   modifying the boundary by adjusting a retainer coverage of the patient's teeth, gingiva and palate;
   building a 2D mesh of an upper surface of the patient's dentition from the 2D height map using the modified boundary;
   converting the 2D mesh of the upper surface of the patient's dentition into a 3D mesh of the upper surface of the patient's dentition;
   forming a bottom surface of a digital model of the retainer using the 3D mesh of the upper surface;
   forming a top surface of the digital model of the retainer having different thicknesses between the top surface and bottom surfaces of the digital model of the retainer; and
   exporting the digital model of the retainer for 3D printing.

2. The method of claim 1, further comprising smoothing edges between the bottom surface and the top surface of the digital model of the retainer.

3. The method of claim 1, further comprising adding an identifying code on one or more surfaces of the digital model of the retainer.

4. The method of claim 1, further comprising building a matrix mesh of the digital model of the retainer, wherein exporting the digital model of the retainer comprises converting the matrix mesh into a stereolithographic (STL) file format.

5. The method of claim 1, wherein building the 2D mesh of the upper surface of the patient's dentition comprising building the 2D mesh from the 2D height map using the boundary.

6. The method of claim 1, wherein forming the bottom surface of the digital model of the retainer using the 3D mesh of the upper surface comprises smoothing the bottom surface to remove sharp corners.

7. The method of claim 1, wherein forming the bottom surface of the digital model of the retainer using the 3D mesh of the upper surface comprises smoothing the bottom surface by setting starting points forming the bottom surface that are initially on the 3D mesh of the upper surface and dilating and eroding the starting points at a minimum distance from the 3D mesh of the upper surface.

8. The method of claim 1, wherein gathering the three-dimensional (3D) model of a patient's dentition comprises gathering a digital scan of the patient's jaw and a treatment file including the target arrangement of the patient's teeth in the patient's jaw.

9. The method of claim 1, wherein gathering the three-dimensional (3D) model of a patient's dentition comprises gathering a digital scan of the patient's jaw with the patient's teeth in the target arrangement.

10. The method of claim 1, wherein translating the target arrangement of the patient's teeth from the 3D model of the patient's dentition into the two-dimensional (2D) height map of the patient's dentition comprises rasterizing the 3D model of the patient's dentition as 2D height map points.

11. The method of claim 1, further comprising adding a filler shape so that the filler shape is present on the 3D mesh of the upper surface and reduces spaces between the patient's teeth.

12. The method of claim 1, further comprising 3D printing the retainer from the digital model of the retainer.

13. The method of claim 1, wherein building the 2D mesh of the upper surface of the patient's dentition from the 2D height map comprises triangulating the 2D height map.

14. A method of forming a retainer, the method comprising:
   gathering a three-dimensional (3D) model of a patient's dentition and a target arrangement of the patient's teeth;
   translating the target arrangement of the patient's teeth from the 3D model of the patient's dentition into a two-dimensional (2D) height map of the patient's dentition, wherein translating the target arrangement includes mapping the 2D height map from a scan surface of the 3D model, the scan surface including a plurality of scan curves, wherein mapping the 2D height map comprises projecting a vertex in the 3D model into a scan curve of the plurality of scan curves;
   defining a boundary of a retainer configured to fit onto the patient's dentition when the patient's teeth are in the target arrangement;
   modifying the boundary by adjusting a retainer coverage of the patient's teeth, gingiva and palate;
   building a 2D mesh of an upper surface of the patient's dentition from the 2D height map using the modified boundary;
   converting the 2D mesh of the upper surface of the patient's dentition into a 3D mesh of the upper surface of the patient's dentition;
   forming a bottom surface of a digital model of the retainer using the 3D mesh of the upper surface;
   forming a top surface of the digital model of the retainer at different thicknesses between the top surface and bottom surface of the digital model of the retainer;
   adjusting one or more of a smoothness of the top surface of the distal digital model of the retainer and a thickness between the top surface and the bottom surface of the digital model of the retainer;
   exporting the digital model of the retainer for 3D printing.

15. A system comprising:
   one or more processors;
   a memory coupled to the one or more processors, the memory configured to store instructions, that, when executed by the one or more processors, perform a computer-implemented method comprising:
      gathering a three-dimensional (3D) model of a patient's dentition;
      translating a target arrangement of the patient's teeth from the 3D model of the patient's dentition into a two-dimensional (2D) height map of the patient's dentition, wherein translating the target arrangement includes mapping the 2D height map from a scan surface of the 3D model, the scan surface including a plurality of scan curves, wherein mapping the 2D height map comprises projecting a vertex in the 3D model into a scan curve of the plurality of scan curves;

defining a boundary of a retainer configured to fit onto the patient's dentition;

modifying the boundary by adjusting a retainer coverage of the patient's teeth, gingiva and palate;

building a 2D mesh of an upper surface of the patient's dentition from the 2D height map using the modified boundary;

converting the 2D mesh of the upper surface of the patient's dentition into a 3D mesh of the upper surface of the patient's dentition;

forming a bottom surface of a digital model of the retainer using the 3D mesh of the upper surface;

forming a top surface of the digital model of the retainer having different thicknesses between the top surface and bottom surfaces of the digital model of the retainer; and exporting the digital model of the retainer for 3D printing.

16. The system of claim 15, wherein the computer-implemented method further comprises: smoothing edges between the bottom surface and the top surface of the digital model of the retainer.

17. The system of claim 15, wherein the computer-implemented method further comprises: adding an identifying code on one or more surfaces of the digital model of the retainer.

18. The system of claim 15, wherein the computer-implemented method further comprises: building a matrix mesh of the digital model of the retainer, wherein exporting the digital model of the retainer comprises converting the matrix mesh into a stereolithographic (STL) file format.

19. The system of claim 15, wherein building the 2D mesh of the upper surface of the patient's dentition comprising building the 2D mesh from the 2D height map using the boundary.

20. The system of claim 15, wherein forming the bottom surface of the digital model of the retainer using the 3D mesh of the upper surface comprises smoothing the bottom surface to remove sharp corners.

21. The system of claim 15, wherein forming the bottom surface of the digital model of the retainer using the 3D mesh of the upper surface comprises smoothing the bottom surface by setting starting points forming the bottom surface that are initially on the 3D mesh of the upper surface and dilating and eroding the starting points at a minimum distance from the 3D mesh of the upper surface.

22. The system of claim 15, wherein gathering the three-dimensional (3D) model of a patient's dentition comprises gathering a digital scan of the patient's jaw and a treatment file including the target arrangement of the patient's teeth in the patient's jaw.

23. The system of claim 15, wherein gathering the three-dimensional (3D) model of a patient's dentition comprises gathering a digital scan of the patient's jaw with the patient's teeth in the target arrangement.

24. The system of claim 15, wherein translating the target arrangement of the patient's teeth from the 3D model of the patient's dentition into the two-dimensional (2D) height map of the patient's dentition comprises rasterizing the 3D model of the patient's dentition as 2D height map points.

25. The system of claim 15, wherein the computer-implemented method further comprises: adding a filler shape so that the filler shape is present on the 3D mesh of the upper surface and reduces spaces between the patient's teeth.

26. The system of claim 15, wherein the computer-implemented method further comprises: 3D printing the retainer from the digital model of the retainer.

27. The system of claim 15, wherein building the 2D mesh of the upper surface of the patient's dentition from the 2D height map comprises triangulating the 2D height map.

28. A system comprising:
one or more processors;
a memory coupled to the one or more processors, the memory configured to store instructions, that, when executed by the one or more processors, perform a computer-implemented method comprising:

gathering a three-dimensional (3D) model of a patient's dentition and a target arrangement of the patient's teeth;

translating the target arrangement of the patient's teeth from the 3D model of the patient's dentition into a two-dimensional (2D) height map of the patient's dentition, wherein translating the target arrangement includes mapping the 2D height map from a scan surface of the 3D model, the scan surface including a plurality of scan curves, wherein mapping the 2D height map comprises projecting a vertex in the 3D model into a scan curve of the plurality of scan curves;

defining a boundary of a retainer configured to fit onto the patient's dentition when the patient's teeth are in the target arrangement;

modifying the boundary by adjusting a retainer coverage of the patient's teeth, gingiva and palate;

building a 2D mesh of an upper surface of the patient's dentition from the 2D height map using the modified boundary;

converting the 2D mesh of the upper surface of the patient's dentition into a 3D mesh of the upper surface of the patient's dentition;

forming a bottom surface of a digital model of the retainer using the 3D mesh of the upper surface;

forming a top surface of the digital model of the retainer at different thicknesses between the top surface and bottom surface of the digital model of the retainer;

adjusting one or more of a smoothness of the top surface of the digital model of the retainer and a thickness between the top surface and the bottom surface of the digital model of the retainer;

exporting the digital model of the retainer for 3D printing.

29. The method of claim 1, wherein the scan curve includes a palate region, a crown region, and a buccal region.

* * * * *